(12) United States Patent
Crites

(10) Patent No.: US 11,840,322 B2
(45) Date of Patent: *Dec. 12, 2023

(54) EXTRUDED AND CO-EXTRUDED HIGH-ALTITUDE BALLOONS

(71) Applicant: Austyn Daniel Crites, Alameda, CA (US)

(72) Inventor: Austyn Daniel Crites, Alameda, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/922,853

(22) Filed: Jul. 7, 2020

(65) Prior Publication Data

US 2020/0331228 A1    Oct. 22, 2020

Related U.S. Application Data

(63) Continuation of application No. 16/052,531, filed on Aug. 1, 2018, now Pat. No. 10,759,136.

(Continued)

(51) Int. Cl.
*B64B 1/40* (2006.01)
*B32B 37/15* (2006.01)
(Continued)

(52) U.S. Cl.
CPC ............... *B64B 1/40* (2013.01); *B29C 48/08* (2019.02); *B29C 48/19* (2019.02); *B29C 48/252* (2019.02);
(Continued)

(58) Field of Classification Search
CPC .... B64B 1/40; B64B 1/42; B64B 1/44; B64B 1/46; B64B 1/48; B64B 1/58; B64B 1/60; B64B 1/62; B64B 1/64; B32B 1/02; B32B 27/08; B32B 27/12; B32B 27/14; B32B 27/16; B32B 27/18; B32B 27/20; B32B 27/22; B32B 27/28; B32B 27/281; B32B 27/283; B32B 27/285; B32B 27/286; B32B 27/288; B32B 27/30; B32B 27/302; B32B 27/304; B32B 27/306; B32B 27/308; B32B 27/32; B32B 27/322; B32B 27/325; B32B 27/327; B32B 27/34; B32B 27/36; B32B 27/365; B32B 27/38; B32B 27/40; B32B 27/42; B32B 1/08; B32B 3/02; B32B 3/08; B32B 3/20; B32B 5/26; B32B 7/05; B32B 7/06; B32B 7/08; B32B 7/09; B32B 7/12; B32B 9/007; B32B 9/04; B32B 9/041; B32B 9/045; B32B 9/047; B32B 9/06; B32B 15/043; B32B 15/082; B32B 15/085; B32B 15/088; B32B 15/09; B32B 15/095; B32B 15/12; B32B 15/14; B32B 15/20; B32B 17/06; B32B 27/10; B32B 29/005;

(Continued)

(56) References Cited

U.S. PATENT DOCUMENTS 4,877,205 A * 10/1989 Rand .................... B29C 66/8248
156/251
10,759,136 B2 * 9/2020 Crites ........................ B32B 1/08
(Continued)

*Primary Examiner* — James C Yager
*Assistant Examiner* — Thomas J Kessler
(74) *Attorney, Agent, or Firm* — Holland & Hart LLP

(57) ABSTRACT

A high altitude balloon. A plurality of layers of coextruded extrudate are formed in a seamless sheet in a shape that defines a balloon envelope. Delaminator layers may be interposed between two or more of the layers of extrudate.

20 Claims, 51 Drawing Sheets

Related U.S. Application Data

(60) Provisional application No. 62/542,951, filed on Aug. 9, 2017, provisional application No. 62/539,709, filed on Aug. 1, 2017.

(51) Int. Cl.

| | | |
|---|---|---|
| *B32B 27/08* | (2006.01) | |
| *B32B 27/20* | (2006.01) | |
| *B64B 1/58* | (2006.01) | |
| *B29C 48/25* | (2019.01) | |
| *B29C 48/285* | (2019.01) | |
| *B29C 48/84* | (2019.01) | |
| *B29C 48/88* | (2019.01) | |
| *B29C 48/08* | (2019.01) | |
| *B64B 1/46* | (2006.01) | |
| *B32B 1/02* | (2006.01) | |
| *B64B 1/44* | (2006.01) | |
| *B64B 1/48* | (2006.01) | |
| *B64B 1/42* | (2006.01) | |
| *B29C 48/82* | (2019.01) | |
| *B29C 48/30* | (2019.01) | |
| *B29C 48/305* | (2019.01) | |
| *B29C 48/19* | (2019.01) | |
| *B29L 31/30* | (2006.01) | |
| *B29L 9/00* | (2006.01) | |
| *B29L 22/02* | (2006.01) | |
| *B29C 48/21* | (2019.01) | |
| *B29C 48/00* | (2019.01) | |
| *B29C 48/23* | (2019.01) | |
| *B29C 48/355* | (2019.01) | |
| *B29L 31/00* | (2006.01) | |
| *B29K 23/00* | (2006.01) | |
| *B29C 48/155* | (2019.01) | |

(52) U.S. Cl.
CPC ............ *B29C 48/285* (2019.02); *B29C 48/30* (2019.02); *B29C 48/307* (2019.02); *B29C 48/82* (2019.02); *B29C 48/845* (2019.02); *B29C 48/9135* (2019.02); *B32B 1/02* (2013.01); *B32B 27/08* (2013.01); *B32B 27/20* (2013.01); *B32B 37/153* (2013.01); *B64B 1/42* (2013.01); *B64B 1/44* (2013.01); *B64B 1/46* (2013.01); *B64B 1/48* (2013.01); *B64B 1/58* (2013.01); *B29C 48/0021* (2019.02); *B29C 48/0022* (2019.02); *B29C 48/155* (2019.02); *B29C 48/21* (2019.02); *B29C 48/23* (2019.02); *B29C 48/305* (2019.02); *B29C 48/355* (2019.02); *B29C 48/914* (2019.02); *B29C 2793/0027* (2013.01); *B29C 2793/0063* (2013.01); *B29K 2023/0625* (2013.01); *B29K 2023/0633* (2013.01); *B29K 2023/086* (2013.01); *B29L 2009/00* (2013.01); *B29L 2022/022* (2013.01); *B29L 2031/3076* (2013.01); *B29L 2031/3097* (2013.01); *B29L 2031/763* (2013.01)

(58) Field of Classification Search
CPC ... B32B 29/02; B32B 37/153; B32B 2250/03; B32B 2250/04; B32B 2255/20; B32B 2255/26; B32B 2260/021; B32B 2260/046; B32B 2262/02; B32B 2262/0269; B32B 2262/101; B32B 2262/106; B32B 2307/31; B32B 2307/51; B32B 2307/54; B32B 2307/546; B32B 2307/7244; B32B 2307/732; B32B 2410/00; B32B 2605/18; B29C 48/0021; B29C 48/0022; B29C 48/08; B29C 48/155; B29C 48/19; B29C 48/21; B29C 48/23; B29C 48/252; B29C 48/285; B29C 48/30; B29C 48/305; B29C 48/307; B29C 48/355; B29C 48/82; B29C 48/845; B29C 48/9135; B29C 48/914; B29C 2793/0027; B29C 2793/0063; B29K 2023/0625; B29K 2023/0633; B29K 2023/086; B29L 2009/00; B29L 2022/022; B29L 2031/3076; B29L 2031/3097; B29L 2031/763

See application file for complete search history.

(56) References Cited

U.S. PATENT DOCUMENTS

2013/0126675 A1* 5/2013 Heppe .................. B64B 1/14
  29/402.01
2015/0336652 A1* 11/2015 Smith .................... B32B 27/32
  244/31

* cited by examiner

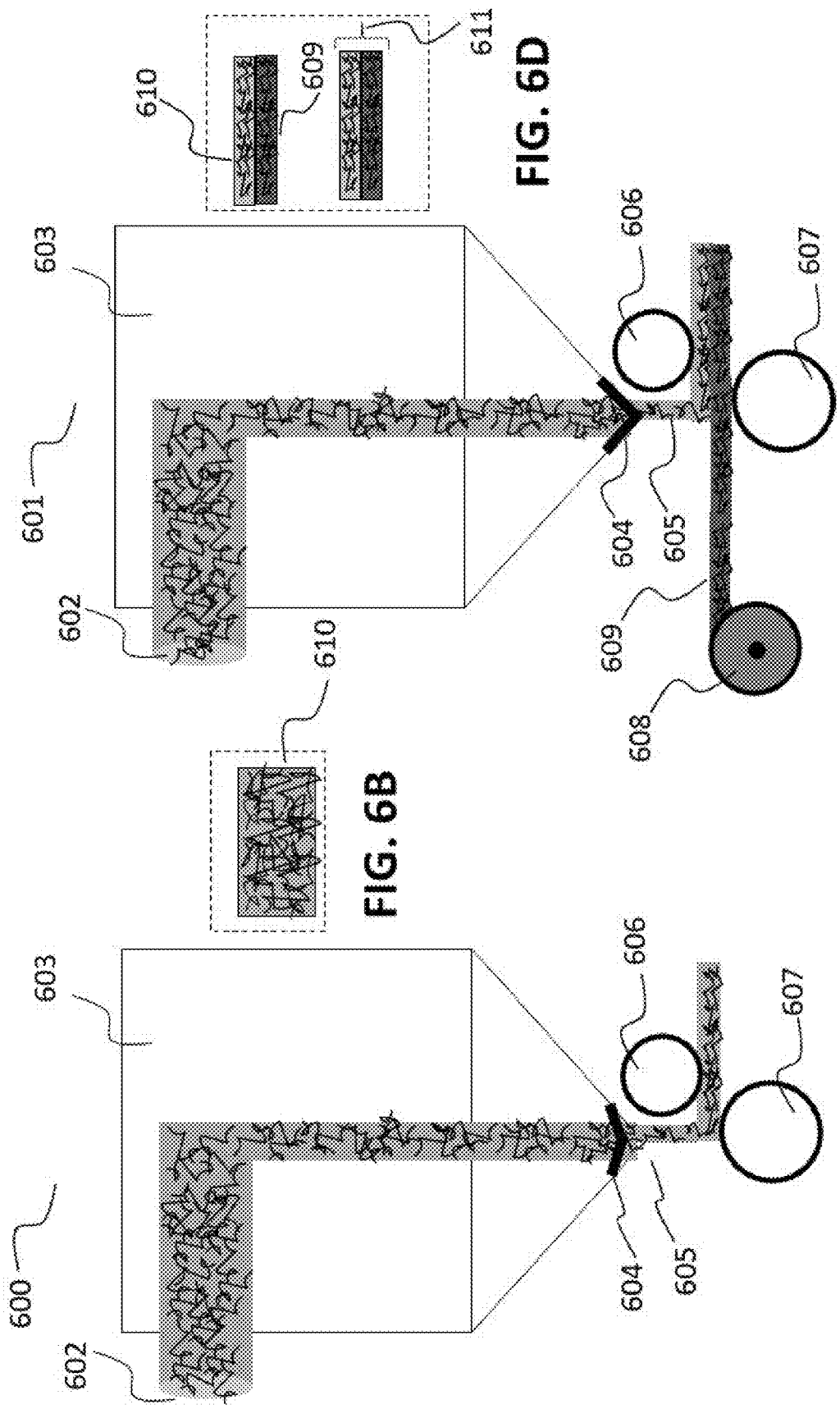

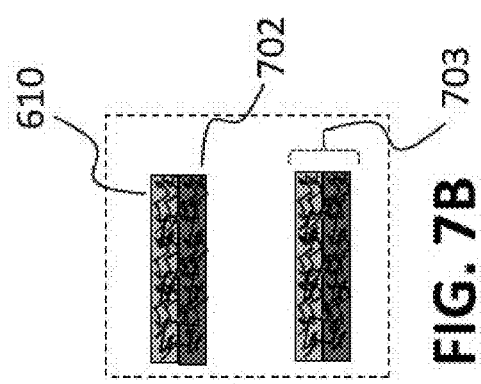
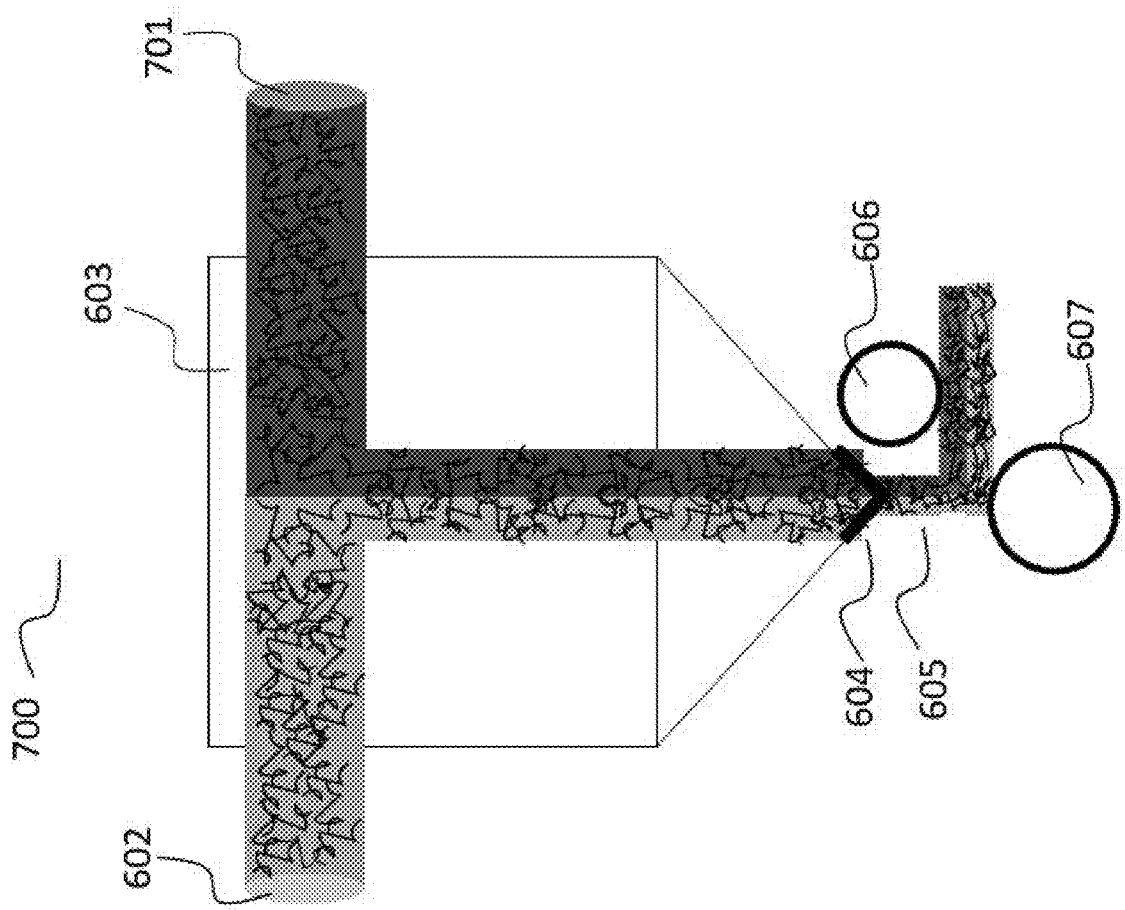
FIG. 7B
FIG. 7A

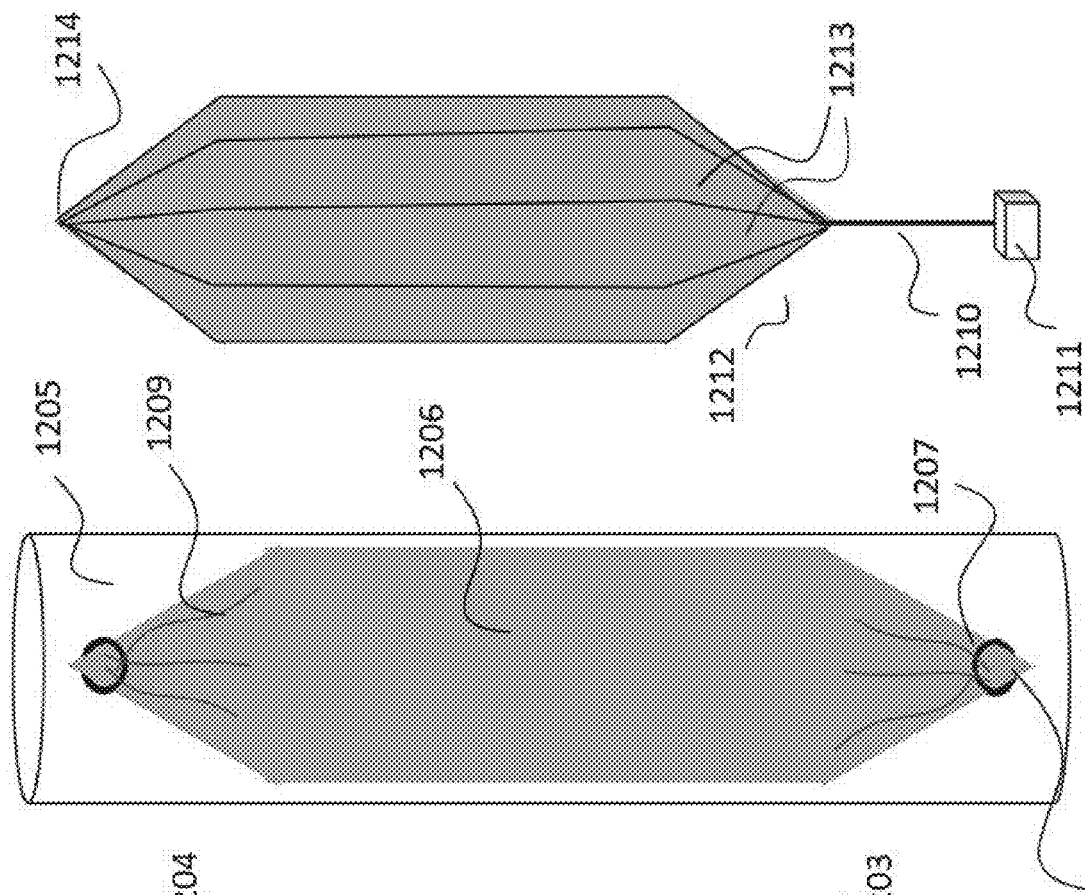
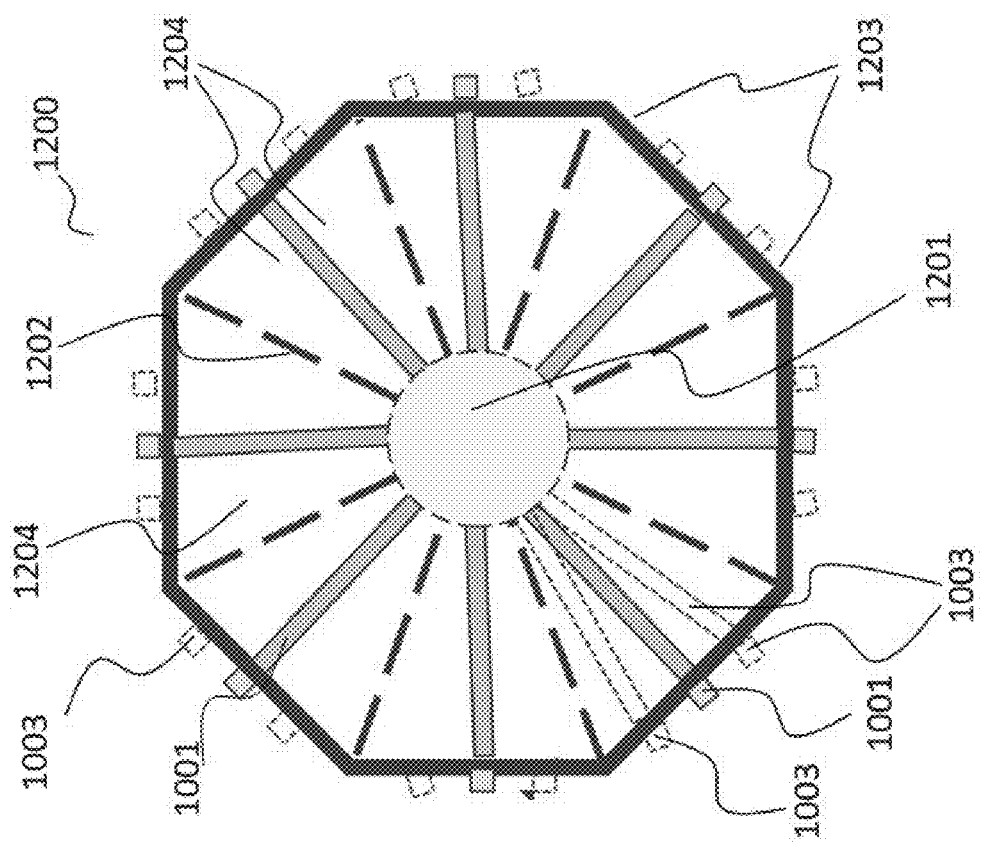
FIG. 12A  FIG. 12B  FIG. 12C

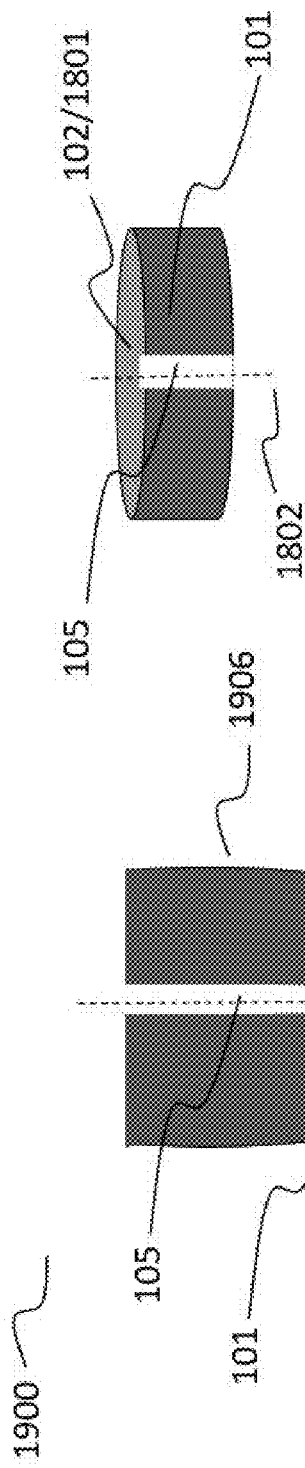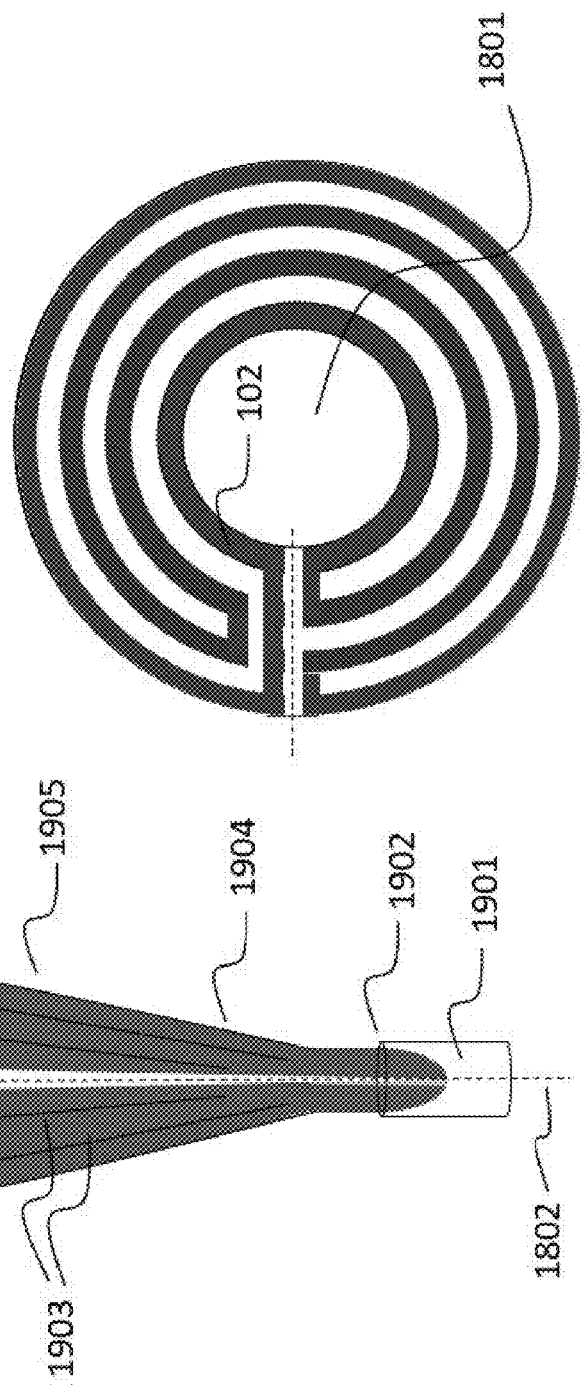

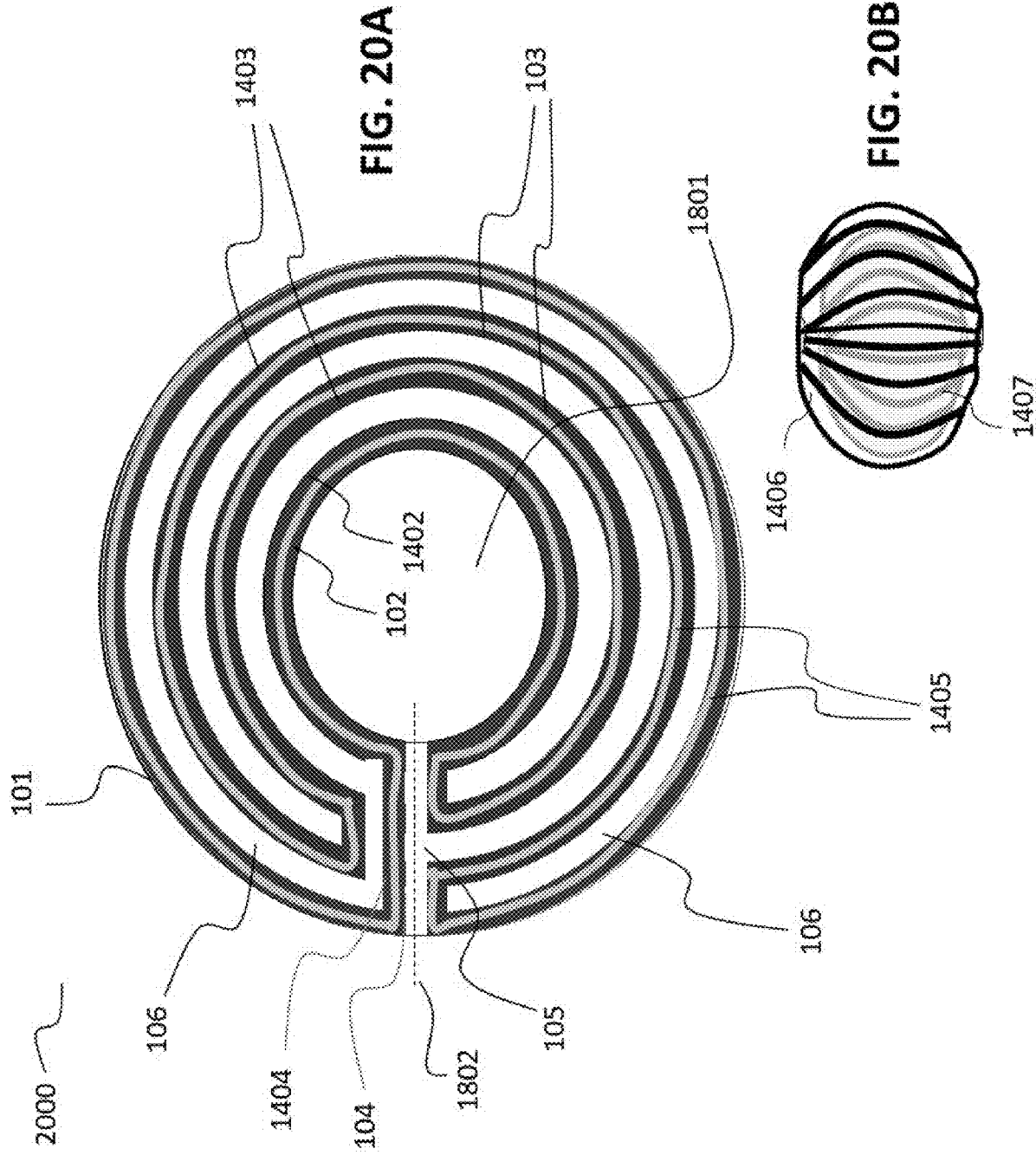

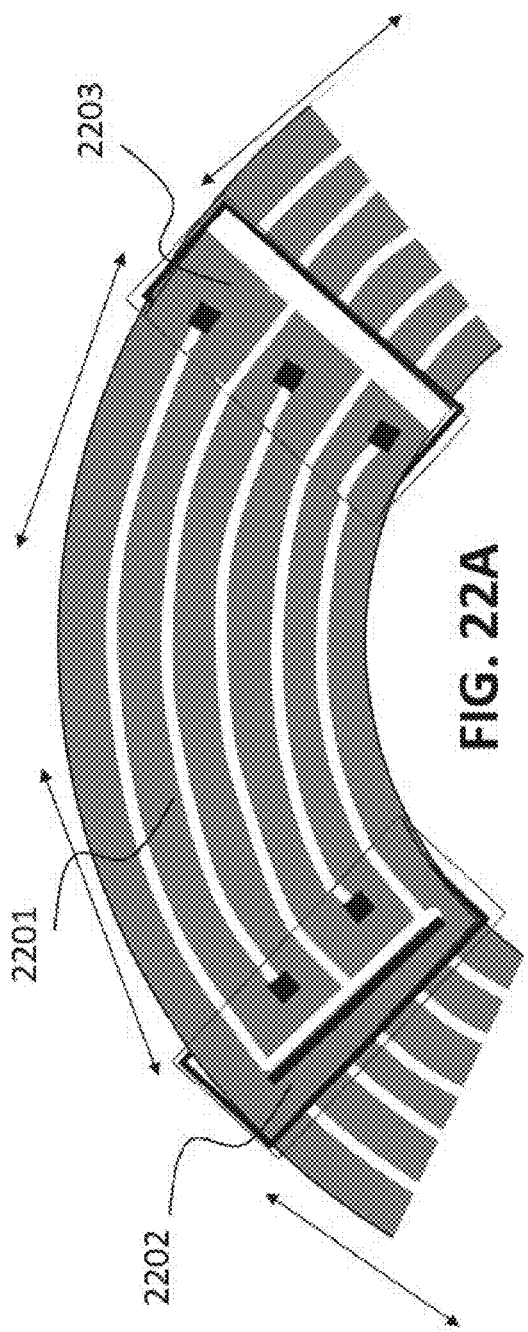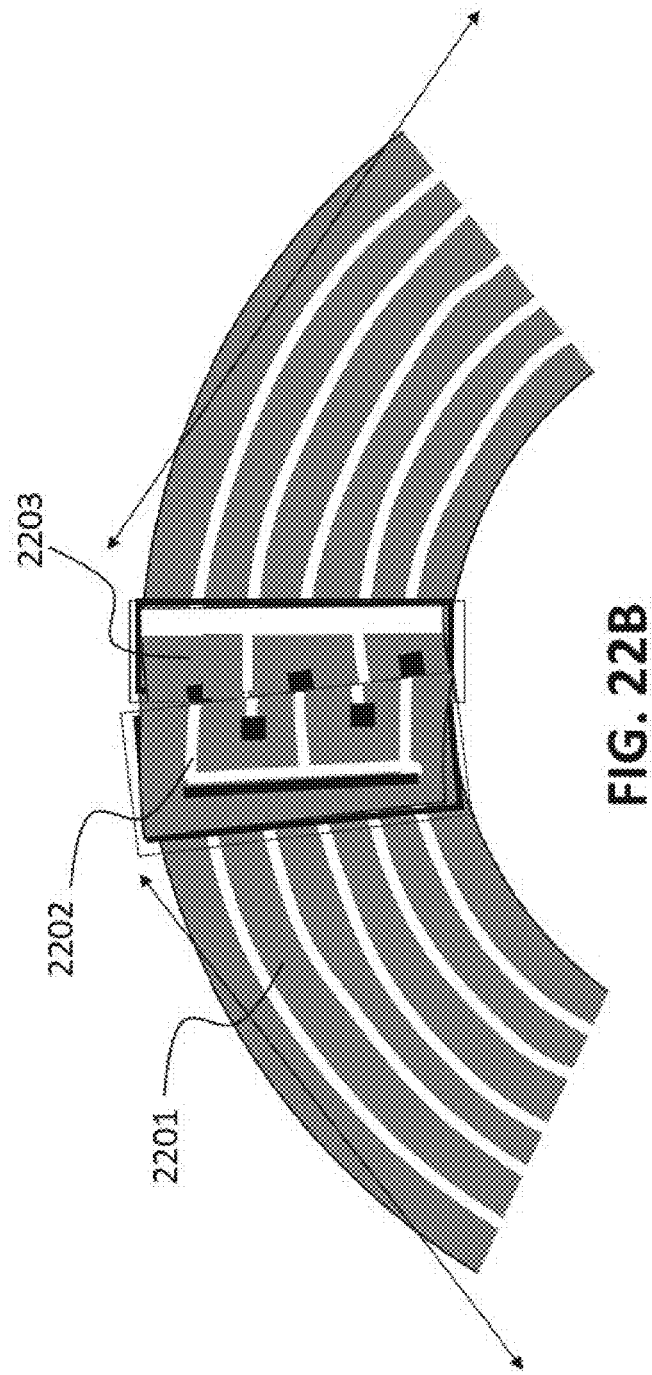
FIG. 22A
FIG. 22B

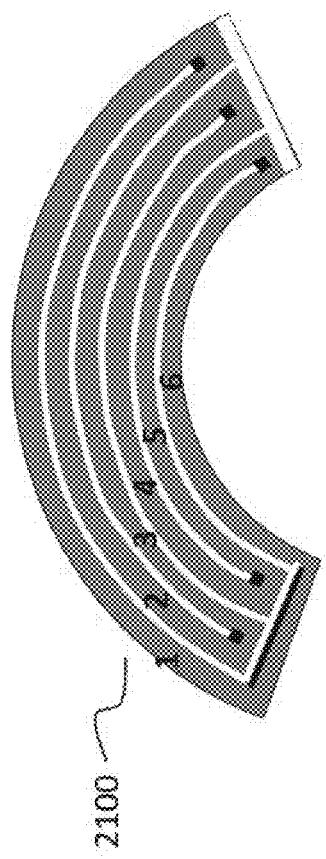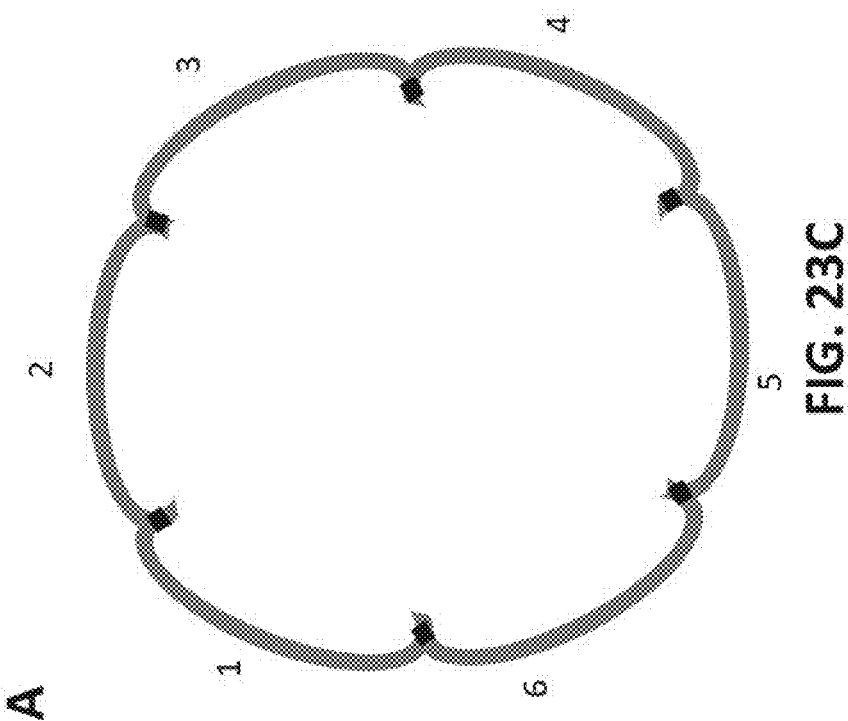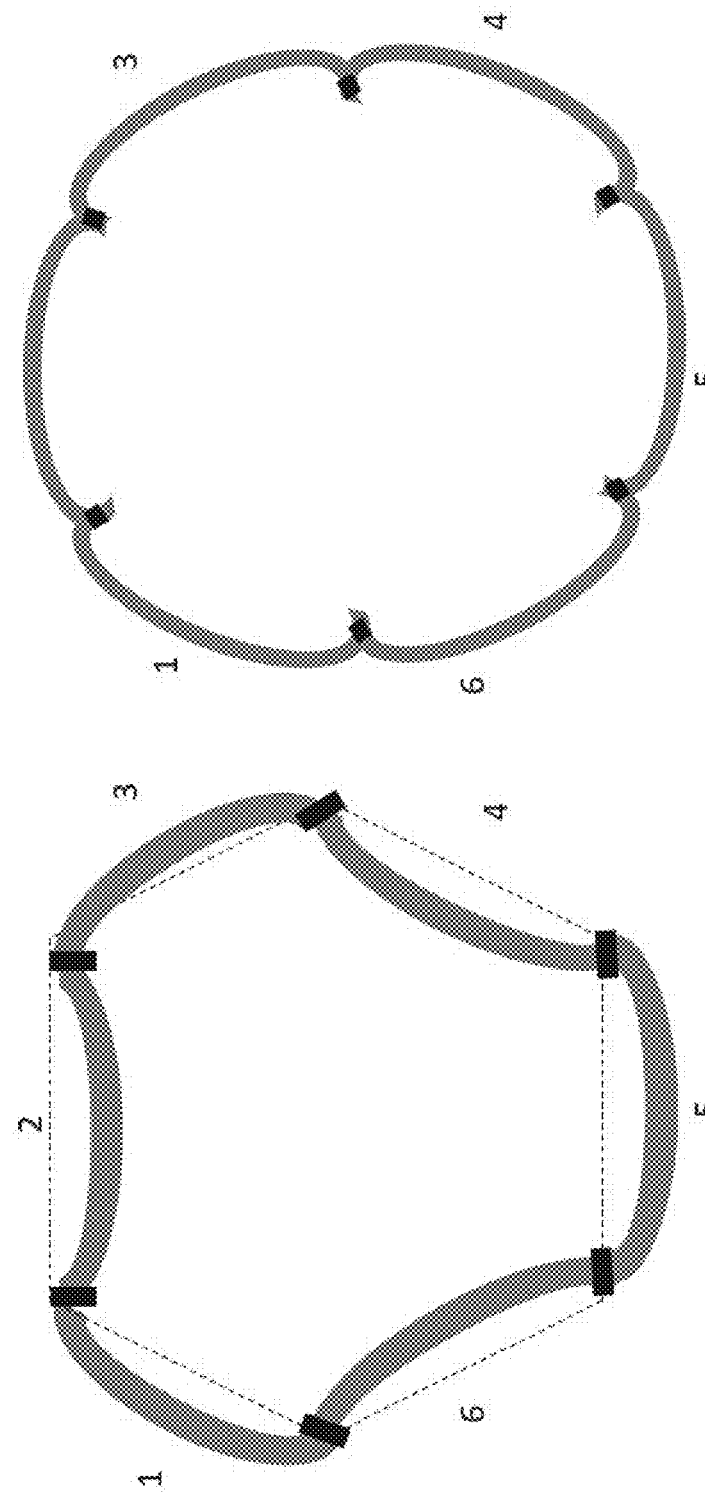

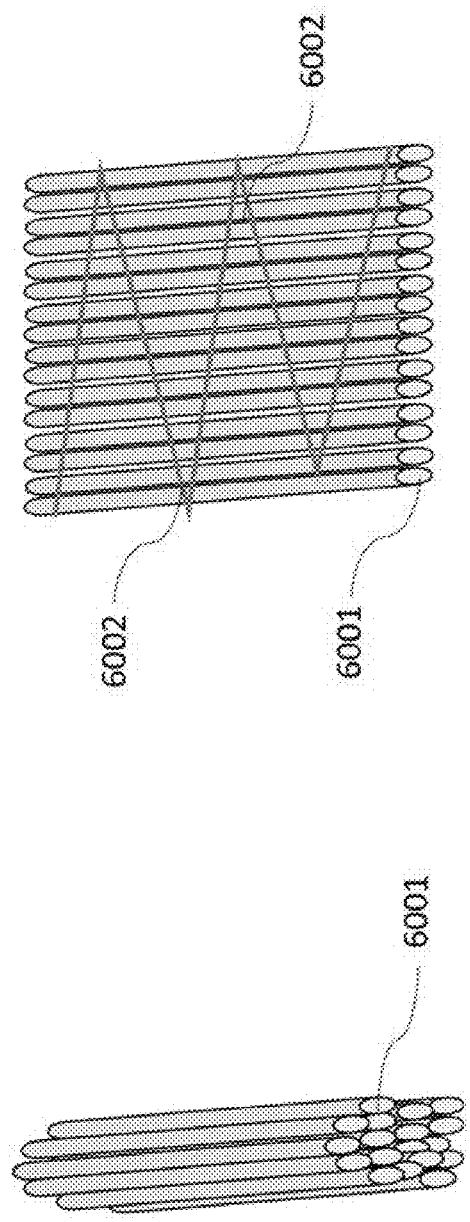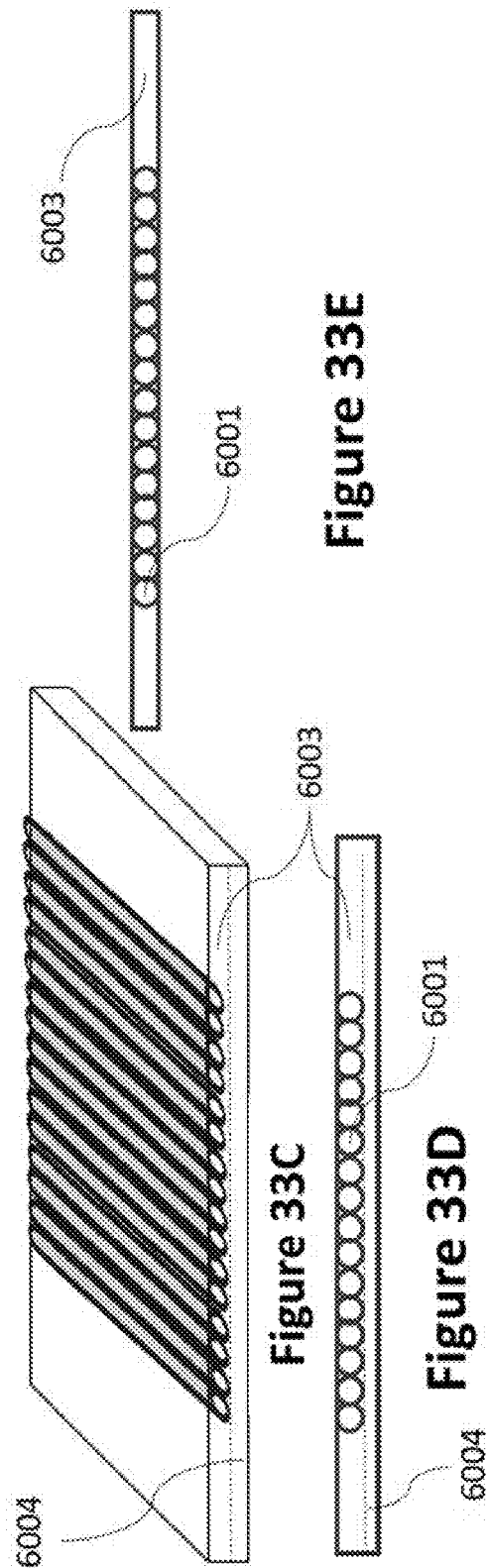

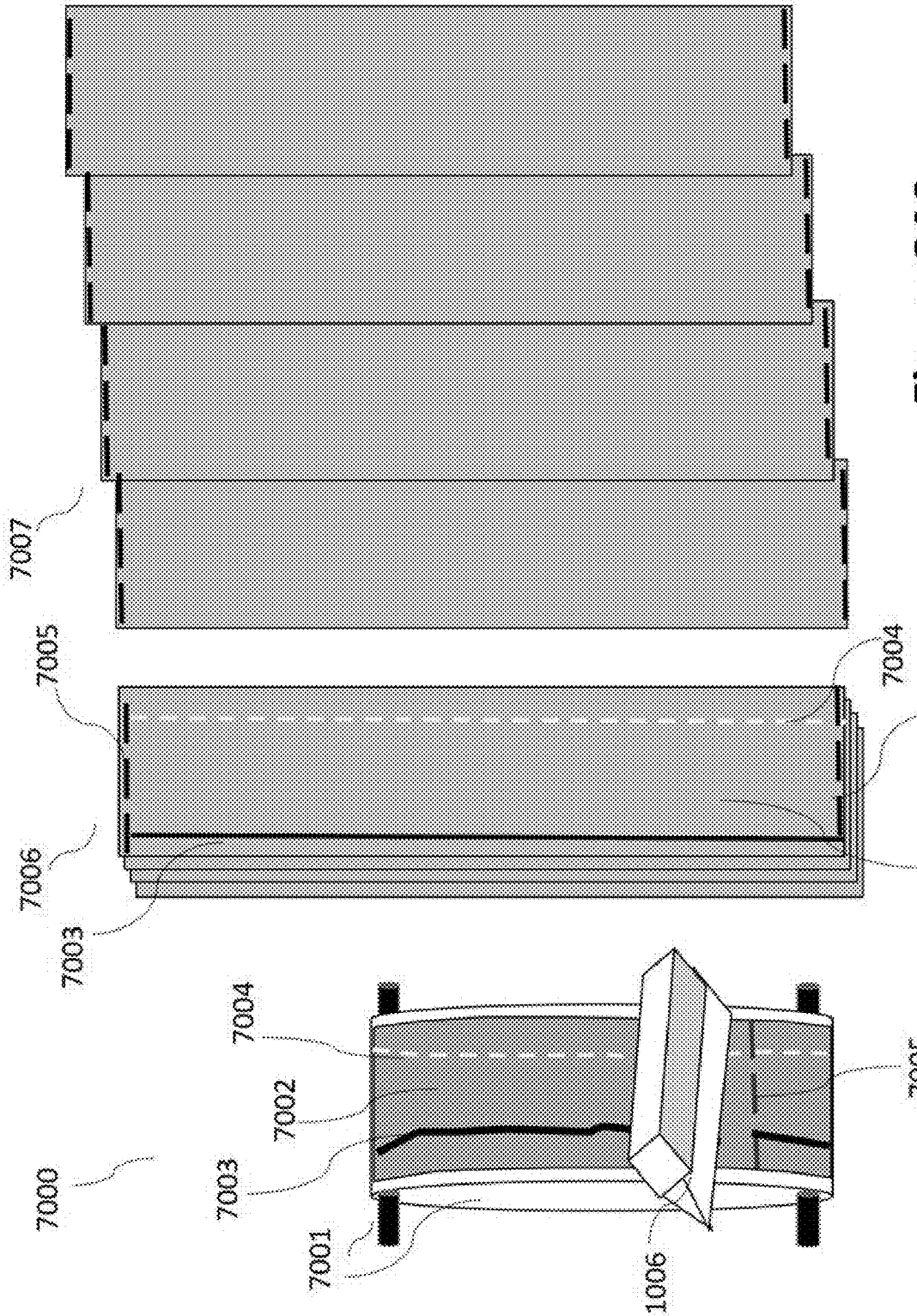

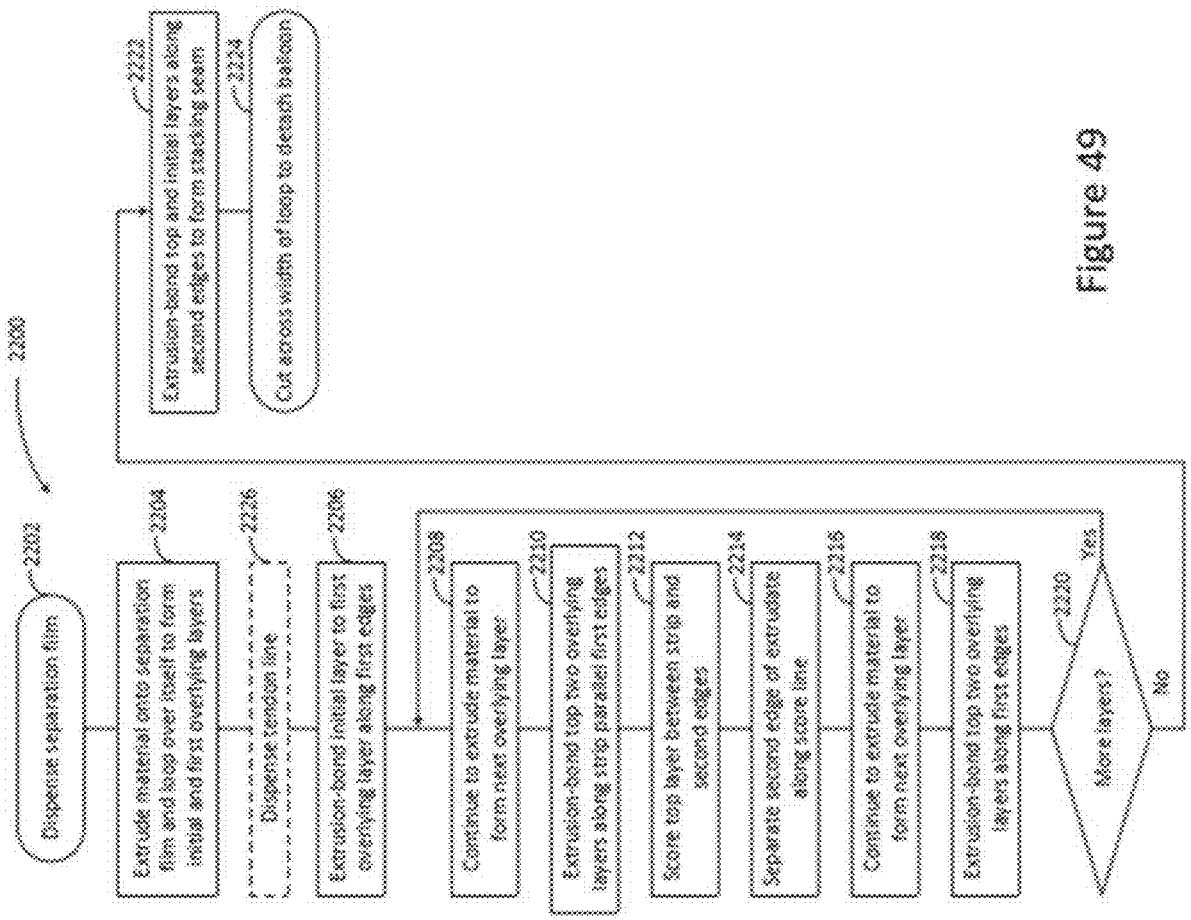

though stronger because of cross-fiber strength and other properties are not possible without this invention.

EXTRUDED AND CO-EXTRUDED HIGH-ALTITUDE BALLOONS

CROSS-REFERENCE TO RELATED APPLICATIONS

This application is a continuation of the Applicant's pending application titled "Extruded and Co-extruded High Altitude Balloons and Methods and Apparatus for Manufacture", Ser. No. 16/052,531, filed 1 Aug. 2018. This application is related to the Applicant's co-pending application titled "Methods of Manufacturing High-Altitude Balloons", Ser. No. 16/922,812, filed the same date as this application. This application claims priority from the Applicant's provisional applications titled "Extrusion high altitude balloon and method and apparatus for its manufacture", Ser. No. 62/539,709, filed 1 Aug. 2017, and "Coextruded high altitude balloon and method and apparatus for its manufacture," Ser. No. 62/542,951, filed 9 Aug. 2017. All three of said applications are incorporated herein by this reference, provided that if there is any inconsistency between such prior applications and this application, this application will control.

FIELD OF THE INVENTION

This invention is in the field of high-altitude balloons and more particularly high-altitude balloons fabricated of extrudable material, and methods and apparatus for manufacturing the same.

BACKGROUND

A "high-altitude balloon" is a balloon, manned or unmanned, that can be released at ground level (or higher) and that climbs into the troposphere, stratosphere, or mesosphere at altitudes up to about 80 kilometers 50 miles). These balloons are filled with a lifting gas or with air at a temperature higher than that of the surrounding atmosphere.

High-altitude balloons often comprise two or more "gores" attached to each other. A "gore" is a tapering or triangular sector of a curved surface, such as the typical tapering panels of a parachute, beach ball, or conventional plastic-film high-altitude balloon. Gored balloons are formed by carefully cutting and connecting gores to form the balloon body, also known as the balloon envelope. Gores for these balloons are cut from rolls of film such as blown-extruded or cast-extruded plastic.

Gored balloons are fabricated on tables that are as long as the desired height of the balloon. Balloon film is dispensed from a roll at one end of the table and pulled, in some instances manually and in others with power assist, along the length of the table. For example, a balloon with an uninflated height of 30 meters (about 98 feet) requires a table of the same length. This in turn requires an indoor workspace at least that long. A table 60 meters 196 feet) long would be needed to fabricate a 60-meter balloon. Buildings that have been built for the purpose of making these balloons can be hundreds of feet long with no internal support posts or walls where the tables are located. Buildings that are not purpose-built are often not suitable.

After two or more gores have been laid out on a table, the balloon film must be tensioned. This can be done manually by pulling on the gores as they enter the sealing zone, or the entire lengths may be tensioned by taping or clamping them to the table. After the gores have been tensioned they may be heat sealed together by a traveling heat-seal head such as a track-controlled traveling band sealer or an overhead traveling impulse sealer.

SUMMARY

The Applicant believes that he has discovered several disadvantages and shortcomings of the methods and apparatus used to manufacture high-altitude balloons and of the resulting end products, including issues identified above and as follows.

Existing high-altitude balloons most often burst and leak their lifting gas at the heat-sealed seams joining the multitude of balloon panels. Embodiments of the present invention enable superior-strength extrusion bonded seams and even seamless coextruded balloon envelopes to be constructed. Many materials that would otherwise become superior high-altitude balloon envelope materials cannot presently be used due to these materials not being heat sealable or adhesive bondable, and thus multiple panels of these material cannot easily be hermetically joined together form a balloon. Embodiments of the present invention allow for superior high-temperature and high-pressure molten extrusion and coextrusion balloon panel bonding, and even seamless coextrusion bonding of balloon panel layers to enable non-heat sealable materials such as PET, fiber-reinforced composites and flexible glass, among many other materials, to now be used to build high-altitude balloon envelopes.

For example and without limitation, long tables and large amounts of floor space without interior supports in specially-built workshops are required; these are very costly. Once a manufacturing facility has been constructed to make balloons of a given size, reconfiguring it to make larger balloons is expensive and time-consuming. Pulling the film off of rolls and over the tables and tensioning it is also time-consuming and difficult to accomplish without wrinkling the film. Using a traveling heat-sealer for extended distances is also a slow process. Friction of layers of film sliding against each other during manufacture, and from repeated handling by human hands or by machine, can cause tiny openings ("pin holes") to be formed randomly in the balloon. When the balloon is inflated, gas leaks out through these pin holes and through defects resulting from wrinkling of the film prior to heat sealing, leading to a shortened time the balloon can stay aloft. Also, such defects can lead to catastrophic failure of the balloon. There is a need to reduce the costs of building and of reconfiguring the manufacturing facilities, to reduce the time needed to fabricate high-altitude balloons, to solve the problem of manufacturing defects such as wrinkling and pin holes, and to make larger balloons that existing manufacturing facilities can accommodate.

The term "coextrusion" means the simultaneous extrusion of multiple layers through a die. The multiple layers may be made from the same material, or they may be made from two or more different materials. Each individual layer may be made from only one material or it may be made from two or more different materials extruded side-by-side across the same layer.

Coextrusion layer "stacking" refers to coextruding one or more layers on top of one or more other layers, and "side-by-side" coextrusion herein refers to coextruding two or more different materials across a width of the same layer.

Embodiments of methods and apparatus disclosed herein allow for a plurality of balloon panels, in some embodiments all the panels of a balloon, to be simultaneously coextruded from a single die. These panels may be bonded to one another at alternating edges during the coextrusion process to form a three-dimensional balloon envelope upon inflation.

In some instances, instead of being limited by slow and complex traveling sealer heads to perform the seam sealing functions, balloon film layers can simultaneously be bonded together within a coextrusion die at speeds as great as 150 meters/minute according to embodiments of methods and apparatus described herein. The total manufacturing speed improvement is actually many times over the simple improvement in bonding speed. For example, a current balloon heat sealer may seal 50 balloon gores together, each 20 meters long, at a rate of 4 meters/minute for a total of 250 minutes spent sealing (this does not even take into account the substantial gore preparation time). If these same 50 panels are coextruded simultaneously at a rate of 20 meters/minute from a die, then a total of 1 minute is spent bonding/extruding. This means the total balloon panel bonding speed improvement is over 250× and not just the 5× speed differential between 4 and 20 meters/minute.

In some embodiments, methods and apparatus disclosed herein can reduce the needed floor space to fabricate a balloon. For example, to fabricate a 50 meter balloon by existing methods would require at least a 50 meter table, whereas only about 10 meters of floor space is required to coextrude 50-meter balloon panels, cool them down, and wind them onto a storage roll. Coextrusion allows for longer balloons to be made than have been practical heretofore. Moreover, as balloon rollstock film is typically rectangular in nature, excess film beyond the tapering gore seams is often cut either before, during, or just after sealing two gore lengths together, whereas according to embodiments disclosed herein most or all of the balloon panel layers are coextrusion bonded together and any excess is removed simultaneously after coextrusion.

Briefly and in general terms, a high-altitude balloon manufacturing apparatus according to some embodiments includes two or more extrudate dispensers, a first one of the extrudate dispensers having an input to receive a first extrudate material and a second one of the extrudate dispensers having an input to receive a second extrudate material, an extrusion die having one or more channels in fluid communication with the extrudate dispensers, the extrusion die having an extrudate outlet in fluid communication with the channels, a support disposed to receive coextruded layers of extrudate from the extrudate outlet and a cooler in thermal communication with the extrudate outlet. The cooler may comprise a chill roller and in some embodiments a nip roller. A power drive may be in mechanical communication with coextruded extrudate from the extrudate outlet, for example by coupling the power drive to one of the rollers.

Each extrudate dispenser may include a hopper; an extrusion screw disposed to receive extrudate from the hopper; and a heating element disposed adjacent the extrusion screw. A temperature controller may be provided for the heating element.

Some embodiments include a film dispenser and a dispenser roller disposed to receive separation film from the film dispenser and guide the separation film adjacent the extrudate outlet of the extruder. A friction brake may be coupled to the film dispenser. A tendon line dispenser may be in mechanical communication with the film dispenser. A tensioner may be included, disposed to apply mechanical tension to the separation film.

The extrudate outlet may be configured to dispense two or more layers of extrudate atop one another, or in other embodiments side by side.

A method of fabricating a high-altitude balloon according to some embodiments includes coextruding at least two adjacent continuous layers of extrudate, extrusion-bonding the layers of extrudate to one another along an edge of the sheets of extrudate to form a seam, and cooling the extrudate. The adjacent layers of extrudate may be extruded in a stack, one on top of the next.

In some embodiments extrusion-bonding the layers includes bonding a first layer of extrudate to an adjacent second layer along a first edge, bonding the second layer to an adjacent third layer along a strip spaced apart from the first edge, and continuing to bond successive layers, alternating between the first edge and the strip spaced apart from the first edge. A last layer may be bonded to the first layer along a second edge.

In some embodiments the adjacent layers of extrudate are extruded side by side. Some embodiments include dispensing a separation film between adjacent layers of extrudate. Some embodiments include dispensing a tendon line between two adjacent layers of extrudate.

Another embodiment of a method of fabricating a high-altitude balloon includes coextruding at least two adjacent continuous layers of extrudate, at least two of the layers being joined together without any seam along their entire lengths; and cooling the extrudate.

Embodiments of a high-altitude balloon include a plurality of layers of coextruded balloon panel extrudate, a first one of the layers extrusion-bonded to a second one of the layers along a first edge, the second one of the layers extrusion-bonded to a third one of the layers along a strip spaced apart from the first edge, extrusion-bonding of successive layers alternating between the first edge and the strip, the first one of the layers and the last one of the layers extrusion-bonded together along a second edge; and a plurality of layers of extruded delaminator, each layer of the extruded delaminator disposed between successive pairs of layers of coextruded balloon panel extrudate. In some embodiments an end cap is bonded to one of the edges of the coextruded balloon panel extrudate layers.

At least one tendon line may be disposed between two adjacent coextruded balloon panel extrudate layers. Some embodiments include at least one tendon line disposed on one side of one of the coextruded balloon panel extrudate layers and at least one tendon line disposed on an opposite side of the coextruded balloon panel extrudate layers.

In some embodiments the coextruded balloon panel extrudate comprises glass. In other embodiments other materials are used.

At least two simultaneously coextruded extrudate layers may be permanently bonded along one or more adjacent portions, and at least two simultaneously coextruded extrudate layers may be able to delaminate from one another along one or more non-permanently bonded adjacent portions to form a balloon envelope cavity.

A plurality of layers of extruded delaminator may be included in some embodiments, each layer of the extruded delaminator disposed between a different pair of the layers of coextruded balloon panel extrudate.

Another embodiment of a high altitude balloon has a plurality of layers of extrudate coextruded to form a seamless sheet of extrudate in a shape defining a balloon envelope. An endcap may be attached to an end of the balloon envelope. The extrudate may be selected from a heat-sealable polymer, a non-heat-sealable material, and glass.

An embodiment of a high-altitude balloon extrusion manufacturing apparatus includes an extrudate dispenser, a T-die extruder disposed to receive extrudate from the extrudate dispenser, a chill roller and a pressure roller disposed to receive extrudate from the T-die extruder, and a support having a generally planar supporting surface disposed to receive the extrudate from between the chill roller and the pressure roller. The extrudate dispenser may include a hopper; an extrusion screw disposed to receive extrudate from the hopper; and a heating element disposed adjacent the extrusion screw. Some embodiments include a temperature controller in communication with the heating element. A power drive such as an electric or hydraulic motor may be mechanically coupled to the extrudate, for example by driving the pressure roller.

In some embodiments the apparatus includes a film dispenser, a dispenser roller disposed to receive film from the film dispenser and guide the film toward the pressure and chill rollers, a downstream roller disposed to receive a layer of film and extrudate from the pressure and chill rollers, and an upstream roller disposed to guide the layer of film and extrudate under the film dispenser.

A friction brake may be coupled to the film dispenser to control dispensing of the film. A power drive such as an electric or hydraulic motor may be mechanically coupled to the pressure roller or to some other component to move the film and extrudate. Some embodiments include a tendon line dispenser in mechanical communication with the film dispenser to dispense a tendon line along with the extrudate.

A heat transfer mechanism may be provided to cool the chill roller and with it the extrudate. For example, the chill roller may be connected by suitable plumbing to a cold water reservoir, and a pump may be used to circulate cold water through the chill roller.

An embodiment of a method of manufacturing a high-altitude balloon includes (A) extruding a continuous sheet of material over itself to form a loop having an initial layer and a first overlying layer, both layers having first and second edges; (B) extrusion-bonding the initial layer to the first overlying layer along the first edges of the layers to form a seam; (C) continuing to extrude the continuous sheet of material over itself to form a next overlying layer having first and second edges; (D) extrusion-bonding the two top overlying layers along a strip spaced apart from the first edges of the first and next overlying layers to form a seam; (E) continuing to extrude the continuous sheet of material over itself to form a next overlying layer having first and second edges; (F) extrusion-bonding the two top overlying layers along the first edges of the layers to form a seam; (G) if more layers are desired, return to step (C); (H) extrusion-bonding the top overlying layer to the initial layer along the second edges of the layers to form a stacking-layer seam; and (I) separating the envelope by cutting across a width of the loop.

After step (I) the layers can be expanded, accordion-style, to form the balloon, as described in more detail elsewhere in this Specification.

Some embodiments include scoring the second layer between the second seam and the second edge of the second layer and separating the second edge of the second layer along the scoring line. Some embodiments include dispensing a separation film between two or more of the layers as they are being extruded. In some embodiments a tendon line, for example a spread-tow tendon line, is dispensed between two adjacent layers. After the balloon is formed, it may be capped.

In some embodiments film is continually extruded (or dispensed from rollstock). A split level conveyor system allows lines to be stacked on top of each other. Trimming may be done after bonding in one cut. Film thinner than that used in prior art balloons can be used because there is very little handling of the film during manufacture, minimizing any risk of damage to the film.

Hot molten material may be continuously extruded into a plurality of layers on top of each other. A balloon can be built in as little as one continuous manufacturing step because balloon material layers can be continuously extruded on top of preceding balloon material layers to build up an accordion of alternating-seamed extrusion bonded layers that can later deploy into a full balloon envelope. In one embodiment, a high altitude balloon larger than prior art balloons and with superior seam strength can be extruded from molten extrudate material into a finished balloon envelope in as little as one integrated manufacturing process.

Depending on the volume and shape of a high-altitude balloon, the type of materials used in its manufacture, the thickness of the balloon panels, any required pressure resistance, and the weight of the payload (among other factors), a balloon may require tendon lines (also called load lines or restraint lines) to strengthen the balloon envelope and help properly distribute payload weight. Tendon lines may be introduced to the high altitude balloon envelope either during extrusion balloon panel manufacture or after extrusion balloon panel manufacture has been completed.

The gores may be coupled together by extrusion bonding or in some embodiments by other methods such as heat sealing, sewing, adhesives, and the like.

Manufacturing coextruded and extruded high-altitude balloons according to the methods and apparatus described herein provides many advantages. Successive gores can be extruded and bonded at rates of 10 to 150 meters per minute as compared with only a few meters per minute according to prior-art methods of manufacture. Required floor space can be reduced as much as 90%. Air pockets do not form between layers, resulting in a smaller uninflated volume than can be achieved by other methods of manufacture. The gores have no tendency to curl before bonding. In some embodiments it is even possible to bond more than one seam at a time by employing selective bond-compatible surfaces. Defects discovered during manufacture can be removed by removing the defective part and re-extruding and bonding.

Embodiments of coextruded and extruded high-altitude balloons as described herein are nearly or entirely seamless, reducing any chance of leakage or sudden failure. Even zero-pressure and super-pressure balloons may be coextrusion-manufactured with near full and replicable automation and of larger sizes than have been practical heretofore.

Tensioning as the successive layers are bonded together is automatic because successive layers of extrudate continue to pass together through the apparatus. The gores remain flat and wrinkle-free on each other during bonding.

Plastics that are not easily heat-sealed after extrusion, for example polyester plastic film ("PET") can be used. This material, which is particularly prone to pin-hole damage when being handled by prior art methods, is not vulnerable to such damage when being made into balloons according to the embodiments described herein. The panels have no opportunity or tendency to slide over each other. Once extruded and bonded, the panels can be allowed to cool over a longer time and with no seam stress.

Properties of the molten plastic balloon extrudate exiting an extrusion T-die in some embodiments can be controlled in different ways. Firstly, the exit temperature and viscosity of the plastic can be controlled. Secondly, the volume and speed at which the plastic is extruded can also be set. Co-extrusion dies and multilayer feedblocks are able to combine a host of different extrudate material layers into a single co-extruded balloon panel, which allows for the very best characteristics (such as tensile strength, helium barrier, and the like) of each material type to be combined. In some embodiments the molten balloon panel extrudate is immediately cooled as it contacts a preceding balloon film layer and enters into a chill roller/pressure roll pair. In other embodiments the molten extrudate may remain at a specific heated temperature in order for it to chemically bond better to the following layer that will be extruded on top of it. If an additional film layer is dispensed before or at the same time of bonding (such as adding a thin PET layer separation film), then the molten plastic layer will be less likely to stick to chill/pressure rollers and web guiding rollers as it moves along in the manufacturing process. Depending upon such factors as the balloon material being extruded and the number and construction of balloon panel layers being extruded or fed into the manufacturing system, different extrusion temperatures, line speeds, dies and feedblocks, and chill/pressure roller layouts can be employed.

Curling and puckering do not occur with the methods and apparatus disclosed herein because the multiple balloon panels are coextruded together under extreme heat and pressure and cure together on a chill roll or nip roll pair. Extremely thin balloon films can be utilized because little to no human handling is required and more than one thin balloon film is simultaneously coextruded. The coextrusion process keeps the balloon panel layers from shifting on all their 3 axes rather than simply relying on traditional mechanical tension forces to keep balloon panels flat, which may overstretch the panel films.

Efficient coextrusion splicing of narrow panel layers into larger and wider sheet sections is desirable for various applications such as blimps, aerostats, general inflatables, tarps, geomembranes, storage bladders, agricultural covers, and the like. Other coupling methods may also be used, such as heat sealing, sewing, adhesive bonding, mechanical coupling, and the like to create wide and long webs and balloon envelopes from coextruded panels.

Many panel and gore shapes and sizes can be simultaneously coextruded. Two or more panel layers may be coextrusion bonded to one another at a variety of points along their web widths and lengths. Differing widths, lengths, and panel configurations of traditional and non-traditional balloon materials, tendon line and rollstock may be extrusion-bonded. Three or more layers can also be bonded to one another simultaneously. By using selective permanent bond compatible and permanent bond incompatible "stacking" and "side-by-side" layer positioning, for example, it is possible to be selective in which surfaces bond to which other surfaces even though many layers may be simultaneously coextruded together. Release tapes, incompatible bond coatings, incompatible bond laminates and other converting variations can create a numerous amount of alternative coextrusion spliced panel configurations.

Balloon manufacturing parameters can be predetermined and set to higher precision than has previously been possible. Vertical, horizontal, and lateral movement of the balloon panel extrudate and rollstock layers are held at a minimum, thus preventing wrinkles from forming and avoiding or minimizing other defects in balloon panel webs. The techniques disclosed herein can be used to manufacture a balloon as large as a sport stadium in flat stacked configurations which do not need to be opened up until inflation occurs, allowing them to be flatly wound onto holding spools after extrusion, improving storage, shipment, and balloon deployment.

Programmable logic controllers ("PLCs"), variable frequency drives, servo motors, and other related automation controller systems can control such factors as axis positions of the multi-layer coextrusion, speed of the coextrusion and coextrusion web, tension of the web, position and thickness of panel extrudate, position and bonding quality of the seams, and introduction of tendon lines. Because the coextrusion web is flat and practically air-gap free, continuous monitoring for pinholes and other panel irregularities is possible. Computer-controlled parameters can change panel shapes on the fly, introduce tendon lines with or without tendon line channels, trim the web edges, introduce balloon panel coatings, and wind up an entire coextruded balloon envelope for storage or shipping while avoiding folds or wrinkles.

Because of consistent flow of material and manufacturing operations, supervisory control and data acquisition ("SCADA") hardware and software can be used to track some or all manufacturing data points. Pre-printed lines and markings on the web can guide laser-scoring, feeding, bonding, trimming, and other process variables.

This brief summary recites some aspects of the disclosure, but other novel and advantageous aspects are disclosed. They will become apparent as this Specification proceeds. The scope of the invention is to be determined by the claims as issued and not by whether a claim addresses any or all issues noted in the Background or includes a feature included or not included in this Summary.

BRIEF DESCRIPTION OF THE DRAWINGS

FIG. 6A is a diagrammatic view of two or more balloon panels being simultaneously coextruded to form a high altitude balloon envelope;

FIG. 6B is a side view of the extrudate layer of FIG. 6A after curing and cooling;

FIG. 6C is a diagrammatic view of a seamless balloon panel extrudate flat die coextrusion lamination line;

FIG. 6D is a side view of a seamless balloon panel extrudate layer and a rollstock film sheet showing extrusion lamination bonding therebetween;

FIG. 7A is a diagrammatic view of a coextrusion stacking sub-layer flat die extrusion line;

FIG. 7B is a side view of the coextrusion bonding between a first extrudate sub-layer and a second extrudate sub-layer formed as in FIG. 7A;

FIG. 12A is a top view of an inflated coextruded high altitude balloon of the kind depicted in FIG. 10;

FIG. 12B is a side view of a tied-off-end cylinder coextruded high altitude balloon according an embodiment;

FIG. 12C is a side view of a tapering panel cylinder coextruded high altitude balloon according to an embodiment;

FIG. 19A is a diagrammatic view of a blown coextruded high altitude balloon line according to an embodiment;

FIG. 19B is a cross-sectional view of a cut-out portion of the blown coextruded high altitude balloon line of FIG. 19A;

FIG. 19C is a top view of the cut-out portion shown in FIG. 19B;

FIG. 20A is a cross-sectional view of an uninflated blown coextruded balloon within a balloon depicting an exterior balloon and an interior ballast balloon, according to an embodiment;

FIG. 20B is a front view of the balloon of FIG. 20A;

FIG. 22A is a cross-sectional view of a coextrusion curved die deckle in a half-open position;

FIG. 22B is a cross-sectional view of the coextrusion curved die deckle of FIG. 22A in a closed position;

FIG. 23A is a cross-sectional view of an uninflated cast-lobed coextruded high altitude balloon according to an embodiment;

FIG. 23B is a cross-sectional view of the balloon of FIG. 23A, partially inflated;

FIG. 23C is a cross-sectional view of the balloon of FIG. 23A, fully inflated;

FIG. 33A is a perspective view of a portion of a tendon line rope for use with a balloon according to an embodiment;

FIG. 33B is a perspective view of a spread-tow tendon line rope for use with a balloon according to an embodiment;

FIG. 33C is a perspective view of a partially-encapsulated spread-tow tendon line for use with a balloon according to an embodiment;

FIG. 33D is a side view of a partially-encapsulated spread-tow tendon line for use with a balloon according to an embodiment;

FIG. 33E is a side view of a spread-tow tendon line with a tendon line layer consistent web thickness gap filler for use with a balloon according to an embodiment;

FIG. 34A is a perspective view of a 360° looping stacked-extrusion balloon panel splicing line according to an embodiment;

FIG. 34B is a perspective view of multiple extruded balloon-panel layers as extruded from T-die 1006 of FIG. 34A;

FIG. 34C is a top view of an extruded spliced sheet of material according to an embodiment;

FIG. 49 is a flowchart illustrating another embodiment of a method of fabricating a high-altitude balloon according to an embodiment.

DETAILED DESCRIPTION

Figure 1A:
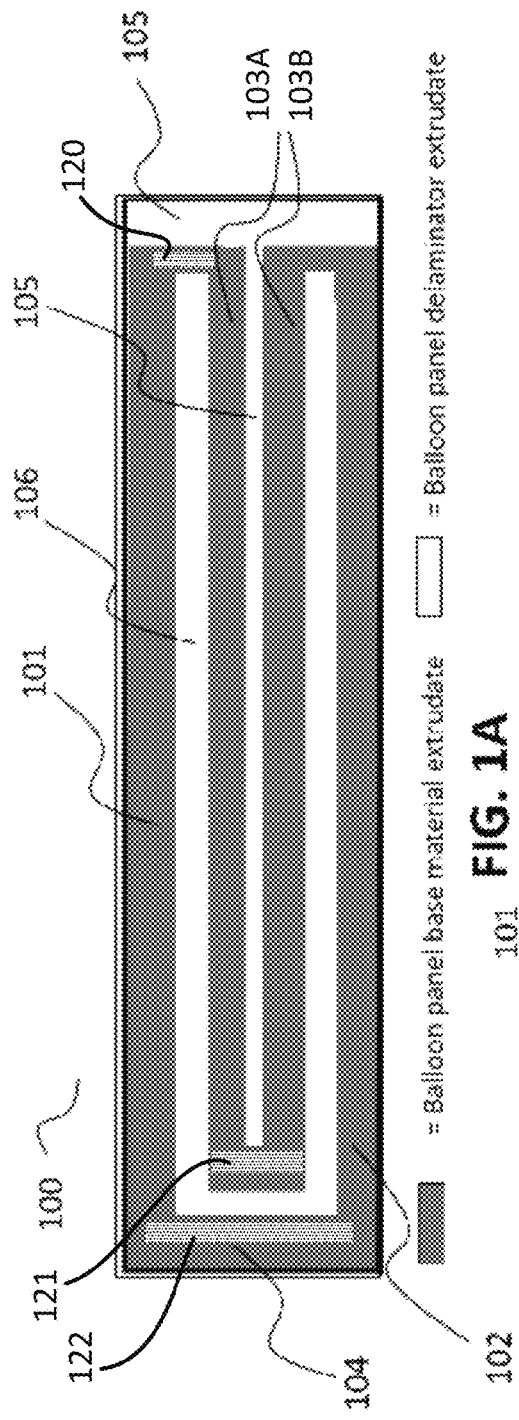
FIG. 1A is a cross-sectional view of an embodiment of an uninflated coextruded high altitude balloon with four panels.

This Detailed Description is illustrative of some embodiments. It is not limiting, however. For example, various features disclosed herein may be mixed and matched in differing ways, and they may be altered, including one or more differing components, as may be desired.

Unless otherwise indicated, the terms "a" and "an" mean "at least one," the words "including" and "having" are interchangeable with and mean the same as "comprising," and the word "or" indicates a disjunctive use such that, for example, "A or B" means A or B or both.

Unless otherwise indicated, all dimensions given in this Specification or in the Drawings are approximate and may be varied as desired. This description provides examples and does not limit the scope, applicability, or configurations in the claims. Changes may be made in the function and arrangement of elements discussed without departing from the scope of the disclosure. Various embodiments may substitute, omit, or add procedures or components as appropriate. Features described with respect to some embodiments may be combined in other embodiments.

FIG. 1A shows an uninflated coextruded high altitude balloon with four panels 100 according to the present disclosure. The uninflated balloon 100 has been simultaneously coextruded to include a top coextruded high altitude balloon panel 101, a bottom coextruded high altitude balloon panel 102, and two middle coextruded high altitude balloon panels 103 (identified as 103A and 103B in FIG. 1A). In order to form a fully enclosed balloon envelope, as compared to a wide spliced sheet for example, a top balloon panel to bottom balloon panel connector channel 104 is added. For illustrative purposes, the top balloon panel to bottom balloon panel connector channel 104 appears comparatively long in the drawings, but many balloon embodiments in actual practice may use a connector channel 104 many times shorter than the width of the balloon panels 101/102/103 themselves. In one embodiment for example, the top coextruded high altitude balloon panel 101 is 1 m wide. The entire balloon has 100 total coextrusion layers, each 0.003" (0.0762 mm) thick, meaning that the total length (depth) of the connector channel 104 is equal to or less than 0.3" 7.62 mm) thick which is only 0.762% of the top balloon panel 1 m width. The drawings do not show this scaling difference; rather, the drawing depicts balloon panels 101/102/103 roughly 3-5× longer than top/bottom panel connector channels 104, when the top/bottom panel connector channel is often comparatively much shorter (often less than 1% as long as the balloon panel) in certain embodiments.

The uninflated coextruded high altitude balloon with four panels 100 in FIG. 1A is able to deploy into a full balloon envelope by the delaminating of the balloon panels 101/102/103 from one another with the assistance of one or more non-encapsulated balloon panel delaminator extrudates 105 and encapsulated balloon panel delaminator extrudates 106. The balloon panel delaminator extrudates 105/106 can be made from many different materials and used in various pattern configurations, but their function is to ensure that the balloon panels 101/102/103 only permanently bond to one another at their appropriate (typically alternating) edges, and that the balloon panels 101/102/103 delaminate from one another along the remaining length of their panel widths. Only by largely delaminating away from one another can the balloon panels 101/102/103 deploy into a 3-D shape which forms the balloon envelope. If the balloon panels 101/102/103 do not permanently bond to one another at their appropriate edges or if they do not delaminate from one another along the remaining not-permanently-bonded lengths of their panel widths, then the open cavity within the balloon envelope will not develop.

In some embodiments the balloon panel delaminator extrudate 105/106 is made from a polymer that is chemically incompatible with the balloon base material extrudate. For example, if the balloon panel base material extrudate is linear low density polyethylene (LLDPE) and the balloon panel delaminator extrudate 105/106 is Teflon®, then the LLDPE balloon panel layers and the Teflon® delaminator layers will not permanently adhere to one another as the two polymers are chemically bond incompatible. It is well known in the art which polymer/non-polymer materials generally permanently bond to one another and which polymer/non-polymer materials do not bond to one another. In certain embodiments, however, a balloon panel base material extrudate and a balloon panel delaminator extrudate 105/106 may be partly or wholly chemically compatible. In one embodiment, the two extrudates are chemically compatible, but the balloon panel delaminator extrudate 105/106 easily breaks apart when placed under inflation stress. This can mean that in certain embodiments, upon inflation of a coextruded high altitude balloon, a portion of the balloon panel delaminator extrudate 105/106 may remain adhered, for example, to a top coextruded high altitude balloon panel 101 and another portion may peel/break away from its own layer and remain adhered to one of the middle coextruded balloon panels 103. Thus, it is possible for many different embodiments of balloon panel delaminator extrudates 105/106 to be used where a portion may adhere to a balloon panel 101/102/103 upon inflation or where no portion may adhere to a balloon panel during inflation. In some embodiments, balloon panel delaminators are not extrudates, but rather a coating (i.e. Teflon® coating) or other balloon panel delamination technology, that does not officially classify as an extrudate but serves the purpose of allowing the balloon panels to delaminate from one another where they are not permanently bonded in order for a balloon envelope cavity to develop upon inflation.

The uninflated coextruded high altitude balloon with four panels 100 may be a seamless high altitude balloon where the random polymer chains of the original polymer extrudate mixture are not interrupted. Most polymers are strongest and most flexible when their molecular chains are well mixed together and orient in a random fashion, feats nearly impossible to achieve during gore-to-gore bonding with prior high altitude balloon manufacturing technologies. In some embodiments, balloon panel base extrudate polymer chains can be mixed together at high temperatures and pressure within an extruder barrel by way of an extrusion screw. Under these optimally mixed polymer chain conditions, this "ideally mixed balloon panel extrudate" can enter a continuous die pattern (no seams for balloon base panel extrudate pattern) and simultaneously coextrude all of the balloon panels 101/102/103 together along with balloon panel delaminator extrudates 105/106 to form a seamless coextruded high altitude balloon.

In alternative embodiments, coextruded high altitude balloons with "extrusion seams", that is to say micro-seams resulting from a divergence and rejoining of the "ideally mixed balloon panel extrudate", are also possible. It may not be necessary or desirable to create a seamless balloon envelope. For example, when using multiple balloon panel sub-layers such as LDPE-EVOH-LDPE or the like, there may need to be a layer multiplying effect completed inside a feedblock or other layer die diversionary technology that temporarily separates a portion of the extrudate from itself and joins the portions back together either with itself or with other extrudate material layers. Because the diverted extrudate layers are still held in a molten state at high temperatures, and often rejoin under some amount of pressure, the resulting polymeric chain bond is far superior to a traditional heat sealing of two already formed and cured polymer sheets, for example, as is typically employed in the art of high altitude balloon assembly. The seamless balloon coextrusion method, where the "ideal" balloon panel extrudate material never fully separates/diverts from itself (nor has to rejoin) is the method that provides the most uniform polymeric chain bonding of balloon panels which effectively compiles the various balloon panels into one continuous balloon skin.

Some embodiments comprise a plurality of layers of coextruded balloon panel extrudate, the top layer 101 extrusion-bonded to a first one 103A of the middle layers along a first edge 120 of the top layer 101 and the layer 103A, the layer 103A extrusion-bonded to a second one 103B of the middle layers along an area (a strip) 121 of the middle layers 103A and 103B spaced apart from the first edge 120, extrusion-bonding of successive layers alternating, and the top layer 101 and the bottom layer 102 extrusion-bonded together along a second edge 122 of the top layer 101 and the bottom layer 102. A layer 106 of extruded delaminator is disposed between the top layer 101 and the middle layer 103A, and successive layers of delaminate are disposed between successive layers of balloon panel extrudate such that adjacent layers of balloon panel extrudate are separated from each other (except where they are bonded together) by a layer of delaminate.

Figure 1B:
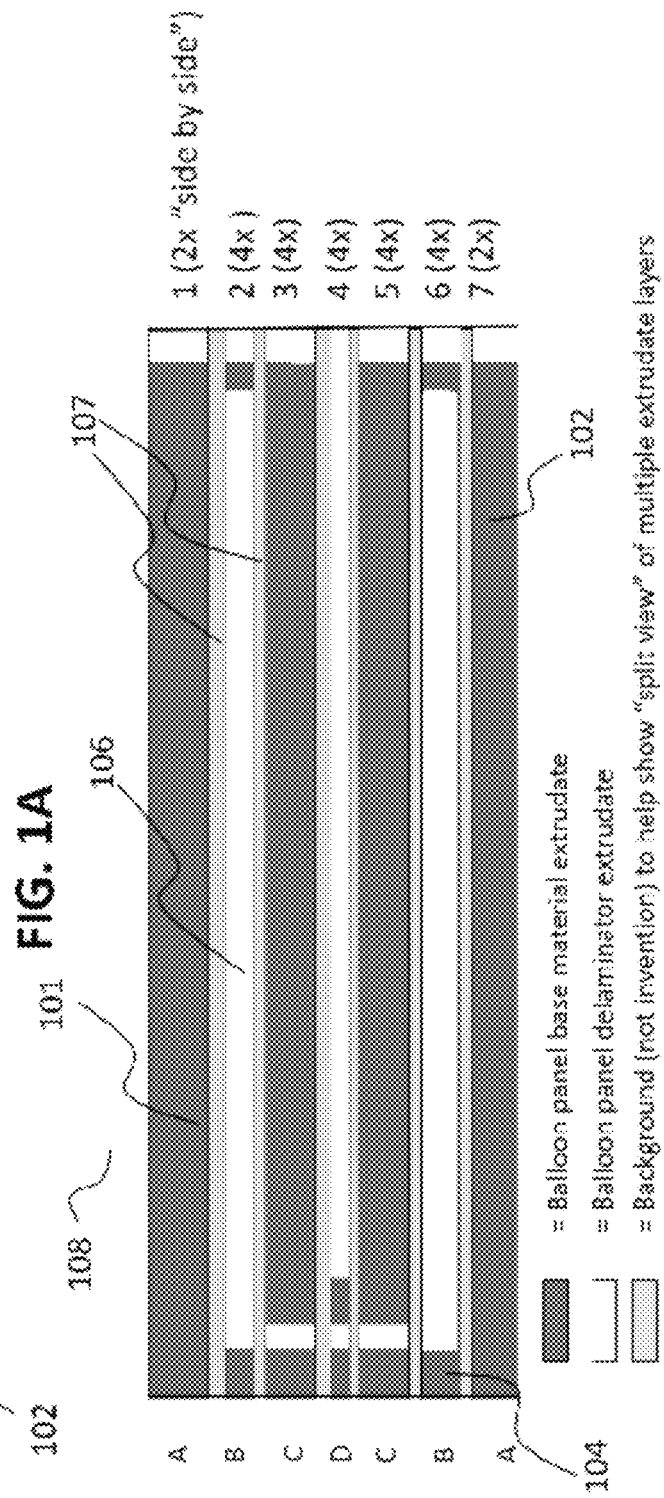
FIG. 1B is a cross-sectional split-layer view of the balloon of FIG. 1A.

FIG. 1B shows a "split layer view" of a coextruded high altitude balloon with four panels extrusion die 108 according to embodiments of the present disclosure. A light grey background behind the die layers was added to help show the "split view" of multiple extrudate layers 107, and thus the light grey background 107 is not part of the illustrated embodiment. The coextruded high altitude balloon die 108 may be made up of individual layers here labeled in repetitious patterns by A, B, C, and D letters. The coextruded high altitude balloon die 108 may also be made of other layer configurations or by no individual layers at all, that is to say from a continuous mold with no individual layering parts.

FIG. 1B illustrates how repetitious coextrusion layer patterns can be found in some embodiments. The numbers 1-7 in FIG. 1B represent the sequential layer numbers, and the 2× and 4× symbols represent the number of side-by-side sub-layers across the width of that given layer. For example, the top coextruded high altitude balloon panel 101 is layer #1 and the bottom coextruded high altitude balloon panel 102 is layer #7, both represented as layer patterns A. Both the top and bottom balloon panel layers 101/102 have similar side-by-side coextrusion layer structures, with the balloon panel base material extrudate taking up a large portion of the layer width and the non-encapsulated balloon panel delaminator extrudate 105 taking up a small portion of the layer width. Layers #2 and #6 (represented as layer pattern B) are also similar side-by-side coextrusion layer structures, with two small balloon panel base extrudate portions, one small non-encapsulated balloon panel delaminator portion 105 and one large encapsulated balloon panel delaminator portion 106. The coextrusion balloon die 108 may or may not have individually stacked layer die segments that combine to create the full die, but repetitious patterns may be present in some embodiments.

Figure 2:
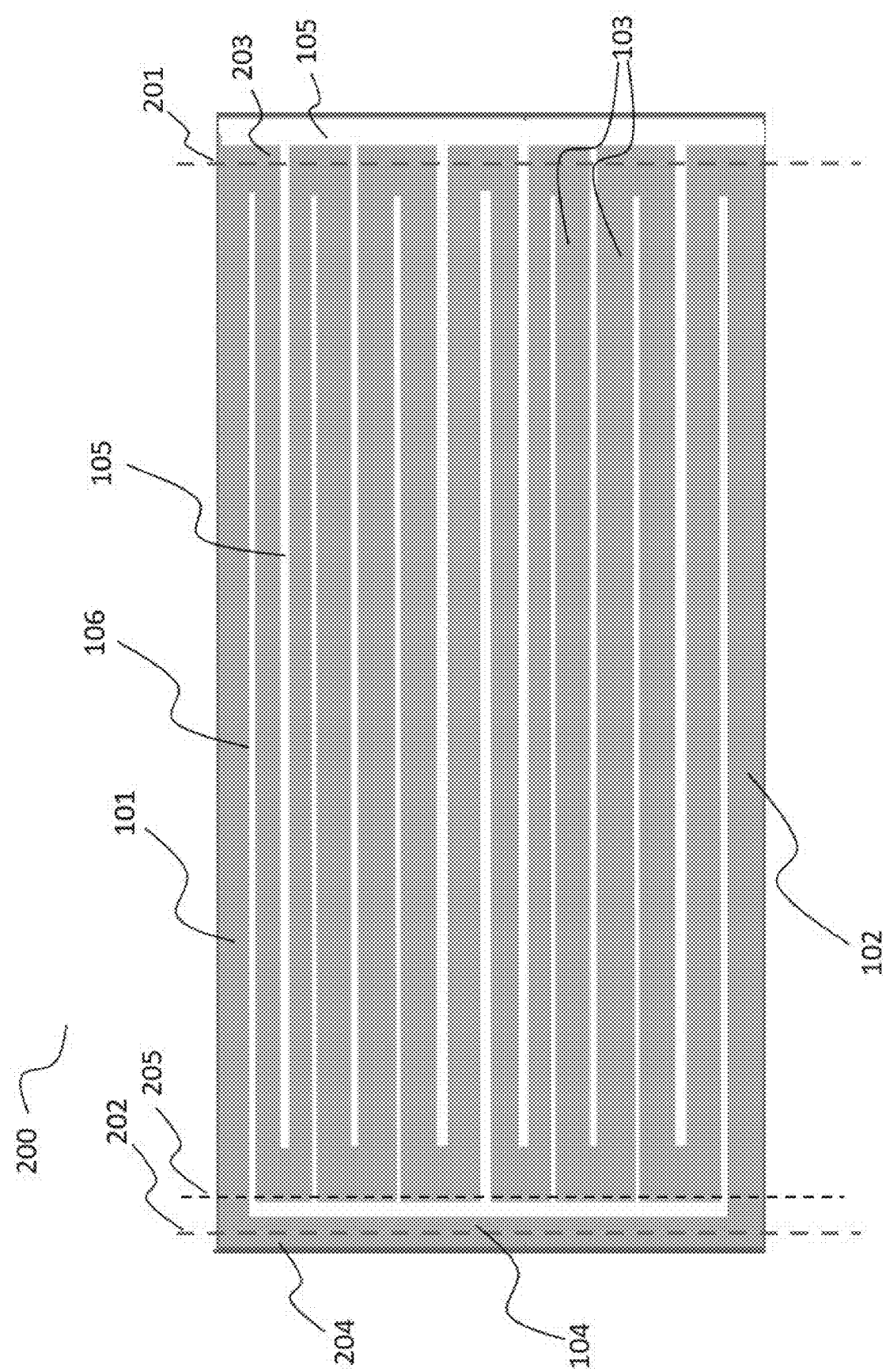
FIG. 2 is a cross-sectional view of an embodiment of an uninflated coextruded high altitude balloon with fourteen panels.

FIG. 2 shows an uninflated coextruded high altitude balloon with fourteen panels 200 according to the present disclosure. The uninflated 14 panel coextruded balloon 200 has been simultaneously coextruded to include a top coextruded high altitude balloon panel 101, a bottom coextruded high altitude balloon panel 102, and twelve middle coextruded high altitude balloon panels 103. A top balloon panel to bottom balloon panel connector channel 104 is added to enclose the balloon envelope. The use of an encapsulated balloon panel delaminator extrudate 106 and a non-encapsulated balloon panel delaminator extrudate allow for the balloon panels 101/102/103 to delaminate from one another to create the balloon cavity upon inflation.

After the uninflated 14 panel balloon 200 has been coextruded, the right balloon edge trim waste 203 can be removed by trimming balloon 200 at right balloon edge trim line 201. The left balloon edge trim waste 204 can be removed by trimming coextruded balloon 200 at left balloon edge trim line 202. In one embodiment, a wide spliced sheet is desired in place of a balloon envelope, and thus the wide spliced sheet can be made by trimming coextruded balloon 200 at left balloon edge trim line 205 to remove the left balloon edge trim along with the top balloon panel to bottom balloon panel connector channel 104.

Figure 3:
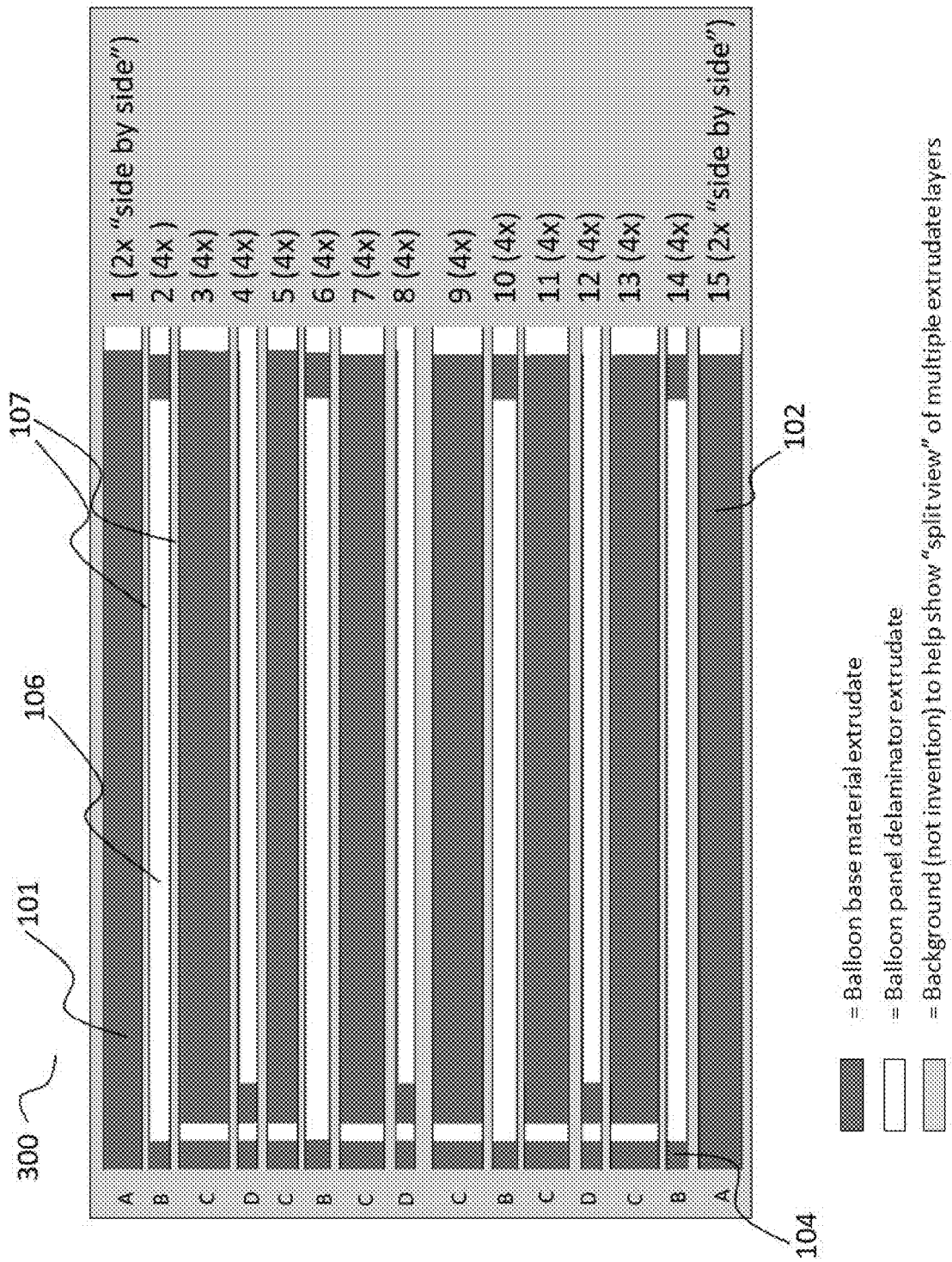
FIG. 3 is a cross-sectional split layer view of the balloon of FIG. 2.

FIG. 3 shows a "split layer view" of a coextruded high altitude balloon with fourteen panels extrusion die 300. Some embodiments of the coextruded high altitude balloon with fourteen panels extrusion die 300 are similar to embodiments of the coextruded high altitude balloon with four panels extrusion die 108 shown in FIG. 1B, but FIG. 3 shows more repetitious extrudate layer pattern instances, following the structure of A, B, C, D repetition. In one embodiment, the top balloon panel 101 and the bottom balloon panel 102 have two side-by-side coextrusion layers across their layer widths, and the middle balloon panel layers 103 have three different variations of four side-by-side coextrusion layer patterns across their widths. Alternative embodiments may discard part of the right side non-encapsulated balloon panel delaminator extrudate 105 so that the top and bottom balloon panels 101/102 only have one side-by-side extrudate layer and the middle balloon panels 103 have three variations of only three side-by-side balloon panel layers. Many other stacking layer and side-by-side layer coextrusion configurations exist to create coextruded high altitude balloons, and thus the embodiments discussed in this application are illustrative and not all-inclusive. Alternative stacking and side-by-side coextrusion configurations may be used.

Figure 4:
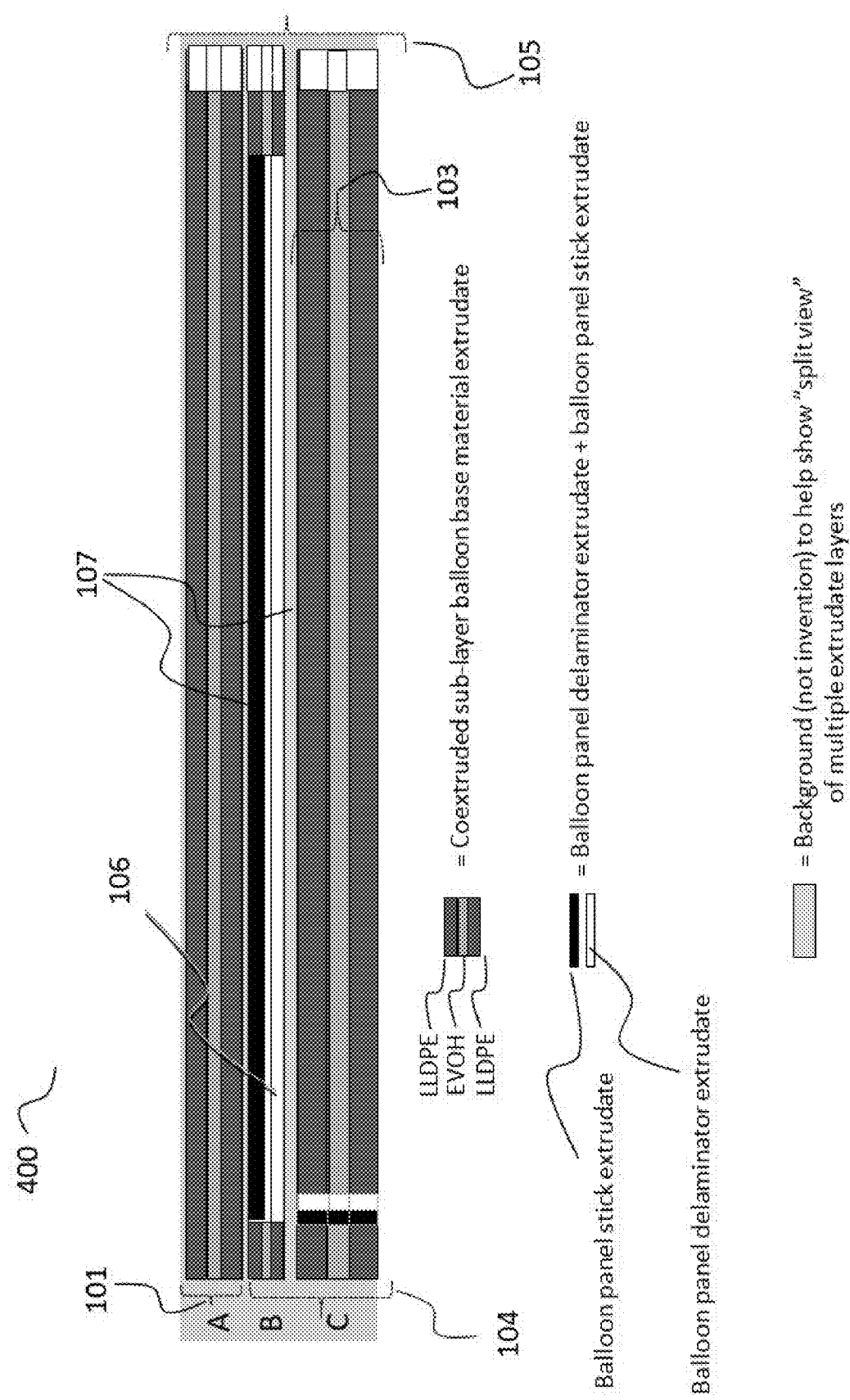
FIG. 4 is a cross-sectional split layer view showing the top three layers of a coextruded high altitude balloon with three stacked sub-layers within each individual coextrusion balloon panel layer.

FIG. 4 shows the top three layers of a "split layer view" of a coextruded high altitude balloon extrusion die, with three stacked sub-layers within each individual coextrusion balloon panel layer 400. In one embodiment, the top three layer split-view in FIG. 4 400 is comparable to the "split layer view" of a coextruded high altitude balloon with fourteen panels extrusion die 300 in FIG. 3, however, FIG. 4 illustrates a top balloon panel 101 with three sub-layers rather than just a mono-layer. In one embodiment, the top balloon panel 101 is made up of coextrusion sub-layers including a top LLDPE sub-layer, a middle EVOH sub-layer, and a bottom LLDPE sub-layer. The middle balloon panel (s) 103 and top/bottom panel connector channel 104 are also made up of one or more coextrusion sub-layers including a top LLDPE sub-layer, a middle EVOH sub-layer, and a bottom LLDPE sub-layer. In alternative embodiments any of the balloon panel layers (mono layer), balloon panel sub-layers (multi-layer), and balloon panel delaminator layers may consist of polyester (PET), Nylon, Nylon 6, polyethylene (PE), LDPE (low density polyethylene), LLDPE (linear low density polyethene), PU (polyurethane), Teflon®, EVA, EMA, Acid Copolymer, Sodium Ionomer, Zinc Ionomer, TIE adhesion, paper, wax, grease, aluminum and other metals, glass, composite reinforced polymers (such as polymers with carbon fiber, fiberglass, Zylon® fiber, Kevlar® fiber, Integra® fibers or the like), graphene, vinyl, polypropylene (PP), polystyrene, PVC, butyrate, PETG, ABS, barrier layers and coatings, nano-composites, PVDC, AlOx, SiOx, among many more polymer, non-polymer, metallic, non-metallic, UV blocking or capturing, IR blocking or capturing, and gas barrier materials, among other materials suitable for coextruded high altitude balloon manufacture.

FIG. 4 shows an embodiment of a non-encapsulated balloon panel delaminator extrudate 105 made up of three sub-layers of the same material. It may be desirable to remain consistent with the number of sub-layers across a given layer width, and thus if one introduces three sub-layers for the balloon panel extrudate layers, it may be desirable to also have three layers for the encapsulated and non-encapsulated balloon panel delaminator extrudates 105/106. In another embodiment, the number of sub-layers between the balloon panel extrudate and the encapsulated or non-encapsulated balloon panel delaminator extrudates 105/106 are different.

FIG. 4 shows one embodiment where the encapsulated balloon panel delaminator extrudate 106 is made up of three stacking coextruded sub-layers. The top sub-layer is made from an extrudate that will permanently adhere to the top balloon panel 101 surface, and the bottom two sub-layers are made from an extrudate that will delaminate either from the top layer, delaminate from the middle balloon panel 103 below, delaminate from itself, or simply break apart from itself under balloon inflation stress. There are many layer material and pattern possibilities for the encapsulated and non-encapsulated balloon panel delaminator extrudates 105/106, however their most important purpose is to make sure the individual balloon panel layers largely delaminate away from one under upon inflation. It may be desirable for at least a portion of the encapsulated or non-encapsulated balloon panel delaminator extrudate(s) 105/106 to adhere to at least a portion of one or more balloon panels. In other embodiments it may be desirable for the entirety of the encapsulated or non-encapsulated balloon panel delaminator extrudates 105/106 to completely delaminate from the balloon panels.

Figure 5:
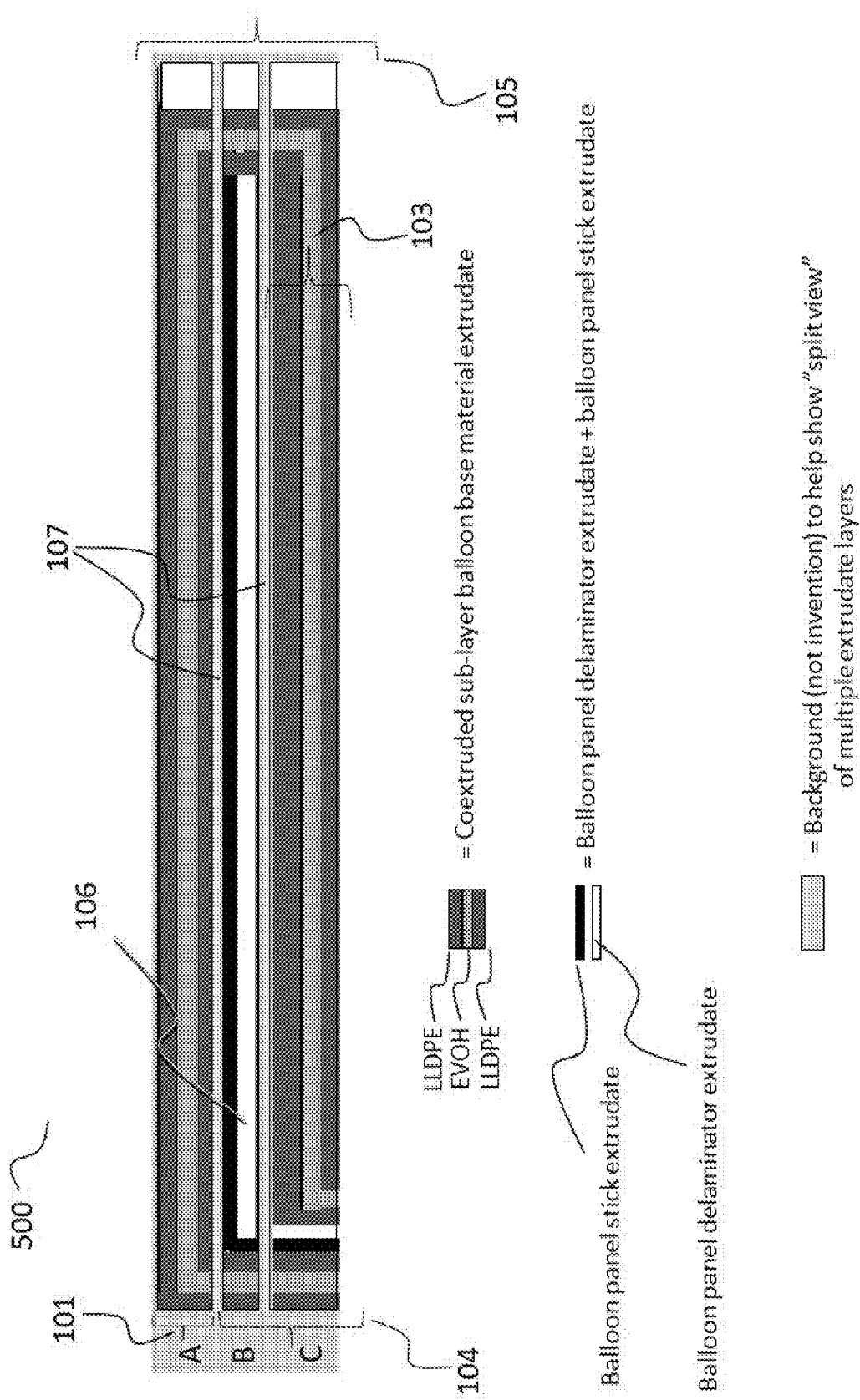
FIG. 5 is a cross-sectional split layer view showing the top three layers of a coextruded high altitude balloon with three continuous sub-layers within each individual coextrusion balloon panel layer.

FIG. 5 shows the top three layers of a "split layer view" of a coextruded high altitude balloon extrusion die, with three continuous sub-layers within each individual coextrusion balloon panel layer 500 according to the present disclosure. In one embodiment, FIG. 5 is similar to FIG. 4 in comprising coextrusion sub-layers that make up each major balloon panel layer. However, FIG. 5 differs from FIG. 4 in that each coextrusion sub-layer is continuous in nature (i.e. the other extrudate layers do not intersect a given extrudate's continual flow) and can allow for coextruded multi-layer, seamless high altitude balloons to be manufactured. FIG. 5 can also be compared to a balloon within a balloon embodiment 1400 shown in FIGS. 14A and 14B, except that the exterior and interior balloon panel delaminator extrudate 1405 can be replaced with one or more other balloon panel extrudates, such as EVOH or EVOH-LLDPE among other extrudate combinations.

FIGS. 6 and 7 illustrate several alternative coextrusion balloon panel bonding methods that may be employed. FIGS. 6 and 7 are mostly for explaining how to obtain strong polymeric random chain bonds between the two or more balloon panel layers, and thus the encapsulated and non-encapsulated balloon panel delaminator extrudates 105/106 are not shown. The extrudates in FIGS. 6 and 7 may initially look like single sheets being extruded, however, these figures actually represent two or more balloon panels being simultaneously coextruded to form a high altitude balloon envelope and the resulting chemical bond between a balloon panel layer and another layer(s) adjacent to it.

FIG. 6A shows a seamless balloon panel extrudate flat die coextrusion line 600. In one embodiment, the balloon panel extrudate is fed into the flat extrusion T-die head 603 from a balloon panel extrudate feed system 602 and through the extruder T-die lips 604 to form a multi-layer coextruded balloon "melt curtain" 605. The encapsulated and non-encapsulated balloon panel delaminator extrudate 105/106 is not shown, but it would also be extruded in conjunction with the seamless balloon panel extrudate layers. The coextruded balloon "melt curtain" 605 passes through a chill roll 607 and nip roll 606 pair to achieve a cooled and cured seamless coextrusion balloon panel to panel bond 610. The seamless cured balloon panel bond 610 is able to remain seamless in one embodiment due to the fact that the base balloon panel extrudate never separates from itself, but instead forces an "ideally mixed balloon panel extrudate" through continuous balloon panel die channels into the required balloon die pattern without extrudate flow interruption or deviation.

FIG. 6B shows a cured and cooled seamless balloon panel extrudate 610. Because the "ideally mixed balloon panel extrudate" was forced through continuous (non-interrupted) die channels connecting multiple balloon panel layers, the cured and cooled seamless balloon panel extrudate 610 remains in an ideal molecular chain configuration where maximum balloon panel to balloon panel bonding strength, joint flexibility, elasticity, and gas barrier properties are achieved.

FIG. 6C shows a balloon panel extrudate flat die coextrusion lamination line 601. In one embodiment, the balloon panel extrudate is fed into the flat extrusion T-die head 603 from a balloon panel extrudate feed system 602 and through the extruder T-die lips 604 to form a multi-layer coextruded balloon "melt curtain" 605. The encapsulated and non-encapsulated balloon panel delaminator extrudate 105/106 is not shown, but it would also be extruded in conjunction with the seamless balloon panel extrudate layers. The coextruded balloon "melt curtain" 605 extrudes on top of a rollstock film sheet 609 unwound from an unwinder 608), and together the melt extrudate and rollstock sheet pass through a chill roll 607 and nip roll 606 pair to become a coextrusion lamination.

FIG. 6D shows the extrusion lamination bond between a balloon panel extrudate layer and a rollstock film sheet 611. Since the balloon extrudate melt curtain 605 contacts the rollstock sheet 609 at a high temperature, and the two are compressed together between the chill roll 607 and/or nip roll 606 pair, a strong bond can often be obtained where random polymeric chains of the two substrates are able to intertwine with one another. While the bond quality of this method of extrusion lamination is often far superior to the typical heat sealing of already cured and cooled balloon film sheets as currently employed in the state of the art, the fact that the balloon extrudate melt curtain 605 and rollstock sheets' 609 respective polymer chains are not able to mix together inside an extrusion barrel with a churning extrusion screw like the "ideally mixed balloon panel extrudate" scenario, a limit to the strength and elasticity of the resulting bond as shown in FIG. 6D will always exist as compared to the seamless chemical bond scenario shown in FIG. 6B.

FIG. 7A shows a coextrusion stacking sub-layer flat die extrusion line 700. In one embodiment, the balloon panel extrudate A is fed into the flat extrusion T-die head 603 from a balloon panel extrudate feed system 602 simultaneously as the balloon panel extrudate B is fed into the flat extrusion T-die head 603 from a balloon panel extrudate feed system 701. The balloon panel extrudates A and B converge together either right before or right at T-die lips 604 to form a stacking sub-layer coextruded balloon "melt curtain" 605. The encapsulated and non-encapsulated balloon panel delaminator extrudate 105/106 is not shown, but it would also be extruded in conjunction with the seamless balloon panel extrudate layers. The stacking sub-layer coextruded balloon "melt curtain" 605 passes through a chill roll 607 and nip roll 606 pair to become a cured and cooled stacking sub-layer coextrusion high altitude balloon such as partially shown in FIG. 4 for example.

FIG. 7B shows the coextrusion bonding between a first extrudate sub-layer A and a second extrudate sub-layer B. Given that the first extrudate sub-layer A and the second extrudate sub-layer B make contact at a high temperature before becoming a combined "melt curtain" 605, embodiments of FIGS. 7A-7B are typically able to achieve greater layer bonding strengths than embodiments of FIGS. 6C-6D (extrudate to rollstock lamination bond) given all other bonding factors remain the same. Embodiments of FIGS. 6A-6B, however, can typically achieve stronger bonding strength than even FIGS. 7A-7B due to the fact that the multiple extrudates in FIGS. 7A-7B were not able to mix together inside an extrusion barrel with a churning extrusion screw like the "ideally mixed balloon panel extrudate" seamless scenario shown in FIGS. 6A-6B.

In some embodiments, combinations of different coextrusion bonding methods and configurations are possible. For example, as shown in FIG. 5, continuous (seamless) sub-layers are possible within each individual coextrusion balloon panel layer. This mixes methods between FIGS. 6A-6B and FIGS. 7A-7B where each individual sub-layer is seamlessly mixed and extruded, but each seamless sub-layer is not seamlessly bonded to other seamless sub-layers, and rather the multiple seamless sub-layers come into co-extrusion contact just before they join into a combined extrudate melt curtain 605.

In one embodiment, a seamless coextruded high altitude balloon envelope is constructed in order to meet a particular standard of balloon panel-to-panel bond strength, high gas barrier, high elasticity, among other design requirements that traditionally heat sealed high altitude balloon envelopes may not achieve. In another embodiment, a seamless coextruded high altitude balloon envelope, an extrusion laminated balloon envelope, and a coextrusion stacked sub-layer high altitude balloon are constructed to meet a particular standard of balloon panel to panel bond strength, high gas barrier, high elasticity, among other design requirements that heat sealed or other traditionally bonded high altitude balloon envelopes may not achieve. In another embodiment, a coextruded balloon panel envelope is constructed in order to meet a particular standard of balloon panel-to-panel bond strength, high gas barrier, high elasticity, among other design requirements that heat sealed or other traditionally bonded high altitude balloon envelopes cannot achieve.

Figure 8:
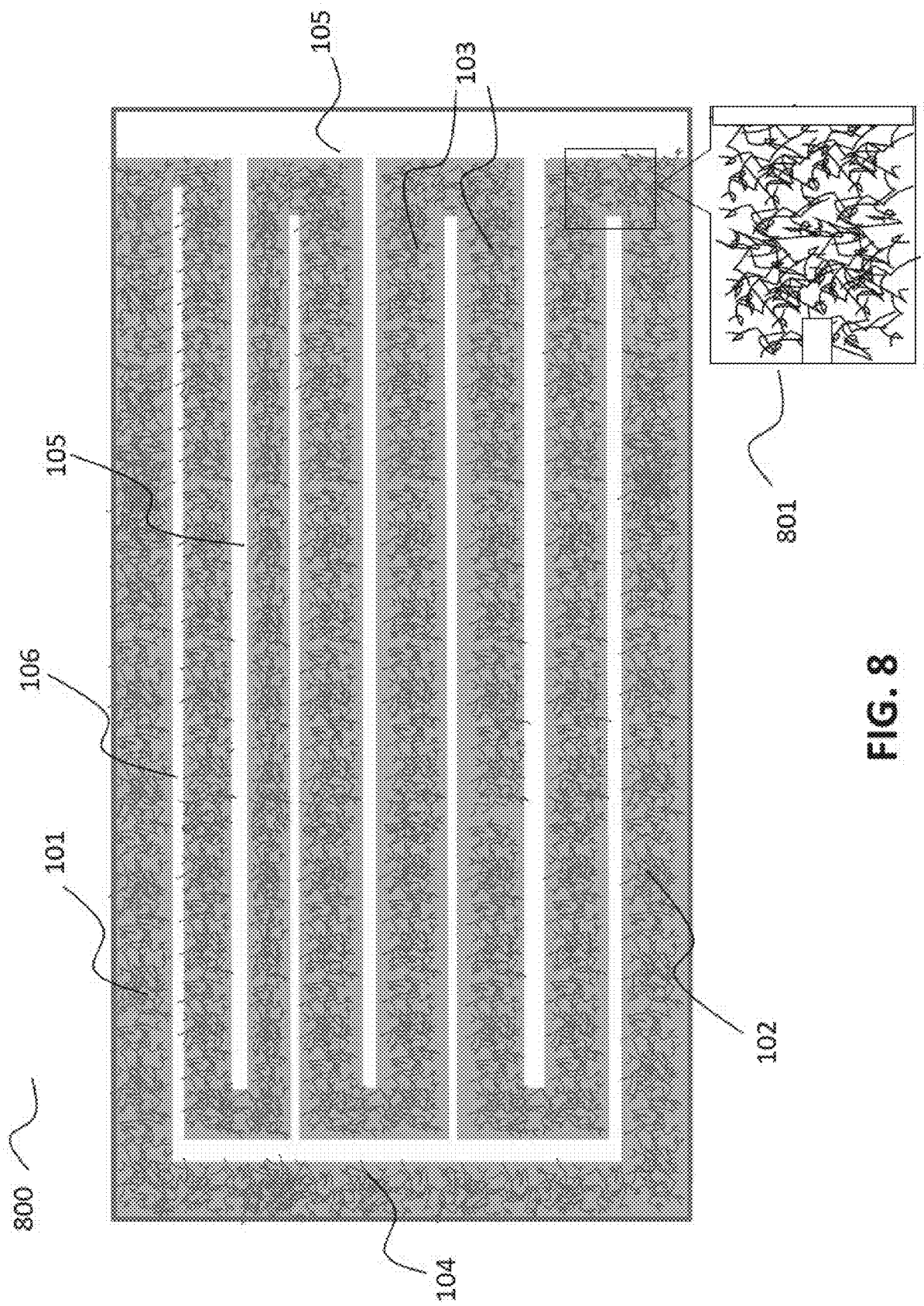
FIG. 8 is a cross-sectional view of a continuous random polymer chain (seamless) coextruded high altitude balloon with eight panels according to an embodiment.

FIG. 8 shows a continuous random polymer chain (seamless) coextruded high altitude balloon 800. FIG. 8 also shows a close up view of (seamless) continuous random polymer chain balloon panel joint bonds 801, that is to say a seamless joining of one balloon panel to another balloon panel as if the two balloon panels were made from one continuous polymeric skin. Seamlessly coextruding top balloon panels 101, middle balloon panels 103, bottom balloon panels 102, and top balloon panel to bottom balloon panel connector channels 104 together allows for superior balloon pressure resistance, better balloon gas barrier resistance, and for hard to bond polymers and non-polymers materials to be leveraged as envelope substrates in the ballooning industry. In one embodiment, an entire seamless high altitude balloon may be made from a polyester (PET) extrudate without the need of any gore seaming tapes as is commonly required in the industry. In another embodiment, a seamless aluminum high altitude balloon (combined with other metallic or non-metallic balloon layers) is possible. In another embodiment, a seamless graphene balloon may be constructed.

An alternative embodiment provides a flexible glass high altitude balloon. German glassmaker Schott® and US-based Corning®Willow®, among other glass manufacturers offer ultra-thin bendable/flexible glass materials reaching in downwards of 10 microns thickness that can be coextruded into a high altitude balloon envelope. For a flexible glass high altitude balloon envelope, the coextrusion dies are purpose made for molten glass extrusion and must withstand upwards of 1400 Celsius to 1600 degrees Celsius (and over) processing temperatures. Glass material is especially mixed and heated up to a molten state, passed down a glass down-draw system through a multilayer die, further passes an annealing furnace, and the coextruded glass balloon layers cool down to become an uninflated coextruded glass high altitude balloon envelope. The glass balloon's encapsulated and non-encapsulated balloon panel delaminator layers are made from materials that can withstand the high glass processing temperatures and provide the main function to ensure that the glass balloon panels 101/102/103 only permanently bond to one another at their appropriate (typically alternating) edges, as well ensure that the panels 101/102/103 delaminate from one another along the remaining length of their panel widths. Upon inflation, the multiple coextruded and stacked glass panels largely delaminate from one another to create a glass balloon envelope cavity.

Figure 9:
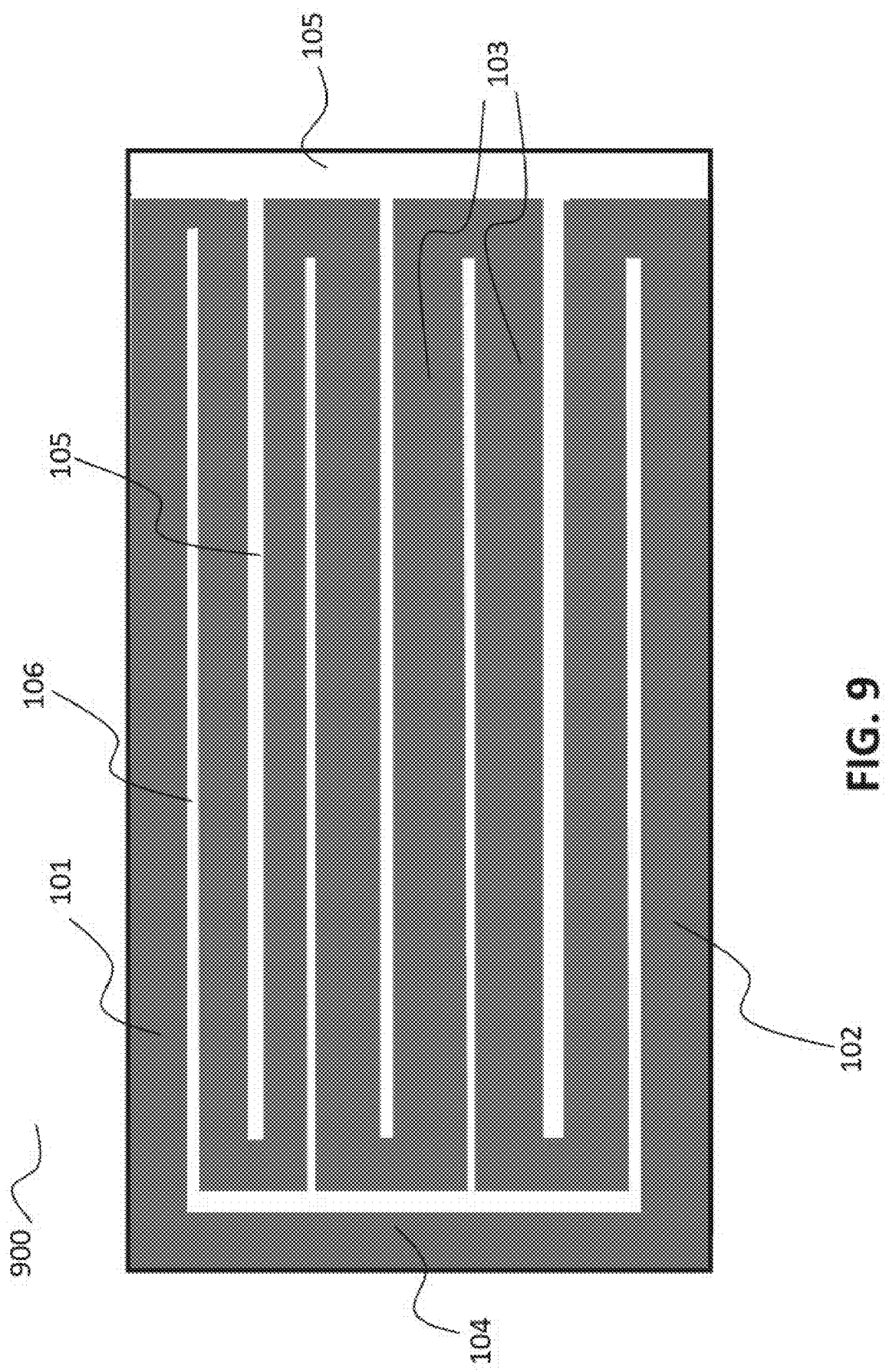
FIG. 9 is a cross-sectional view of an uninflated coextruded high altitude balloon with eight panels according to an embodiment.

FIG. 9 shows an uninflated coextruded high altitude balloon with eight panels 900. Some embodiments are based in part on this uninflated coextruded high altitude balloon with eight panel 900 layer stacking and side-by-side coextrusion configurations.

Figure 10:
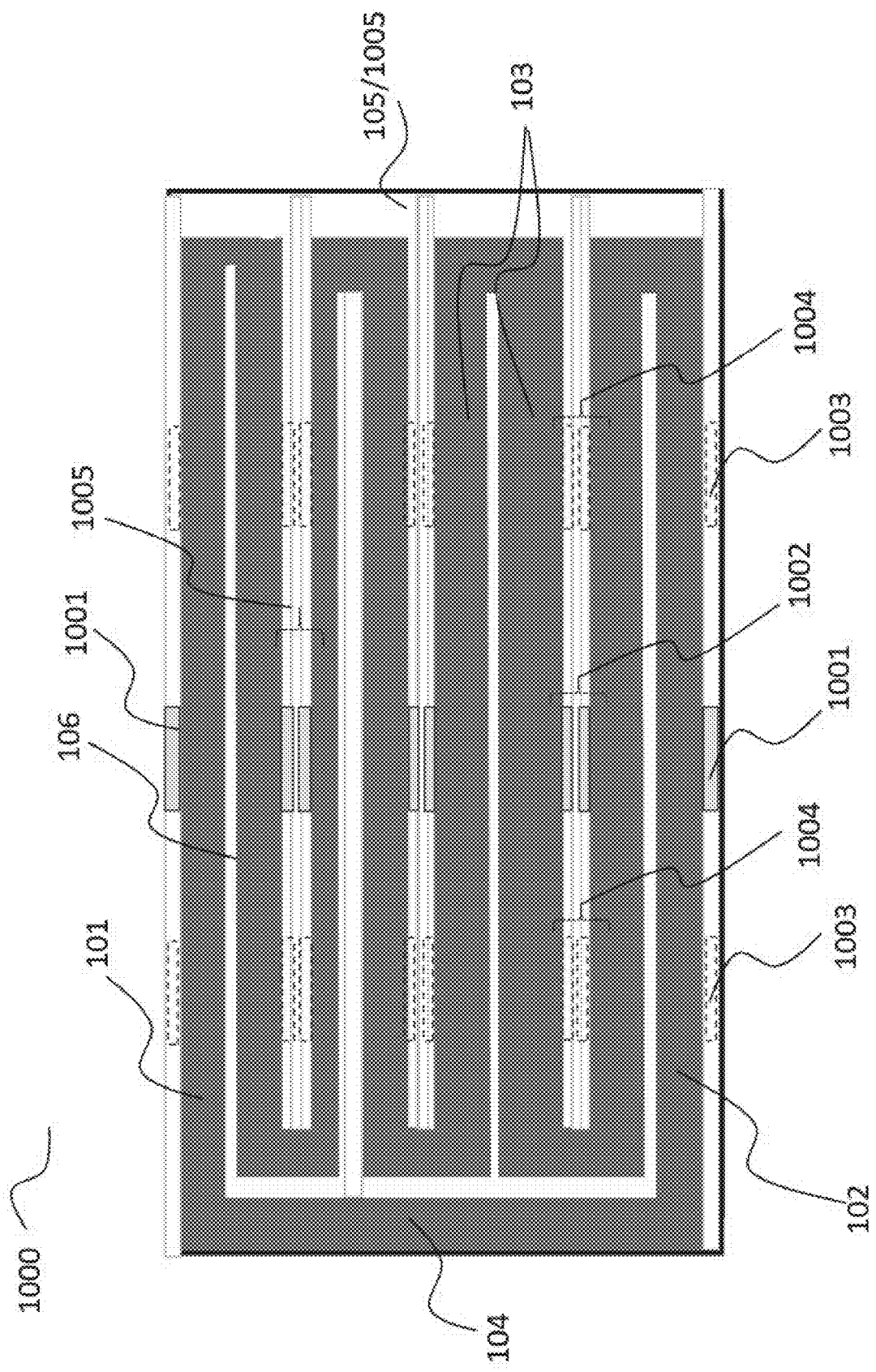
FIG. 10 is a cross-sectional view of an uninflated coextruded high altitude balloon with eight panels and including panel centered tendons according to an embodiment.

FIG. 10 shows an uninflated coextruded high altitude balloon with eight panels, with panel centered tendons 1000. The encapsulated balloon panel delaminator extrudate channels 106 touch the inside of the balloon envelope surface and the non-encapsulated balloon panel delaminator extrudate channels 105/1005 touch the outside of the balloon envelope surface. In one embodiment, in order for all of the panel centered balloon tendons 1001/1002/1003/1004 to deploy on the exterior of the eight panel coextruded balloon 1000 when inflated, one single panel centered tendon 1001/1003 is located above the top balloon panel 101 and one single panel centered tendon 1001/1003 is located below the bottom balloon panel 102. The dual delaminating tendons 1002/1004 are located on, inside or adjacent the multilayer non-encapsulated balloon panel delaminator extrudate channels 1005. When the balloon envelope inflates, the dual laminating tendons 1002 separate from one another, with the top dual laminating tendon following the position of an upper balloon panel and the bottom dual laminating tendon following the position of a lower balloon panel.

In another embodiment, in order for all of the panel centered balloon tendons 1001/1002/1003/1004 to deploy on the interior of the eight panel coextruded balloon 1000 when inflated, four sets of dual delaminating tendons are used. The dual delaminating tendons 1002/1004 are located on, inside or adjacent the encapsulated balloon panel delaminator extrudate channels 106. When the balloon envelope inflates, the dual laminating tendons 1002 separate from one another, with the top dual laminating tendon following the position of an upper balloon panel and the bottom dual laminating tendon following the position of a lower balloon panel. In another embodiment, one or more tendon lines position on the interior of the balloon envelope while one or more tendon lines position on the exterior of the balloon envelope upon inflation. In another embodiment, one or more tendon lines are encapsulated within the balloon panels themselves and are neither positioned on the outside or positioned on the inside of the balloon envelope.

Figure 11:
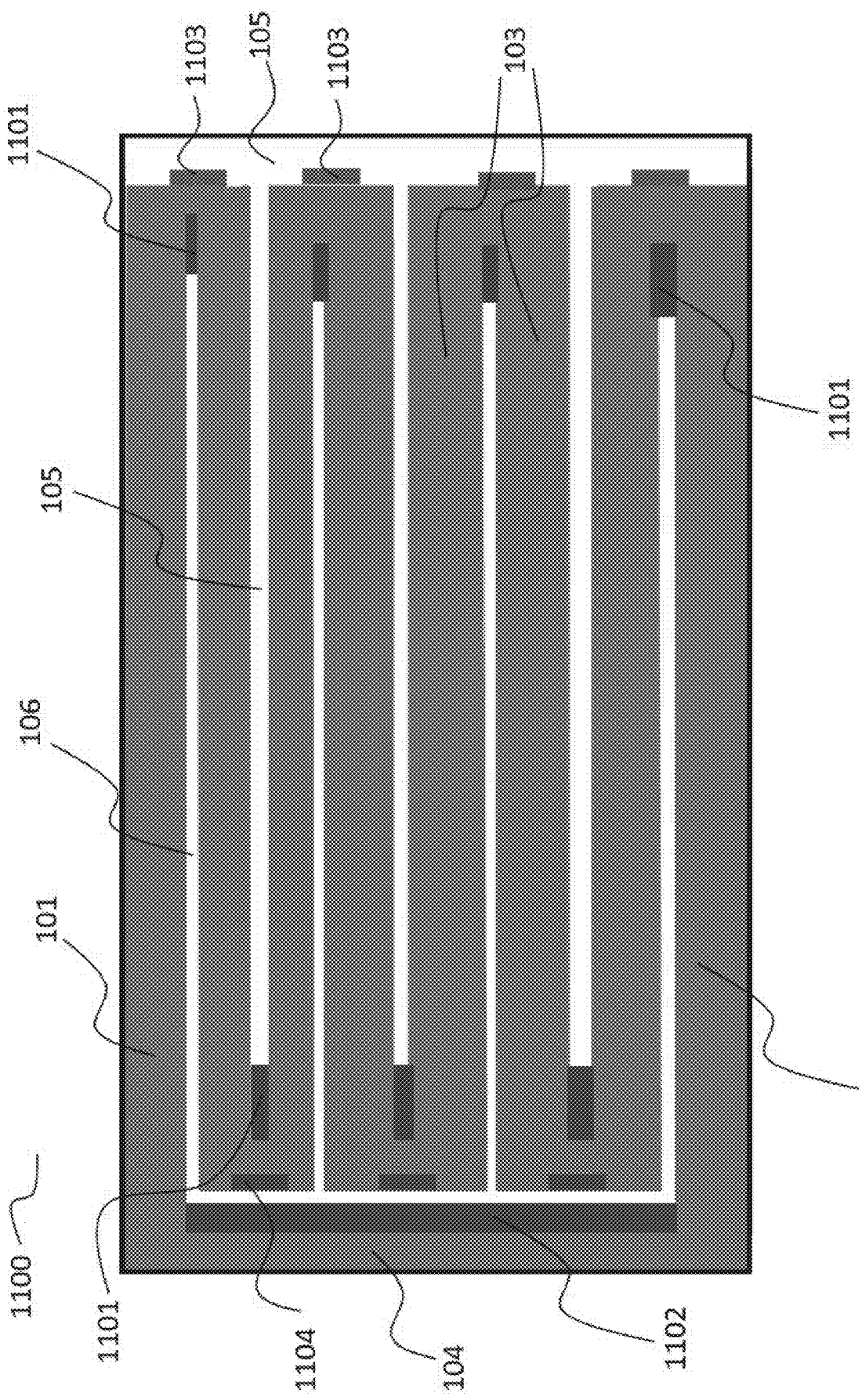
FIG. 11 is a cross-sectional view of an uninflated coextruded high altitude balloon with eight panels and including panel joint tendons according to an embodiment.

FIG. 11 shows an uninflated coextruded high altitude balloon with eight panels, with panel joint tendons 1100. A primary difference between the embodiments of FIGS. 11 and 10 is that the tendon lines in FIG. 11 are located adjacent the joint location where two or more balloon panel layers join together and are not located in a more central panel location along the balloon panel width as shown in FIG. 10.

FIG. 11 shows single panel joint tendons 1101 positioned toward the end of both encapsulated and non-encapsulated balloon panel delaminator extrudate channels 105/106, as well as a top/bottom balloon panel connector channel tendon 1102 positioned adjacent the top/bottom balloon panel connector channel 104. When the coextruded high altitude balloon with panel joint tendons 1100 inflates, roughly half of the tendon lines will be on the inside of the balloon envelope and roughly half of the balloon tendon lines will be on the outside of the balloon envelope. In another embodiment, all of the tendon lines are positioned on the outside of the balloon envelope upon inflation by changing the position of the right side joint tendons 1101 to become outside right joint single panel joint tendons 1103. The top/bottom balloon panel connector channel tendon 1102 is moved to the outside edge of the top/bottom balloon panel connector channel 104, the outside edge of the top balloon panel 101, or the outside edge of the bottom balloon panel 103. In another embodiment, all of the balloon tendons are positioned on the inside of the balloon envelope during inflation by moving the left side joint tendons 1101 to become outside left joint single panel joint tendons 1104. Other alternative tendon line positioning configurations are possible.

Tendon lines in some embodiments may consist of traditional balloon tendon lines (load/restraint lines) such as Kevlar® fiber, PBO fiber, Innegra® fiber, carbon fiber, fiberglass, spread tow and chopped fibers, among a host of other fibers and fiber composites. Alternative embodiments may use higher tensile strength or lower stretch modulus extrudates, such as polyester (PET), HDPE, Nylon, fiber/polymer composites, among other extrudates that may or may not be reinforced as tendon lines. For example, in one embodiment a coextruded high altitude balloon comprises balloon panels of a LLDPE-EVOH-LLDPE sub-layer configuration, with carbon fiber reinforced PET extrudate serving as the tendon line. In another embodiment, a coextruded high altitude balloon has a LDPE-EVOH-LDPE balloon panel sub-layer configuration and a Nylon extrudate serving as the tendon line. In another embodiment, one or more Zylon® (PBO) and Kevlar® (Aramid) composite tendon lines are dispensed from one or more spools and fed through the extrusion die to coextrude along with the high altitude balloon envelope layers. Different materials and configurations for extrudate tendon lines, extrudate/fiber composite tendon lines, and fiber only tendon lines may be added to high altitude balloon envelopes in various locations and though different means.

FIG. 12A shows a view of an inflated coextruded high altitude balloon 1200 such as the balloon shown in its uninflated state FIG. 10 1000. This view of an inflated coextruded balloon 1200 shows multiple coextruded balloon panels 1203 largely delaminated from one another that create a cylinder balloon envelope cavity. Tendon lines 1001/1002/1003/1004 are positioned along the coextruded balloon panel 1203 widths. In one embodiment, dotted lines 1202 show the illustrative balloon panel edge paths if the uninflated balloon in FIG. 10 1000 were made using tapering panels (i.e. a spherical-shaped balloon). The tapered balloon panels, with or without tendon lines, may terminate at one or more balloon end termination caps 1201.

FIG. 12B shows a tied-off-end cylinder coextruded high altitude balloon. In one embodiment, if a cylindrical coextruded high altitude balloon envelope 1205 is manufactured, the ends of the coextruded cylinder balloon body 1206 may be closed using cylinder balloon end ties or clips 1207 to ensure the balloon has hermetically sealed ends 1208. When gathering closed the ends of a coextruded cylinder balloon body 1206, balloon body wrinkles 1209 may form. In one embodiment, a cylindrical coextruded high altitude balloon 1205 is tied off at its ends using line, rope, wire, mechanical clips, dipped extrudates, among heat seal and heat cutting tools to create hermetically sealed ends 1208. Many alternative materials and methods exist to turn an open-end cylindrical coextruded high altitude balloon envelope 1205 into a hermetic balloon cavity.

FIG. 12C shows a tapering panel cylinder coextruded high altitude balloon 1212. Embodiments of FIG. 12C are different from certain embodiments of FIG. 12B in that FIG. 12C has tapering balloon panel portions 1213 that avoid cylinder balloon body winkles 1209 and ensure greater pressure resistance and lower overall balloon envelope weight/lift ratio. The tapering panel cylinder coextruded balloon 1212 is similar to tapering panel spherical coextruded balloons in some embodiments, primarily differing in its composition of a longer middle body portion as a cylinder typically differs from a sphere in that regard. FIG. 12 shows that the tapering panel cylinder coextruded balloon 1212 has payload lines 1210, a payload 1211, and a balloon end termination point 1214, either with or without a termination end cap where the cylinder balloon tapering panel portions 1213 gradually come together along their uppermost and lowermost edges to close up a balloon envelope.

Figure 13:
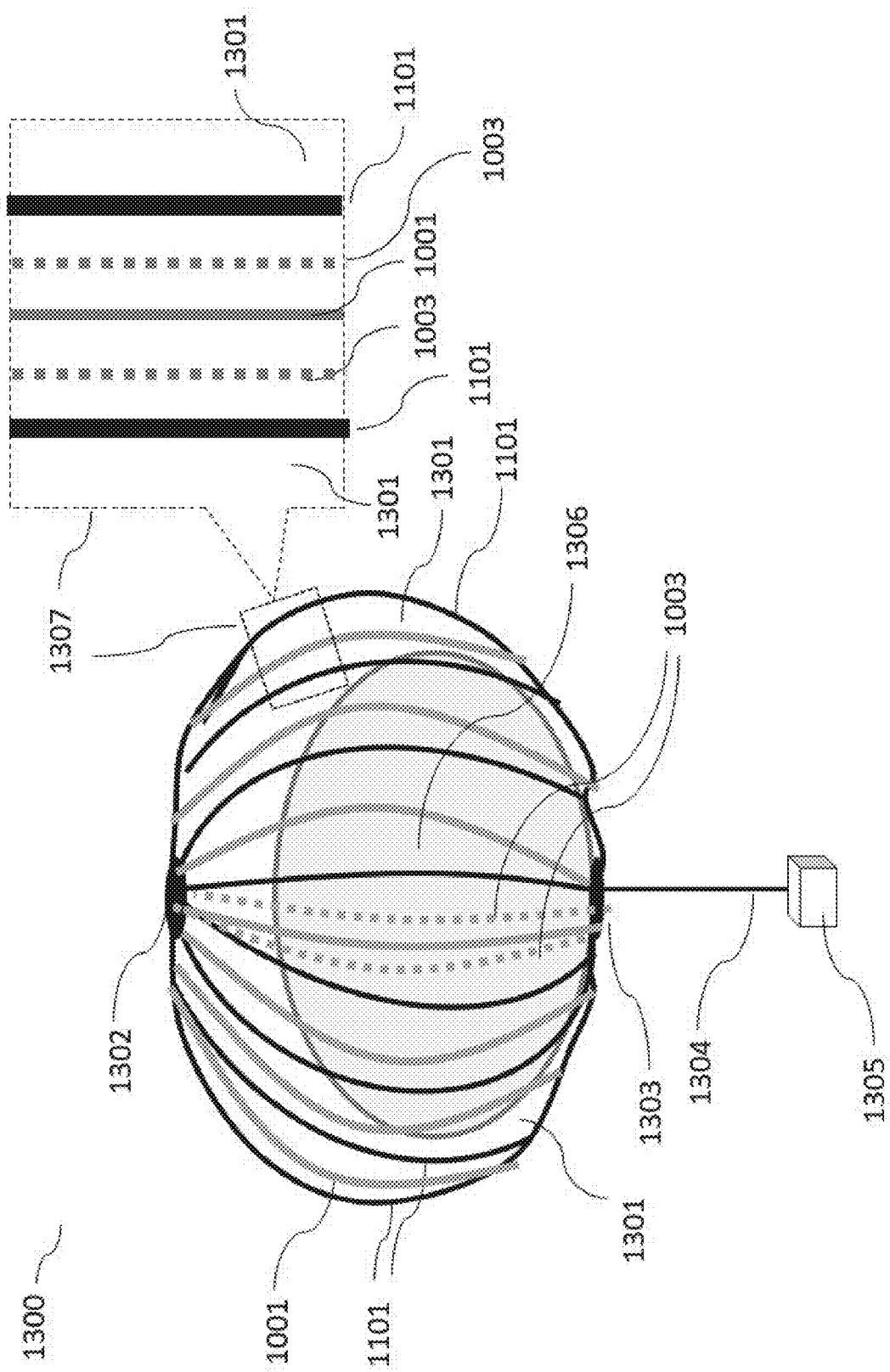
FIG. 13 is a front view of a lobed spherical high altitude balloon according to an embodiment.

FIG. 13 shows an embodiment of a coextruded lobed spherical high altitude balloon 1300. The coextruded lobed balloon 1300 is made up of a plurality of coextruded balloon panels 1301, tendon lines 1001/1003/1101, a top balloon termination cap 1302, a bottom balloon termination cap 1303, a payload line 1304 and a payload 1305. One of the balloon termination caps may have an inflation port, or a separate inflation port/valve may be included as known in the art. The coextruded lobed balloon 1300 in one embodiment has one or more internal ballast balloons 1306 to help direct the balloon to different altitudes and wind patterns. The close up view of a coextruded lobed balloon portion 1307 shows the general positioning of different tendon line options 1101/1003/1101 in relation to the coextruded balloon panels 1301 upon balloon inflation.

Figure 14:
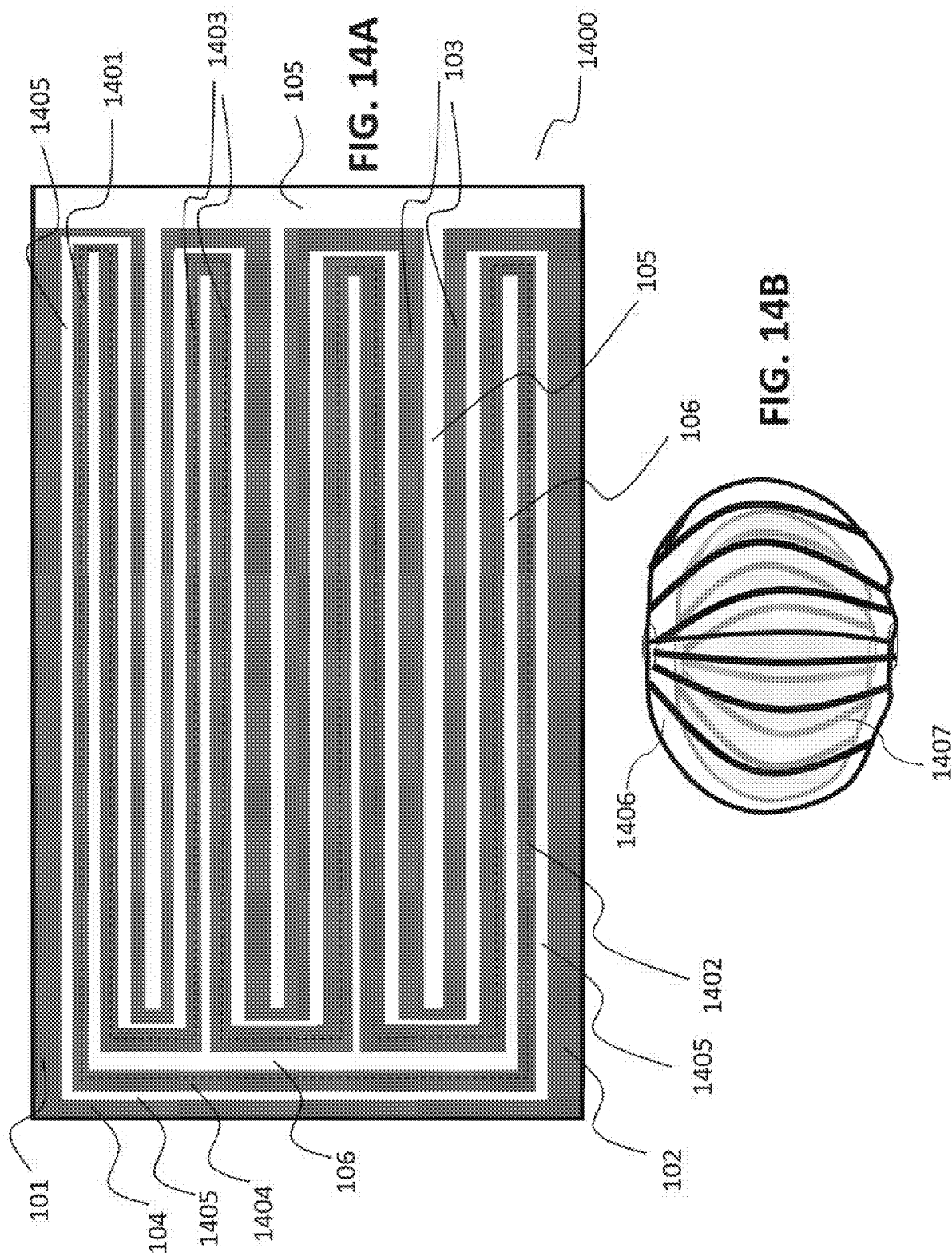
FIG. 14A is a cross-sectional view of an uninflated coextruded balloon within a balloon including an exterior balloon envelope and an interior ballast balloon according to an embodiment.
FIG. 14B is a front view of the balloon of FIG. 14A after inflation.

FIG. 14A shows an embodiment of an uninflated coextruded balloon within a balloon 1400, including an exterior balloon envelope 1406 and an interior ballast balloon envelope 1407. The dotted line path in FIG. 14A shows the continuous interior ballast balloon extrudate path. The coextruded exterior balloon envelope 1406 has a top coextruded balloon panel 101, middle coextruded balloon panels 103, a bottom coextruded balloon panel 102, and a coextruded top balloon panel to bottom balloon panel connector channel 104. Similarly, the coextruded interior ballast balloon envelope 1407 has a top coextruded balloon panel 1401, middle coextruded balloon panels 1403, a bottom coextruded balloon panel 1402, and a coextruded top balloon panel to bottom balloon panel connector channel 1404. The exterior balloon 1406 and interior balloon 1407 are able to delaminate from one another upon balloon inflation by the addition of an exterior and interior balloon panel delaminator extrudate layer 1405. In one embodiment, the uninflated coextruded balloon within a balloon 1400 is similar to the multi-layer balloon panel coextruded balloon shown in FIG. 5, but instead of a middle balloon panel sub-layer being EVOH (as shown in FIG. 5), the middle balloon panel sub-layer is swapped out with a balloon panel delaminator extrudate 1405. In one embodiment, multiple balloons are coextruded within multiple balloons by increasing the number of alternating balloon panel extrudate layers and balloon panel delaminator extrudate layers 1405.

FIG. 14B shows an embodiment of an inflated coextruded balloon within a balloon, that is to say an inflated exterior balloon envelope 1406 and an inflated interior ballast balloon 1407. The exterior balloon envelope 1406 and the interior ballast balloon envelope 1407 may be made from the same materials or made from different materials. In one embodiment, the exterior balloon envelope 1406 is made from two or more sub-layer coextrusion layers (LLDPE-EVOH-LLDPE for example) and the interior ballast balloon envelope 1406 is made from a single LDPE layer. In another embodiment, the two balloon envelopes 1406/1407 are made from the same polyurethane (PU) extrudate materials to allow them to stretch at the same rate. If a portion of the exterior balloon envelope 1406 is desired to bond to one or more portions of an interior balloon envelope 1407, a portion of the exterior and interior balloon panel delaminator extrudate 1405 can be removed to allow the two balloon envelopes to bond to one another at the desired point(s) during coextrusion.

Figure 15:
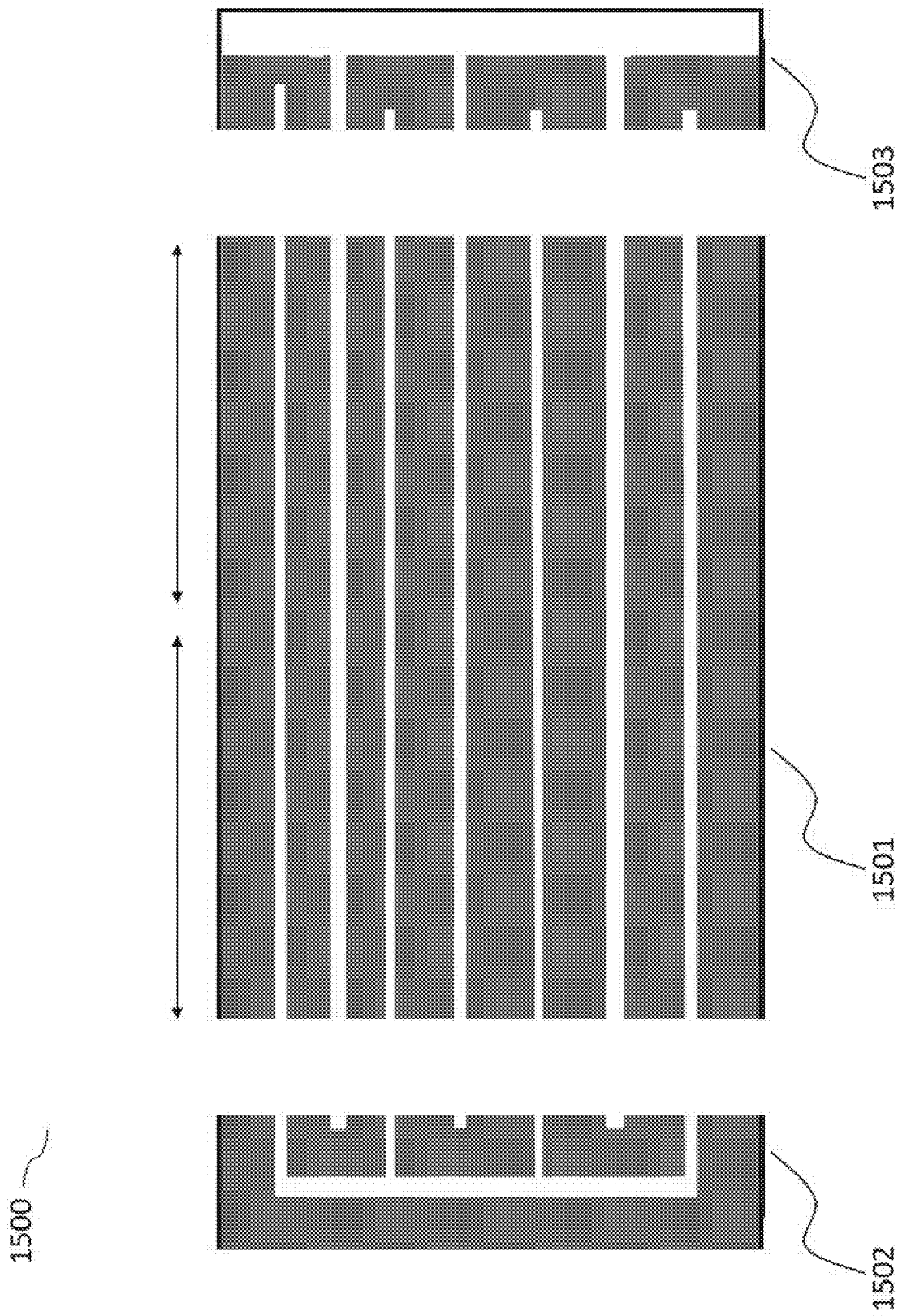
FIG. 15 is a cross-sectional view of a coextruded balloon extruder die deckle system according to an embodiment.

FIG. 15 shows an embodiment of a coextruded balloon extruder die deckle system 1500. The balloon extruder die deckle system 1500 is primarily made up of three parts, a coextrusion die deckle central fixed portion 1501, a coextrusion die deckle left translating portion 1502, and a coextrusion die deckle right translating portion 1503. By allowing the left and right coextrusion die deckle translating portions 1502/1503 to move inward and outward from one another, it is possible to change the widths of coextruded balloon panels. In one embodiment the coextruded balloon extruder die deckle system 1500 is an internal die deckle system. In another embodiment the coextruded balloon extruder die deckle system 1500 is an external die deckle system. In another embodiment the coextruded balloon extruder die deckle system 1500 is both an external and internal die deckle system. The coextruded balloon extruder die deckle system 1500 may also be replaced with a non-die deckle system that can change the widths of coextrusion balloon panels.

Figure 16:
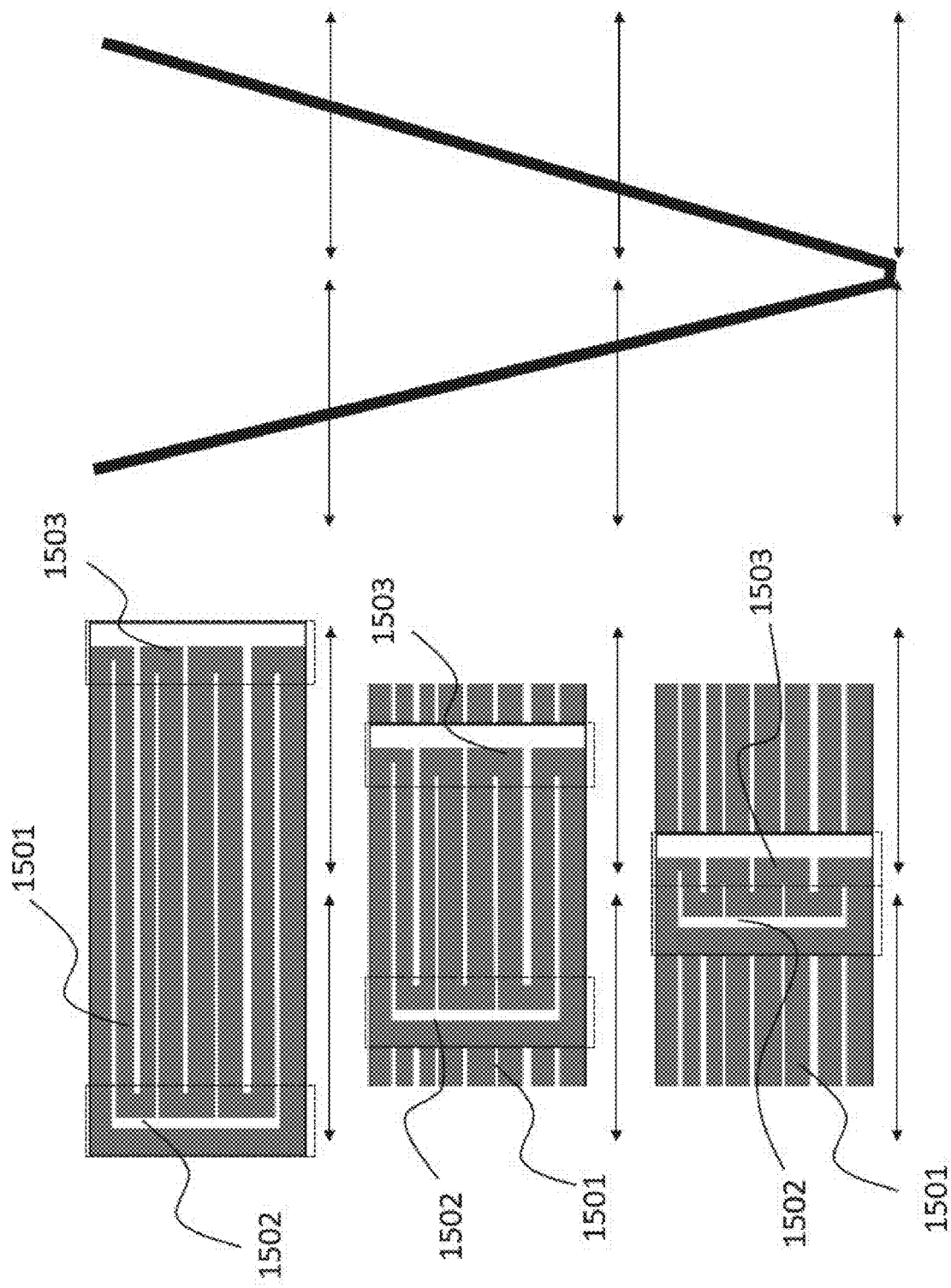
FIG. 16A includes three cross-sectional views of a coextruded balloon extruder die deckle system according to an embodiment, depicting translating movements.
FIG. 16B is a diagrammatic view of a tapering balloon panel shaping path using a translating coextruded balloon extruder die deckle system.

FIG. 16A shows the translating movements of a coextruded balloon extruder die deckle system 1500. In one embodiment the left and right coextrusion die deckle translating portions 1502/1503 slide inward toward one another and outward away from one another to increase or decrease coextruded balloon panel widths. Because the coextrusion die deckle central fixed portion 1501 comprises a layering pattern that is constant regardless of the positioning of the left and right coextrusion die deckle translating portions 1502/1503, stacking and side-by-side coextrusion layering pattern interruptions that would compromise the quality of coextrusion balloon outputs are avoided.

FIG. 16B shows a tapering balloon panel shaping path using a translating coextruded balloon extruder die deckle system 1500. In one embodiment, by translating the left and right coextrusion die deckle translating portions 1502/1503 in relation to one another and in relation to the coextrusion die deckle central fixed portion 1501, multiple tapered balloon panels can be simultaneously coextruded together to form custom spherical, lobed, natural shape, tear drop, tapering cylinder, among other balloon envelope shapes which would be hard to achieve if all of the die portions 1501/1502/1503 were always in their same fixed positions.

Figure 17:
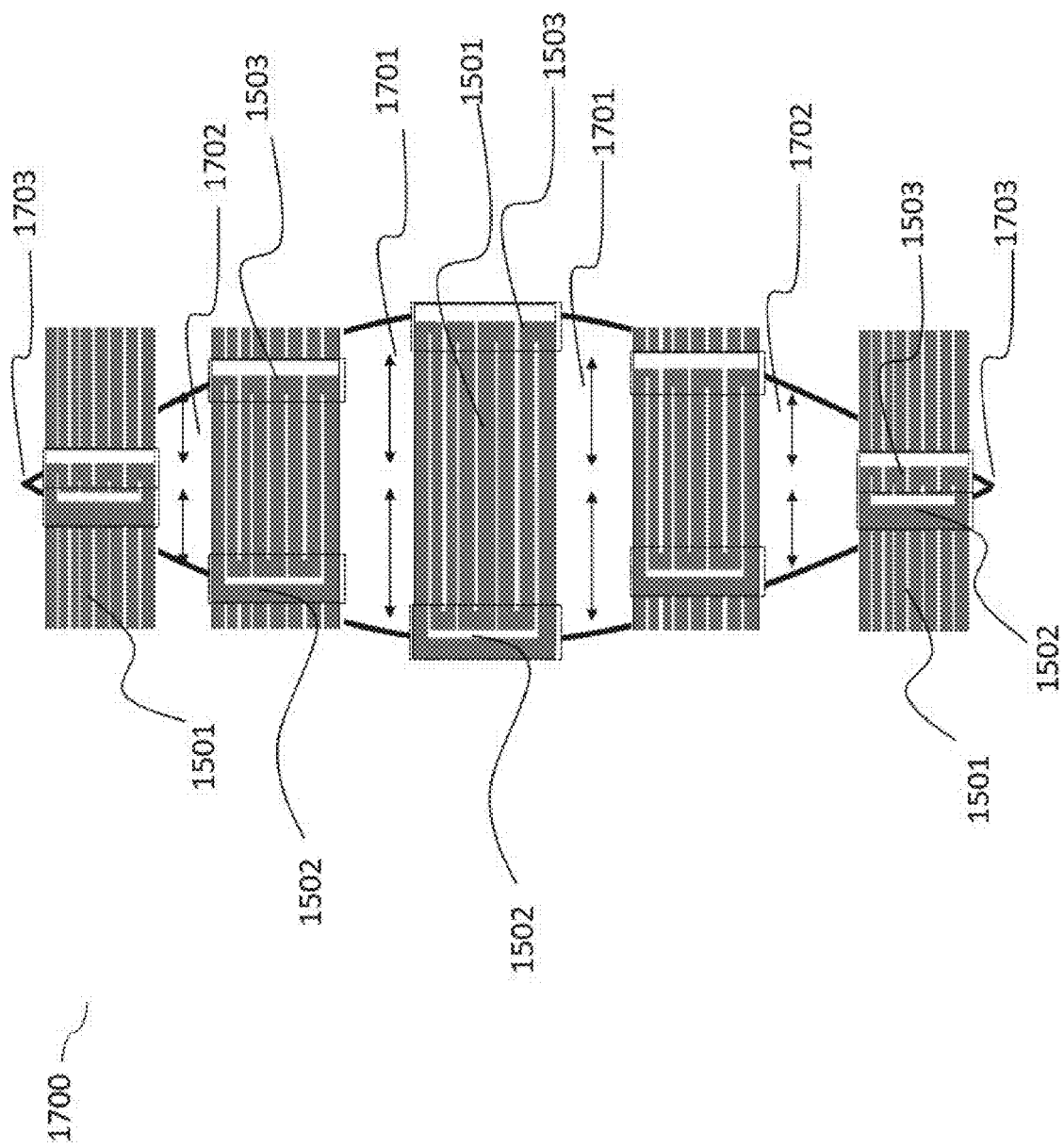
FIG. 17 is a cross-sectional view of a tapering panel coextruded spherical balloon die deckle system according to an embodiment.

FIG. 17 shows a tapering panel coextruded spherical balloon die deckle system 1700. In one embodiment, while the multiple balloon panels 101/102/103/104 and balloon panel delaminator extrudates 105/106 exit the extrusion T-die, the balloon panel/delaminator extrudate widths are widened and narrowed by translating the left and right coextrusion die deckle translating portions 1502/1503 in relation to one another and in relation to the coextrusion die deckle central fixed portion 1501. For example, the left and right coextrusion die deckle translating portions 1502/1503 may begin in the coextruded balloon panel closed die deckle position 1703. As the coextrusion balloon panel/delaminator layers leave the extrusion T-die, the coextruded tapering panel die deckle system 1700 slowly moves the left and right coextrusion die deckle translating portions 1502/1503 away from one another toward the coextruded balloon panel mid-open die deckle position 1702 and eventually to the coextruded balloon panel open die deckle position 1701. As the balloon panels need to taper back in the opposite direction, the open die deckle position 1701 becomes the mid-open die deckle position 1702 which eventually becomes the closed die deckle position 1703 in order to taper down the widths of the coextrusion layers as illustrated in FIG. 17.

Figure 18:
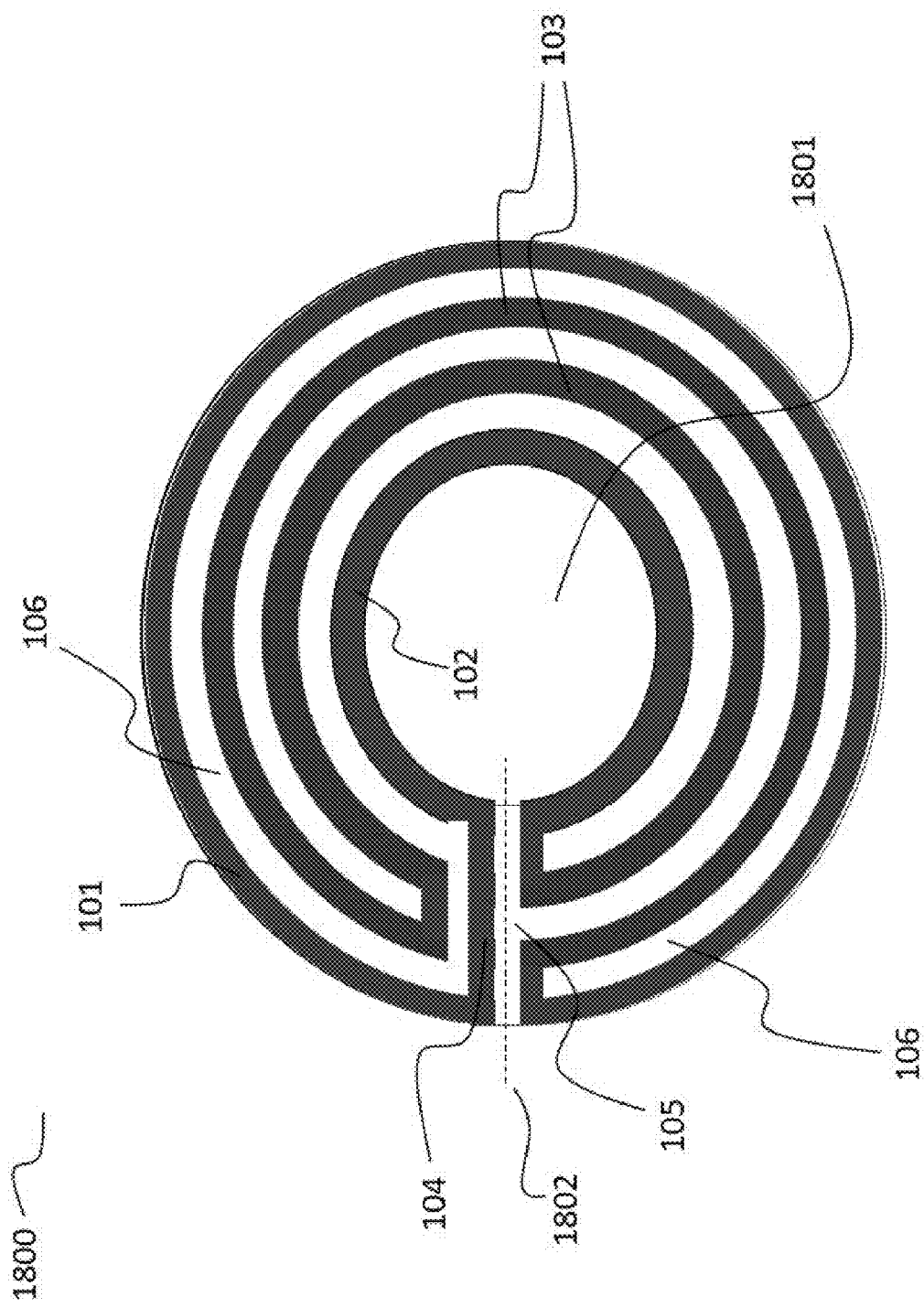
FIG. 18 is a top sectional view of an uninflated blown coextruded high altitude balloon with four panels according to an embodiment.

FIG. 18 shows an embodiment of an uninflated blown coextruded high altitude balloon with four panels 1800. A coextruded balloon may be made with a variety of different flat die extrusion, cast extrusion, blown extrusion, or other extrusion methods and apparatuses. FIG. 18 illustrates how a blown extrusion line can complete a similar uninflated coextruded four panel high altitude balloon as compared to the multiple layer stacking and side-by-side coextrusion configurations as an uninflated balloon shown in FIG. 1A. If the right edge of the uninflated coextruded balloon in 1A were bent around in a circle and connected to the left edge of the uninflated balloon in FIG. 1A, it would closely resemble the uninflated balloon in FIG. 18. Given that blown extrusion lines blow coextruded cylinders of material rather than flat sheets of material, the uninflated blown coextruded high altitude balloon 1800 has a blown coextruded balloon central air gap 1801. In order to allow for proper balloon panel delamination upon balloon inflation, a trim line 1802 to slit the blown extruded cylinder into a flat multi-layer sheet may be provided.

FIG. 19A shows a blown coextruded high altitude balloon line 1900, making a blown coextruded "bubble". Blown balloon coextrusion lines may have some similarities with cast/flat die balloon coextrusion lines. In one embodiment, for both blown and cast lines, virgin extrudate pellets are vacuumed into a hopper, dispensed into a heated extrusion barrel, mixed and moved forward by an extrusion screw, and fed through a feedblock to position the extrudate layers to properly pass through the extrusion die simultaneously. If multiple extrudates are used, they often require their own virgin pellet bulk containers, vacuum systems, hoppers, extrusion barrels/screws in order to keep the extrudates separate until they are ready to be simultaneously coextruded in independent yet adjacent layers. In a flat/cast die extrusion, often a flat T-die extrudes the coextrusion layers in a flat sheet-like melt curtain atop of a chill roll to cool and cure the material. In a blown die extrusion, often a circular die 1901 extrudes the coextrusion layers from ring-like die lips 1902 into a cylinder-like bubble using air to blow up its center 1903 to gradually increase the extruded cylinder's diameter 1904/1905 until it reaches the target coextruded cylinder diameter 1906. In addition to increasing the blown coextrusion cylinder's diameter, the internally blown air also helps cool the uninflated coextrusion balloon envelope since chill rolls are typically not available for the same task on blown coextrusion lines. After the coextruded balloon envelope has cooled/cured as it moves upward toward a nip roll pair, the coextruded cylinder may be slit at the trim line 1802, flattened out, and wound on a roll in a flat sheet-like rollstock configuration.

FIG. 19B shows a cut-out portion of a blown coextruded high altitude balloon line, such as a portion of FIG. 19A. FIG. 19B helps show the cylindrical nature of the blown coextrusion "bubble" where the blown coextruded balloon central air gap 1801 is exposed along with the cylinder's interior surface which is actually the bottom coextruded balloon panel 102, as is clearly shown in FIG. 19C. FIG. 19C shows an uninflated blown coextruded high altitude balloon with four panels 1800.

In some embodiments, blown coextruded balloons of FIGS. 18 and 19 may create a cylindrical coextruded high altitude balloon envelope comparable to the balloon embodiments in FIGS. 12A, 12B and 12C. In other embodiments, blown coextruded balloon envelopes can be made into in spherical and lobed spherical configurations (similar to FIG. 13) by increasing and decreasing the diameter of the blown coextrusion "bubble" so that the balloon panels taper inward and outward. Increasing the diameter of the blown coextrusion "bubble" makes the balloon panel widths wider. Decreasing the diameter of the blown coextrusion "bubble" makes the balloon panel widths narrower, similar to the function of the coextruded tapering panel (i.e. spherical balloon) die deckle system 1700. Thus, custom spherical, lobed, natural shape, tear drop, tapering cylinder, among other balloon envelope shapes may be made with cast/flat die and blown die coextruded balloon lines, as well as with other extrusion systems.

FIG. 20A shows an uninflated blown coextruded balloon within a balloon 2000, an exterior balloon envelope 1406 and interior ballast balloon envelope 1407. In one embodiment, the illustrated blown extrusion stacking and side-by-side coextrusion configuration is similar to the flat die stacking and side-by-side coextrusion configuration explained with reference to FIGS. 14A and 14B, especially after the cylinder is slit open at trim line 1802. FIG. 20B shows an inflated blown coextruded balloon within a balloon, similar to illustrative embodiments of FIG. 14B.

Figure 21:
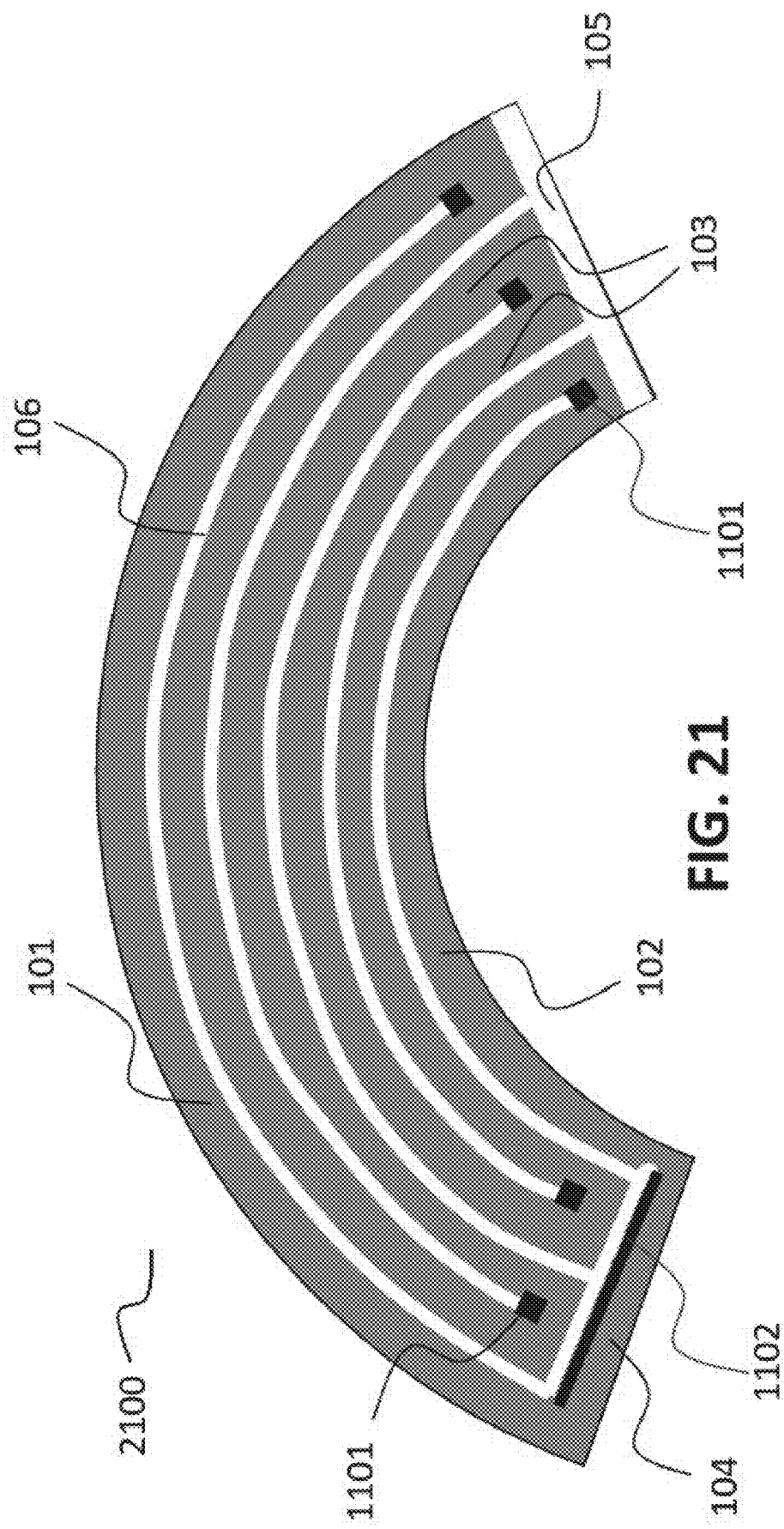
FIG. 21 is a cross-sectional view of a cast-lobed coextruded high altitude balloon curved die embodiment according to an embodiment.

In some embodiments, tendon lines are utilized to help create high altitude balloon envelope lobes (i.e. lobed "pumpkin" balloons) that increase the internal pressure resistance of the balloon envelopes. In other embodiments, high altitude balloon envelope lobes are directly cast in their lobe shape during the balloon envelope coextrusion process. FIG. 21 shows an embodiment of a cast-lobed coextruded high altitude balloon curved die 2100. Additional tendon lines 1101/1102 may or may not be added to cast-lobed coextrusion balloon envelopes. In one embodiment, a polyester (PET) balloon envelope is cast-lobe coextruded without the use of additional tendon lines. In another embodiment, a LLDPE-EVOH-LLDPE multi-layer balloon envelope is cast-lobe coextruded with the addition of one or more panel joint tendons 1101/1102/1103/1104. In order for a curved cast-lobed coextruded balloon envelope to cool and cure in shape when coextruded as a die "melt curtain", a specially shaped concave/convex chill roll and nip roll pair may be used to maintain the proper cast-lobed shape of the coextruded balloon panels 101/102/103/104 and encapsulated and non-encapsulated balloon panel delaminator extrudates 105/106.

In one embodiment, a cast-lobed coextruded high altitude balloon is made with tapering panels so that the final balloon envelope takes on a more spherical-lobed (or pumpkin) balloon shape, rather than cylindrical shape. Similar to how the translating die deckle embodiments 1700 in FIG. 15, FIGS. 16A-D, and FIGS. 17A-B created tapered panels by moving left and right coextrusion die deckle translating portions 1502/1503 in relation to one another and in relation to the coextrusion die deckle central fixed portion 1501, FIGS. 22A and 22B show a similar way to create tapered balloon panels with curved coextrusion left and right die deckle translating portions 2202/2203 and a fixed center die deckle portion 2201. FIG. 22A shows a coextrusion curved die deckle in a half open position to make a cast-lobed high altitude balloon. FIG. 22B shows a coextrusion curved die deckle in a closed position, to make a cast-lobed high altitude balloon. The different positions of the curved die deckles in FIGS. 22A and 22B create similar tapered coextruded balloon panels as shown in FIG. 17, with the addition of cast curve-shaped (pumpkin shape) lobes that help increase balloon internal pressure resistance over non-lobed balloon envelopes.

FIG. 23A shows an uninflated cast-lobed coextruded high altitude balloon 2100. The cast-lobed coextruded balloon panels are numbered to help match up with FIGS. 23B and 23C to see how in one embodiment the uninflated cast-lobed balloon 2100 looks when partially inflated (FIG. 23B) and fully inflated (FIG. 23C). In one embodiment, upon partial inflation of the cast-lobed coextruded balloon 2100, layers 1, 3, 5 first deploy with their lobes facing the outer side of the balloon envelope. Layers 2, 4, and 6 first deploy with their lobes facing toward the inside of the balloon envelope. As the balloon reaches near full inflation, the inward facing lobes of layers 2, 4, and 6 pop out under pressure in the same outward direction as layers 1, 3 and 5. FIG. 23B shows a partially inflated cast-lobed coextruded high altitude balloon and FIG. 23C shows a fully inflated cast-lobed coextruded high altitude balloon.

In some embodiments, multiple molten extrudate layers pass through a plurality of different shaped dies to simultaneously form a balloon envelope. Sealable/bondable substrates that are not amenable to heat treating can be introduced as high altitude balloon envelopes.

Figures 24A, 24B:
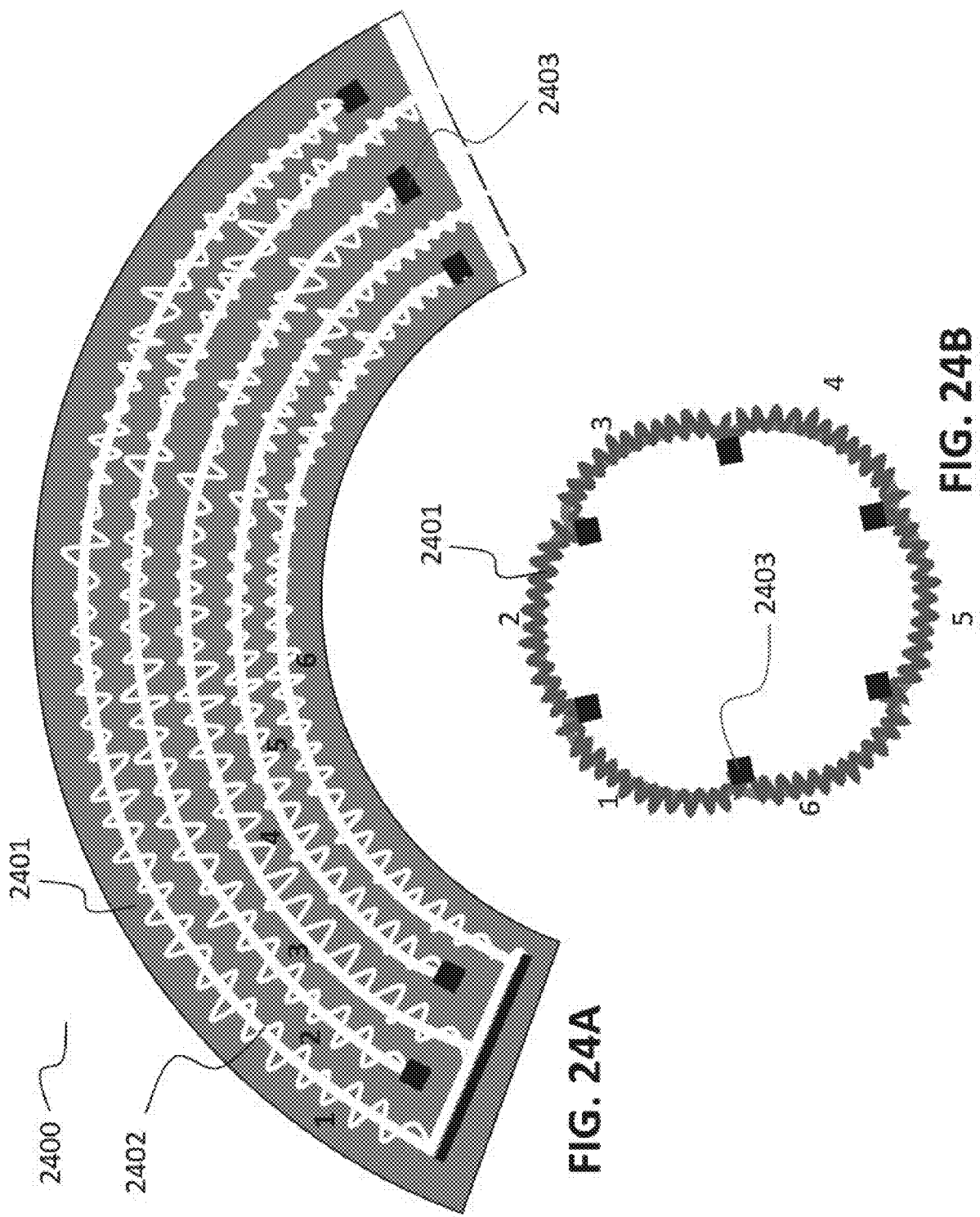
FIG. 24A is a cross-sectional view of a nano-lobed coextruded high altitude balloon according to an embodiment.
FIG. 24B is a cross-sectional view of the balloon of FIG. 24A, inflated.

FIG. 24A shows an embodiment of a uninflated nano-lobed coextruded high altitude balloon die 2400. "Nano-lobed" refers to dozens, hundreds, or even thousands of micro-sized lobes cast into the multiple balloon panel coextrusion to further increase balloon envelope pressure resistance. FIG. 24B shows an embodiment of a inflated nano-lobed coextruded high altitude balloon. In one embodiment each nano-lobed coextruded balloon panel 2401 has dozens of nano-lobes due in part to the stacking and side-by-side coextrusion layer configuration of the nano-lobed coextruded balloon panels 2401 and the nano-lobed coextruded balloon panel delaminator extrudate 2402. Tendon lines 2403 may or may not be added to the nano-lobed high altitude balloon system.

By regulating the amount of final end encapsulation inside the feedblock or inside the extrusion die head, the coextruded balloon panels can take on a tapering shape or other custom shape. The final end encapsulation, or other excess "web filler material" allows a consistent web width to be extruded from an extrusion machine even though the final balloon panel shape is not rectangular or consistent in its extrusion orientation. Adding more final end encapsulation, for example through increasing final end encapsulation flow and pressure, keeps the coextruded balloon panel extrudate from spreading wider across the full coextruded web. Removing final end encapsulation, for example through decreasing final end encapsulation flow and pressure, allows the coextruded balloon panel extrudate to spread wider across the full coextruded web. The final end encapsulation may be made from a delamination extrudate material to allow for its easy removal, simplifying the deploying and inflation of a coextruded high altitude balloon. The final end encapsulation may also be made from a non-delamination extrudate and simply be cut off after manufacture.

Figure 25A:
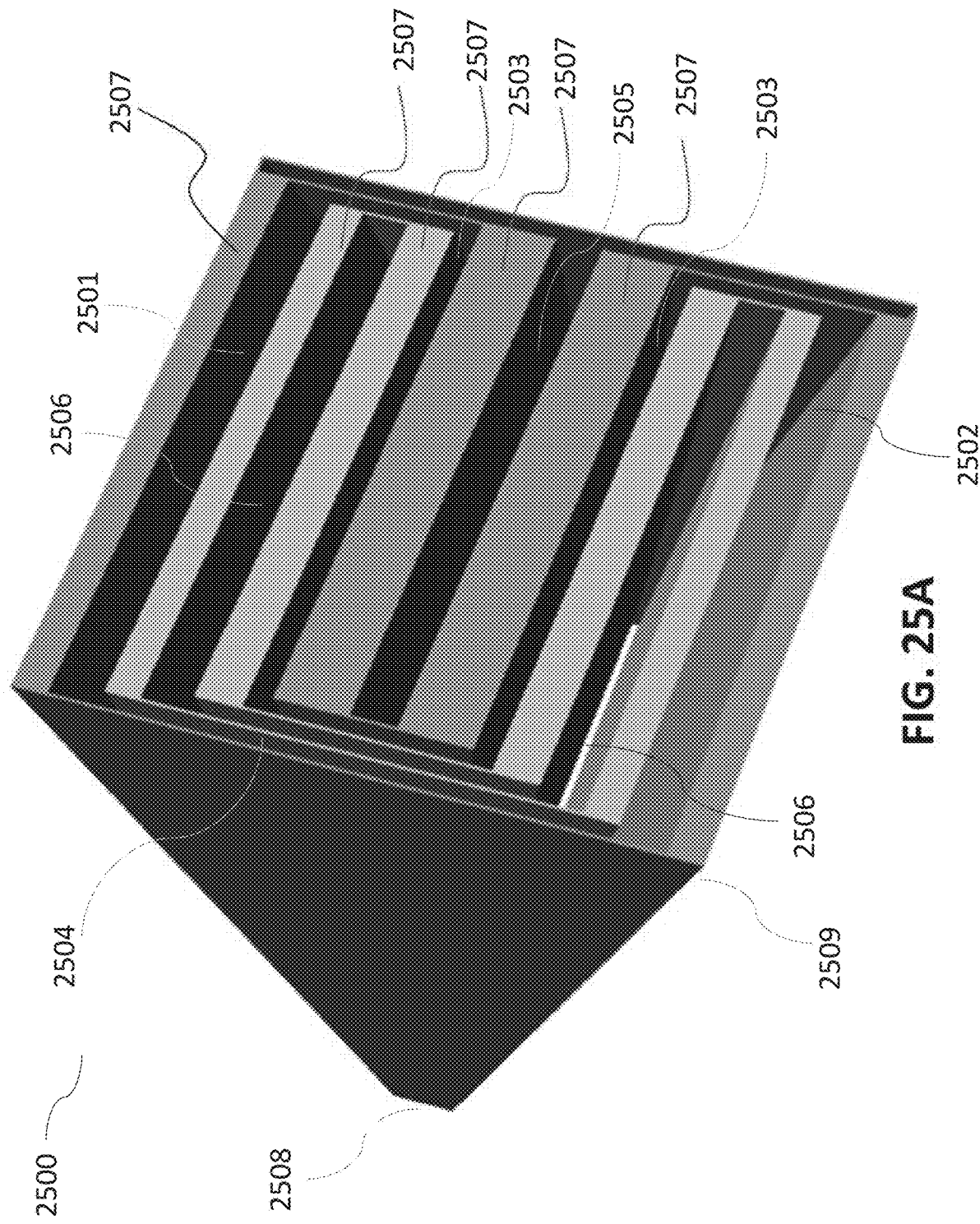
FIG. 25A is a perspective view of the rear (entry port) of a feedblock mold of the kind that may be used with a coextrusion fabrication line such as that shown in FIG. 6A.

FIG. 25A shows a cross-section view of the extrudate entrance side 2509 of a 3D printed feedblock cartridge 2500 to extrude a high-altitude balloon, as per the extrudate layer structure shown in FIG. 1A. The 3D printed feedblock cartridge 2500 is built of interconnected extrudate channel separating walls 2507. The feedblock extrudate channel separating walls 2507 keep the balloon panel base material extrudate from mixing with the balloon panel delaminator extrudate before the layers have appropriately aligned and can be extruded out together in proper alignment.

The feedblock cartridge 2500 can extrude an uninflated coextruded high altitude balloon with four panels. The uninflated coextruded balloon layers include a high altitude balloon top panel extrudate layer channel 2501, a balloon bottom panel extrudate layer channel 2502, and two middle coextruded high altitude balloon panel extrudate layer channels 2503. Additional middle extrudate layer channels 2503 may be added as shown and explained regarding layer addition in the embodiments shown in FIG. 3. In order to form a fully enclosed balloon envelope, as compared to a wide spliced sheet for example, a top balloon panel to bottom balloon panel connector extrudate channel 2504 is added. The uninflated coextruded high altitude balloon is able to deploy into a full balloon envelope by the delaminating of the cured balloon panel extrudates extruding from channels 2501/2502/2503 with the assistance of one or more non-encapsulated balloon panel delaminator extrudates extruding from a channel 2505 and encapsulated balloon panel delaminator extrudate extruding from a channel 2506. The balloon panel and delaminator extrudates extrude together out of the feedblock cartridge's 2500 die exit lip end 2508.

Figure 25B:
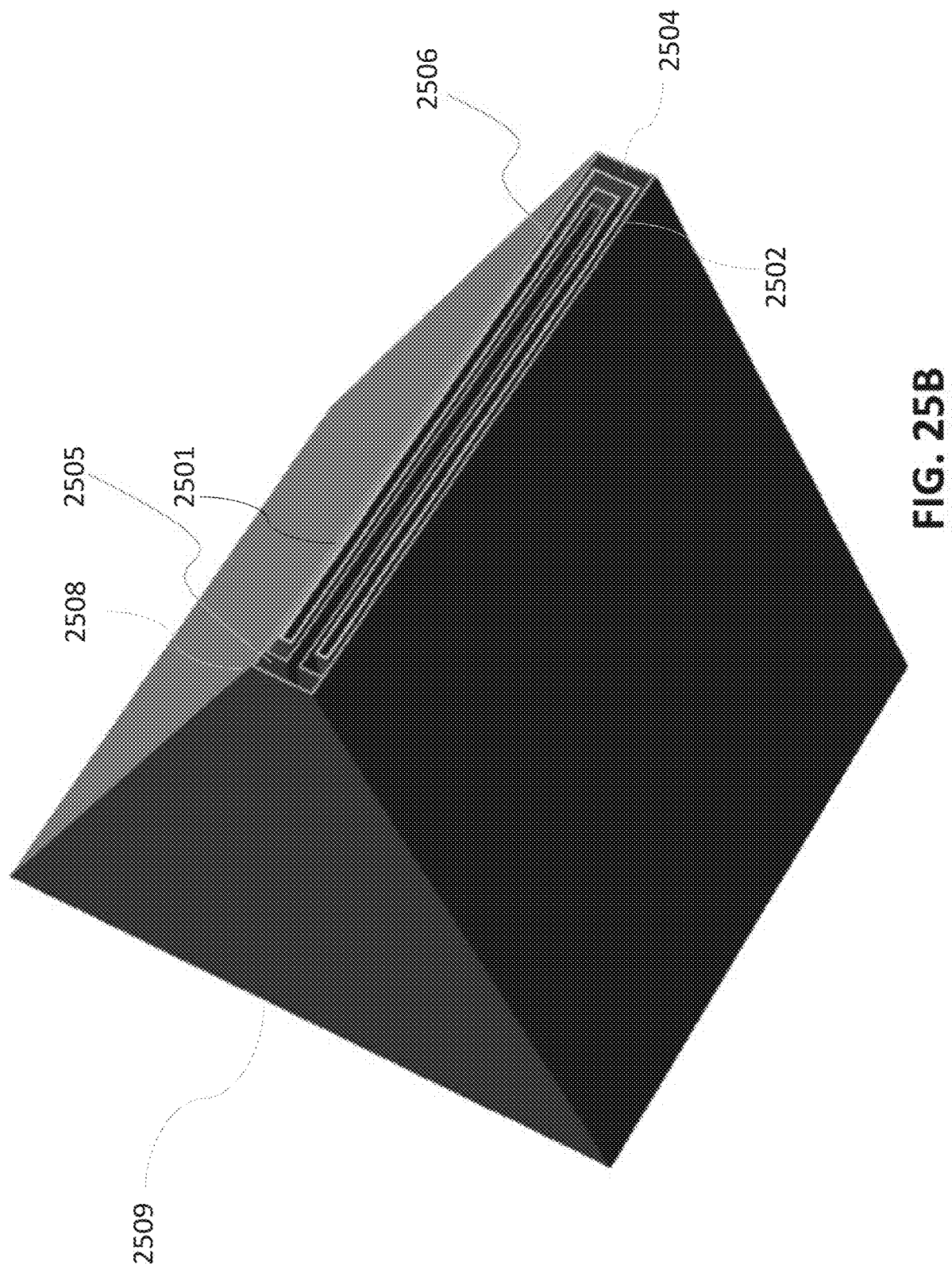
FIG. 25B is a perspective view of the front (exit port) of the feedblock mold shown in FIG. 25A.

FIG. 25B shows a frontal view of a 3D printed feedblock cartridge 2500 to extrude a high-altitude balloon, for example as per the layer structure shown in FIG. 1A. FIG. 25B shows the die exit lip end 2508 of the feedblock cartridge 2500 that is hidden from view in FIG. 25A.

Figure 25C:
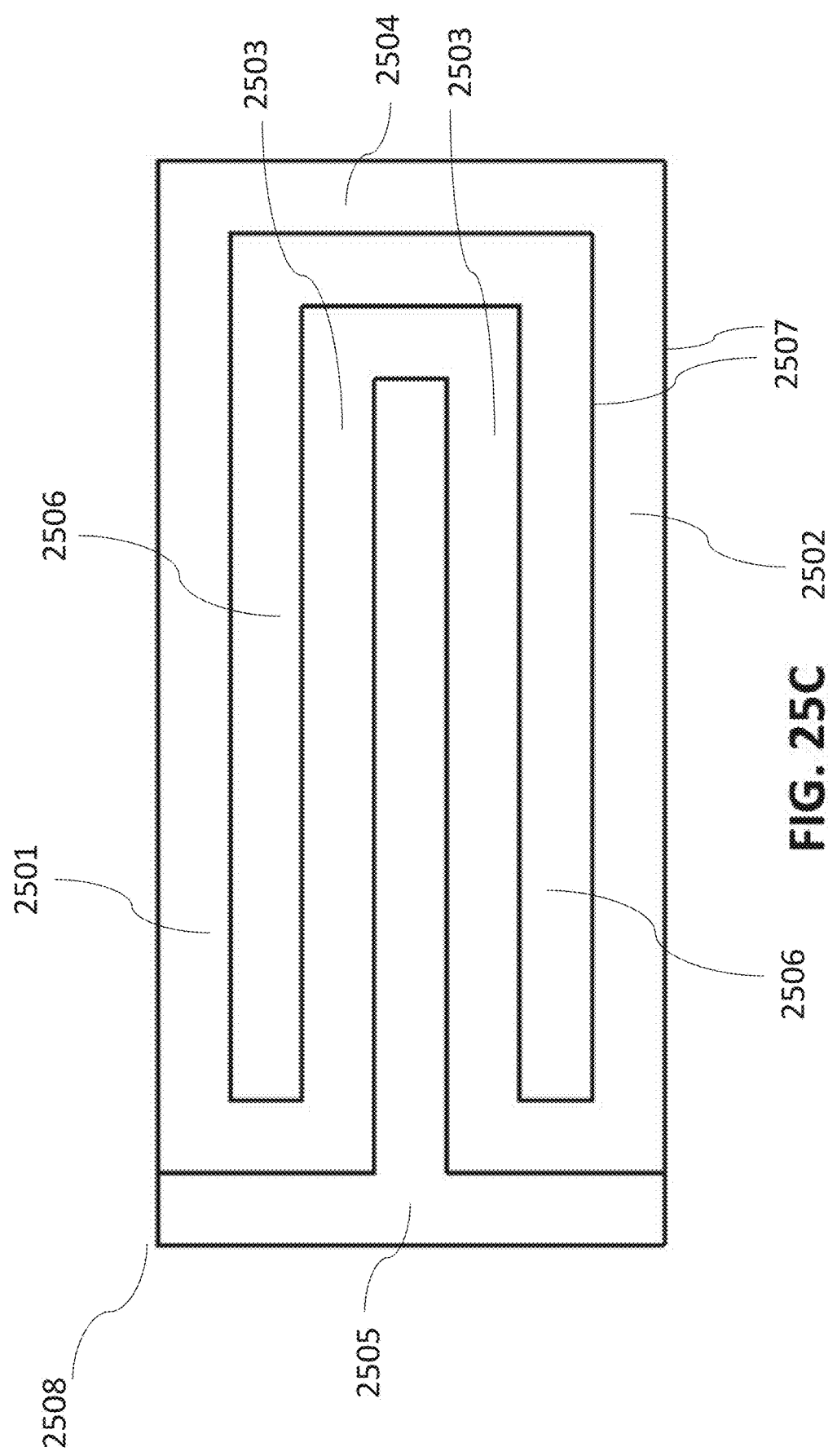
FIG. 25C is a close-up front view of the front (exit port) of the feedblock mold shown in FIG. 25B.

FIG. 25C shows a close-up view of the extrudate exiting die lips 2509 of a 3D printed feedblock cartridge 2500 to extrude a high-altitude balloon, as per the layer structure shown in FIG. 1A.

Figure 26:
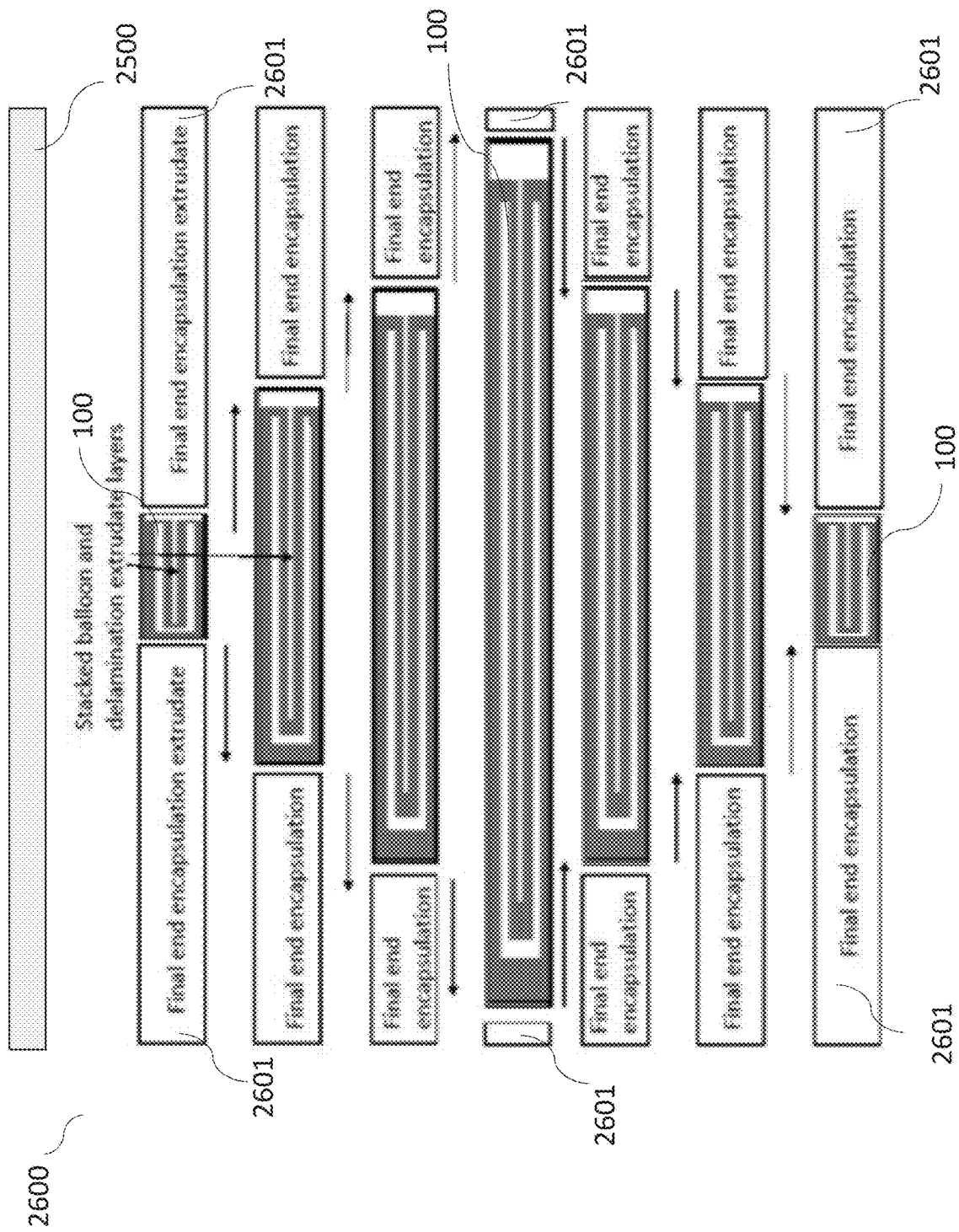
FIG. 26 is a diagrammatic representation of tapered stacked balloon and delamination extrudate layers of a coextruded balloon made by a final end encapsulation feedblock according to an embodiment.

FIG. 26 includes seven cross-sectional views of an embodiment of a varying-width coextruded balloon final end encapsulation feedblock 2601, depicting translating extrudate movements inside the feedblock to form (seamless) tapering balloon gores. FIG. 26 shows how a final end encapsulation extrudate 2601 can encapsulate one or more sides of a stacked coextruded balloon panel balloon 100 to regulate the ultimate width of the balloon gore layers and even allow the shapes of the gores to taper inward and outward during the coextrusion process. Either before or simultaneously as the balloon panel extrudate (101, 102, 103 and 104) and delaminator extrudate layers (105, 106) coextrude, a final end encapsulation extrudate 2601 may be increased or decreased in flow and/or pressure to narrow or widen the coextruded balloon panel width at a given location.

Figure 27:
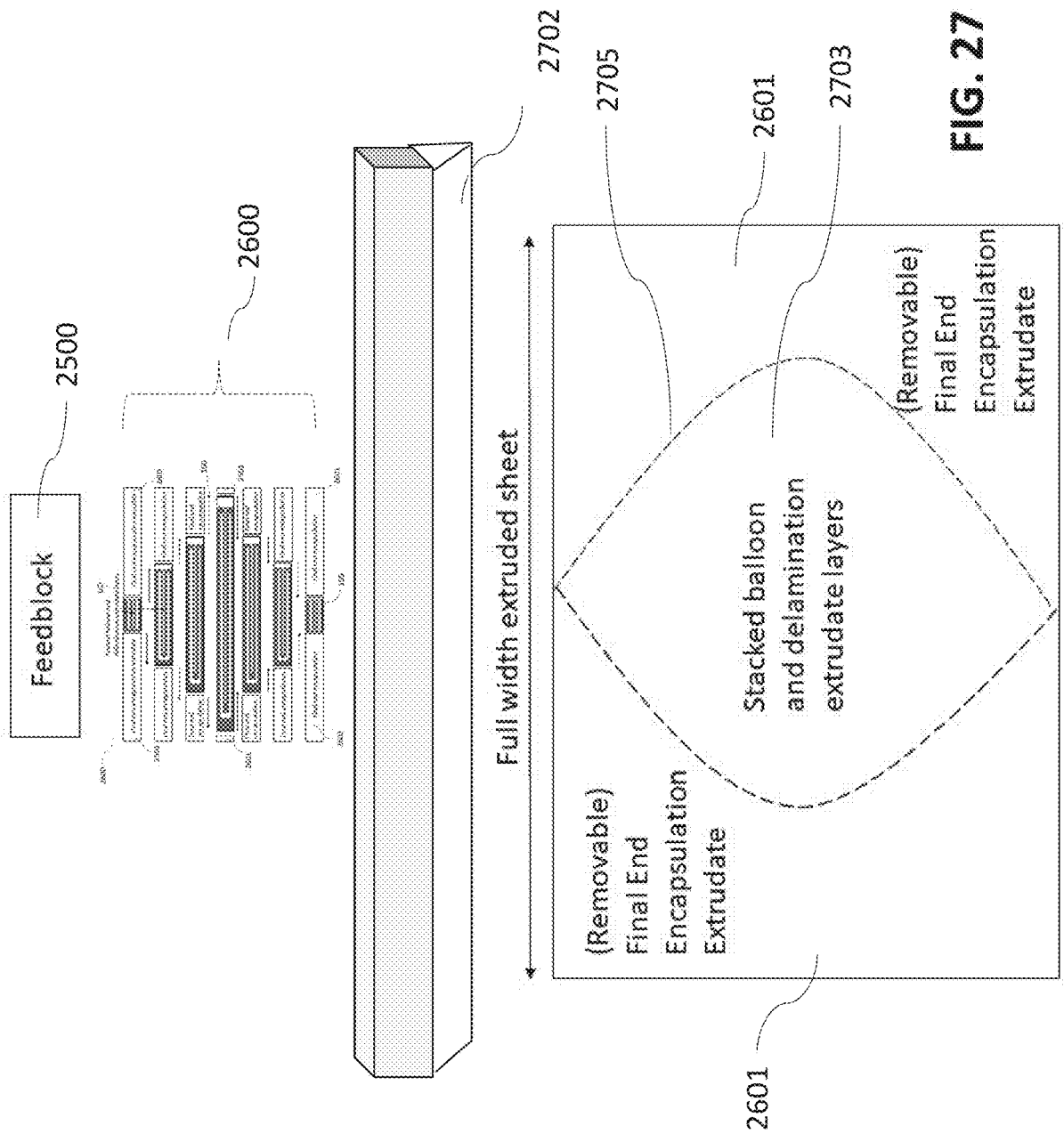
FIG. 27 is a diagrammatic representation of a portion of a full sheet showing the parts that are used in the coextruded balloon shown in FIG. 26.

FIG. 27 shows a (seamless) tapering gore coextruded balloon lying flat 2703 and having (removable) final end encapsulation 2601 on both sides, for example created from feedblock layering as described in FIG. 26. For example, if the final end encapsulation extrudate 2601 increases in flow and/or pressure, the combined stacked balloon and balloon delaminator extrudate layers 100 will be limited in their ability to spread wider after exiting the feedblock 2500 lips 2508 and before entering a full web width extrusion die 2702. In one embodiment, the final balloon extrudate stacking layer 100 widths exiting the feedblock lips 2508 are narrower than after they pass through a full web width extrusion die 2702. For example, a feedblock 2500 lips 2508 may extrude the balloon stacking layers at a width of 0.3 m, and the stacking layers are then passed into a full width extrusion die 2702 to obtain a full web width of 3 m wide. In another embodiment, the final balloon extrudate stacking layer 100 widths exit the feedblock 2500 lips 2508 at a width of 0.3 m and remain the same 0.3 m with after passing through a full web width extrusion die 2702, with a final end encapsulation extrudate 2601 taking up the remaining 2.7 m of the web width. By varying the flow and pressure of the final end encapsulation extrudate 2601 as compared to the flow and pressure of the final balloon extrudate stacking layer 100, ever increasing and decreasing widths of both extrudates can be achieved and on-the-fly irregular coextrusion shapes can be made, such as a tapered gore balloon 2703. After the tapered balloon 2703 is coextruded, the balloon 2703 may be delaminated or trimmed away from the final end encapsulation 2601 at separation line 2705.

In one embodiment, a high altitude balloon envelope is coextruded by the various extrudate materials passing through a series of feedblock dies before reaching the final extruder die head. In the feedblock dies, one or more extrudates may be positioned side by side, stacked, multiplied, and otherwise manipulated in a narrower format before passing through a oftentimes much wider extrusion die head and extrusion die lips.

In one embodiment, no feedblock is used and the extrudate materials are directly positioned and extruded from the extruder die head. In another embodiment, one or more feedblocks are used to position side by side and stack two or more extrudate layers before passing the layers through the extrusion die head. In another embodiment, a feedblock fully or almost fully positions the high altitude balloon extrudate layers in their required placements before widening the coextruded layers to pass through an extrusion die head. In another embodiment, the extrudate layers are directly extruded out through a feedblock and do not pass through an additional extrusion die head.

Many side by side and stacking extrudate configurations are possible. Permanent, semi-permanent, or even one-time-use feedblock components may be used to switch between different balloon shapes, designs, sizes, and other custom requirements. For example, a permanent feedblock may be introduced into the coextruded balloon manufacturing system that makes only one type of coextrusion. Though some parameters may be modifiable, such as layer thickness and tapering dimensions of panel widths, other parameters may remain the same during the fabrication of a large number of high altitude balloons. In another embodiment, a custom feedblock may be designed and inserted into the coextruded balloon manufacturing system that allows for design customization, however the line may need to be halted for a short period in order to switch out the semi-permanent feedblock components.

Another embodiment provides many possible design changes and fast design turnover. Time is saved by avoiding the need to clean parts covered with caked-on burnt extrudate. In this embodiment, feedblocks and feedblock components are made by 3D printing, providing for complex extrudate flow paths that would otherwise be difficult or impossible to realize. For example, many current feedblocks are CNC machined and certain internal cavities and curves can only be introduced by splitting up a part into several smaller sub-parts. This can create problems at the time of feedblock use. Low cost 3D printed feedblocks or feedblock components can test dozens of different high altitude balloon configurations, and after each use the parts may be cleaned or simply discarded.

3D-printed extrusion feedblock and extrusion die head embodiments allow for extremely small extrusion gaps and complex flow paths to be utilized to make high altitude balloons. Where it may be extremely difficult to traditionally machine a small extrusion gap under 1 mm in width, cutting edge 3D printers allow for sub-millimeter accuracy, and tolerances are likely to continue to improve in the future. Die twists and turns, layer positioning, and ultra-thin layers can be realized by means of 3D printing of extrusion parts from materials such as but not limited to heat-resistant plastics, metals, composites, and the like.

In one embodiment, high altitude balloon feedblock cartridges are used to quickly switch between different balloon sizes, shapes, and other configurations. In another embodiment, a non-balloon manufacturing line may switch between manufacturing balloons and other products by swapping out appropriate feedblock cartridges. For example, a geomembrane manufacturing line may have a geomembrane feedblock cartridge and swap out the geomembrane feedblock cartridge with a high altitude balloon feedblock cartridge for a period when balloons are needed. After the high altitude balloons have been made using the balloon feedblock cartridge, the geomembrane feedblock cartridge can be reinserted and the line can return to manufacturing geomembranes. Similar cartridges can be made for other products such as agricultural covers, blimps, tarps, plastic sheeting, and the like. This way, multiple products can share a single line and lower the CAPEX for each product given more line utilization and fast product turnover.

From a prototyping perspective, the ability to test out many different designs by printing new versions gives an advantage over permanent to semi-permanent feedblock designs that require weeks to modify and hours to insert, remove, and clean. In addition, the price of 3D-printed feedblock components can often cost less than the price of permanent to semi-permanent feedblock options, thus allowing more prototypes to be built and more designs to be tested. By 3D printing designs modification "on the fly", new coextrusion designs can be introduced and improved upon on a same test-day basis.

In various embodiments: the coextrusion feedblock is machined from steel or other hard metal material, or from high temperature resistant plastic, including but not limited to polytetrafluoroethylene (PTFE), or it is machined or molded from a composite material, such as a carbon fiber, fiberglass, or other composite material, or it is 3D printed from steel, hard metal materials, high-temperature-resistant plastic including but not limited to PTFE, or a composite material such as a carbon fiber, fiberglass, or other composite material. 3D printed carbon fiber parts are currently marketed as having a higher strength to weight ratio than aluminum parts. The superior stiffness and lightness of carbon fiber and other composite materials allow for very thin and narrow channel extrusion feedblock dies. Many such materials cannot easily be machined, and therefore 3D printing provides for using many cutting-edge materials not commonly used in today's feedblocks.

3D printing permits embedding sensors and other devices in extrusion feedblocks. For example, in one embodiment a pressure sensor may be introduced into a 3D printed extrusion feedblock channel so that the pressure in the extrusion system can be lowered automatically if needed. Other sensors and devices can be added within the 3D printed extrusion feedblocks, even including tracking components that allow the coextrusion web width to increase and decrease to follow the desired tapering of a high altitude balloon gore design. By embedding a material into the 3D printed feedblock that can be caused to expand and contract, for example by electrical signals or the like, one or more portions of the feedblock can be narrowed, expanded, or completely closed off to allow for custom designs on the fly. An example of a carbon fiber 3D printer is the MarkForged™ Onyx One™ printer. 3M™ has been developing a 3M™ Dyneon™ PTFE 3D printer having parts that can withstand temperatures over 260° C. 500° F.), much higher temperature than what many high altitude balloon extrudates reach during coextrusion. One example of a metal 3D printer is a MarkForged™ MetalX™ 3D printer.

Figure 28:
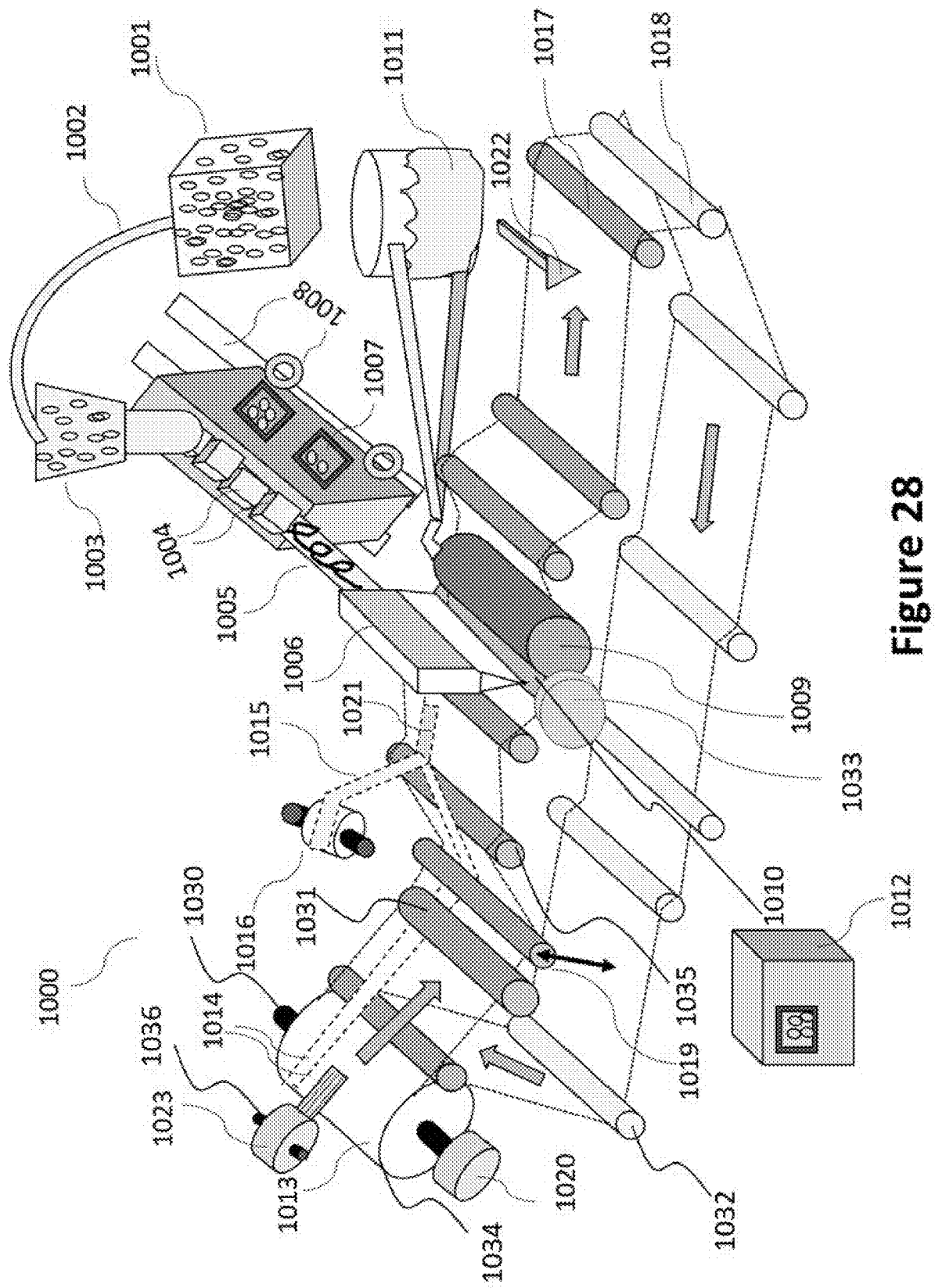
FIG. 28 is a perspective view of a balloon extrusion fabrication line according to an embodiment.

FIG. 28 illustrates an embodiment of a high-altitude balloon extrusion manufacturing apparatus. The apparatus includes an extrudate dispenser which may include an extrusion pellet hopper 1003, a T-die extruder 1006 disposed to receive extrudate from the extrudate dispenser, a chill roller 1009 and a pressure roller 1010 disposed to receive extrudate from the T-die extruder, and a support having a generally planar supporting surface disposed to receive the extrudate from between the chill roller and the pressure roller. In the embodiment as illustrated, this support is provided by pre laser-scored separation film 1013 that is dispensed from a dispenser 1034. A friction brake 1020 may be coupled to the film dispenser 1034.

The extrudate and separation film 1013 pass around first and second looping rollers 1017 and 1018 and beneath themselves around a third looping roller 1032 to travel in a 360 degree looped web, going around a fourth looping roller 1030 beneath the next part of the separation film 1013 as it dispenses.

In some embodiments, plastic balloon panel pellets are stored in a bulk pellet container 1001 and are vacuumed up by a vacuum system 1002 into the extrusion pellet hopper 1003. The pellet hopper 1003 dispenses the balloon material pellets down into an extrusion screw 1005 which mixes and moves the plastic pellets along zoned heating elements 1004. The temperature of the pellets may be controlled through by a heated zone control panel 1007 to maintain the extrudate at a desired viscosity.

A power drive may be mechanically coupled to the extrudate. For example, a drive shaft of an electric or hydraulic motor 1033 may be coupled to the pressure roller 1010 directly or through a gear box or other transmission.

In some embodiments the high altitude balloon extrusion line 1000 provides tendon lines, for example spread row tendon lines 1023 disposed adjacent to, or embedded in, the extrudate. A rollstock of spread tow tendon lines 1023 is dispensed, for example from a dispenser 1036 that may be disposed atop or below the separation film dispenser 1034. Or the tendon lines may be included with the separation film 1013 and dispensed along with it.

After the balloon panels have been extruded, a trimmer 1022 can trim off any excess balloon panel and layer-separation film layers that lie beyond the bonded panel seams.

A cooler 1011 may be provided to cool the chill roller and with it the extrudate. For example, in the embodiment as illustrated the chill roller is connected by suitable plumbing to a cold water reservoir, and a pump may be used to circulate cold water through the chill roller.

Some embodiments include a tension dancing bar 1019 or other web control or tensioning devices in the flow path of the film 1013. The tension dancing bar 1019 maintains a constant tension and limits any web wrinkling or stretching.

The extrudate emerging from between the chill roller 1009 and pressure roller 1010 on the film 1013 adheres to the balloon material extrudate of the layer beneath it to create a seam via an opening 1021 created in the film 1013 called a "window channel". The chill roller 1009 and the pressure roller 1010 are able to handle an ever increasing thickness of web layers due to their having spring-loaded, pneumatic, or hydraulic gap control (not shown) based upon an even pressure profile across the web, rather than a fixed gap between the two rollers that would jam up as successive layers of material increased. The entire line operation has a main controller 1012 that may include PLC where an operator can monitor and change settings on the fly.

In one embodiment, the balloon panel extrudate comprises a multi-layer co-extrusion made up of two or more individual extrudate layers that join in the T-die 1006 feedblock to extrude as one multi-layer balloon panel film. The different multi-layer balloon panel layers can be made from the same base material (i.e. LDPE) or they may be different materials and adhesives known in the art such as LDPE-TIE-EVOH-TIE-LDPE or Nylon-TIE-NYLON-TIE-LDPE, among thousands of other multi-layer combinations. In the case of more than one base material being used in a multi-layer balloon panel extrudate, additional balloon material pellet containers 1001, vacuum systems 1002, hopper systems 1003, extruder screws 1005 and extruder heating zones 1004 or other additional parts may be required.

The chill roller 1009 has intake and outtake hoses attached to the ends that circulates water through the roller, through the hoses, and through a chill roller water holding tank to create a circulating chill roller water circulation system 1011.

In order to create the layer separation layer "window channel", the narrow film section in between the two parallel laser-scored lines 1015 is peeled back and rewound on a window channel film roll 1016 for recycling or disposal. After the extruded balloon panels have all been extruded, the extruder system including the T-die head 1006 can roll back on its trolley and track sub-assembly 1008 as the extrusion is often allowed to continually flow from the T-die head 1006 to keep it at the right molten extrudate consistency until the next high altitude balloon is ready to start. One or more additional high altitude balloon extrusion lines 1000 can be introduced using the same T-die head 1006 so that the system can alternate between the two or more lines and allow the T-die head 1006 to flow freely.

Figure 29:
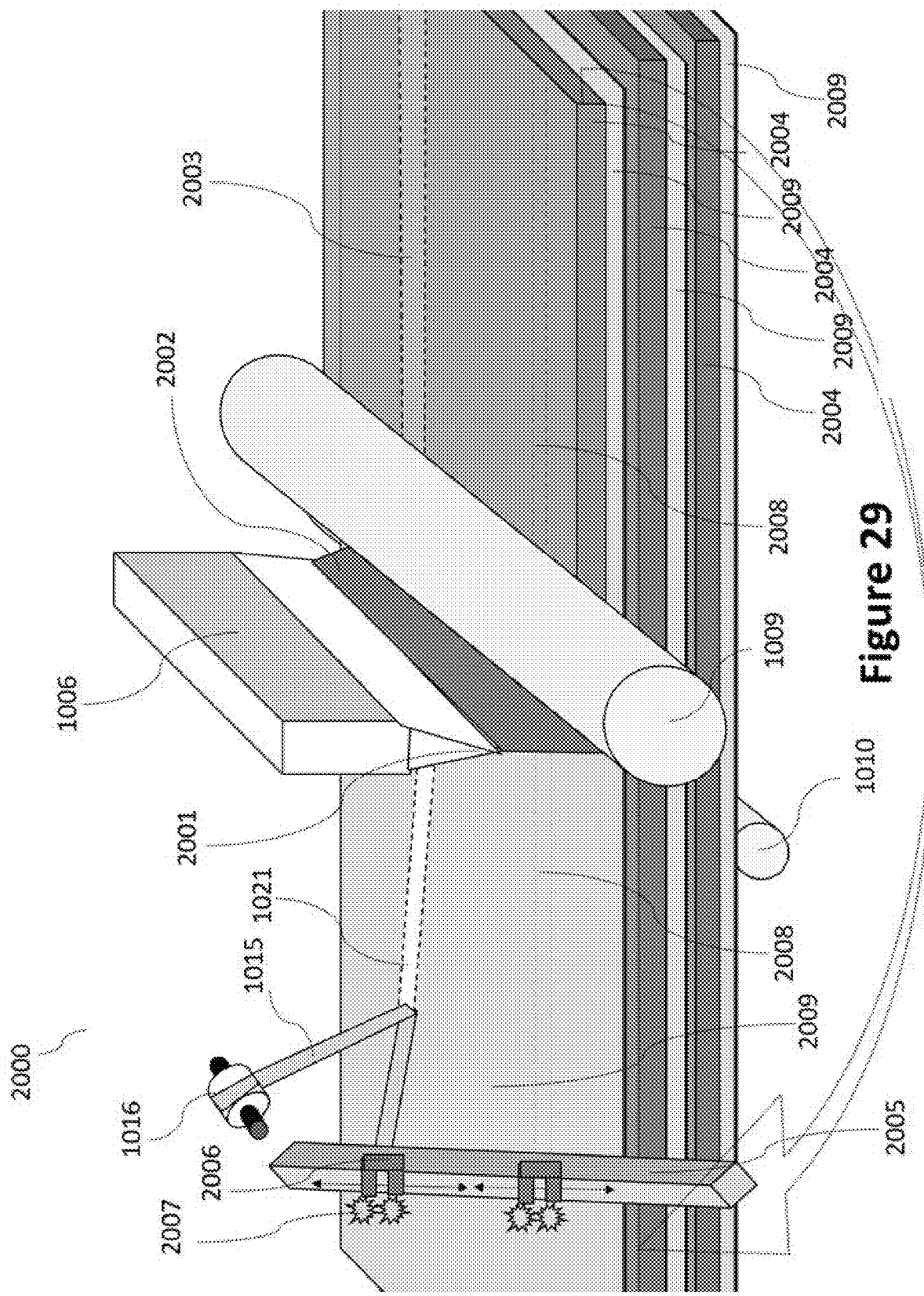
FIG. 29 is a close-up view of T-die extruder 1006 and associated components of FIG. 28.

FIG. 29 shows a portion of a high altitude balloon extrusion line according to the present disclosure. A layer separation film layer 2009 and balloon panel extrudate layer 2004 are successively stacked to create a high altitude balloon by alternating balloon panel seams 2003/2008 which are created thorough a small opening in the layer separation film 2009 called a "window channel" 1021. The window channel 1021 appears when the narrow film peeled back section 1015 is removed from the layer separation film 2009 and rewound on roll for recycling/disposal 1016.

Instead of using pre laser-scored layer separation film 1013 like in FIG. 28, FIG. 29 illustrates how an in-line laser-scoring machine 2005 can be mounted on the balloon line to create laser perforation lines 2007 via translating laser heads 2006 on the fly.

FIG. 29 also illustrates how a balloon panel extrudate "curtain" 2002 exits the T-die extruder lips 2001 and is compressed along with the other layers between a chill roller 1009 and pressure roller 1010. The newly extruded balloon panel layer and other panel layers beneath it will pass along system idler rollers 1017/1018 in a 360 degree looping fashion and the current extruded balloon layer will become the 2nd balloon layer with a laser-scored film layer on top of it. The laser-score lines will move across the web (or a second set of laser-score heads turn on) to create the right seam position 2008 and the narrow layer separating film between the two parallel lines 1015 will be rewound on a disposal roll 1016 to create the window channel 1021 for the right seam position 2008. The bonded seam on the left side 2003 will shift to the right seam side 2008 during the next 360 degree pass as the balloon needs an accordion left/right panel bonding seam sequence to eventually deploy into a large 3-D inflatable structure.

Figure 30:
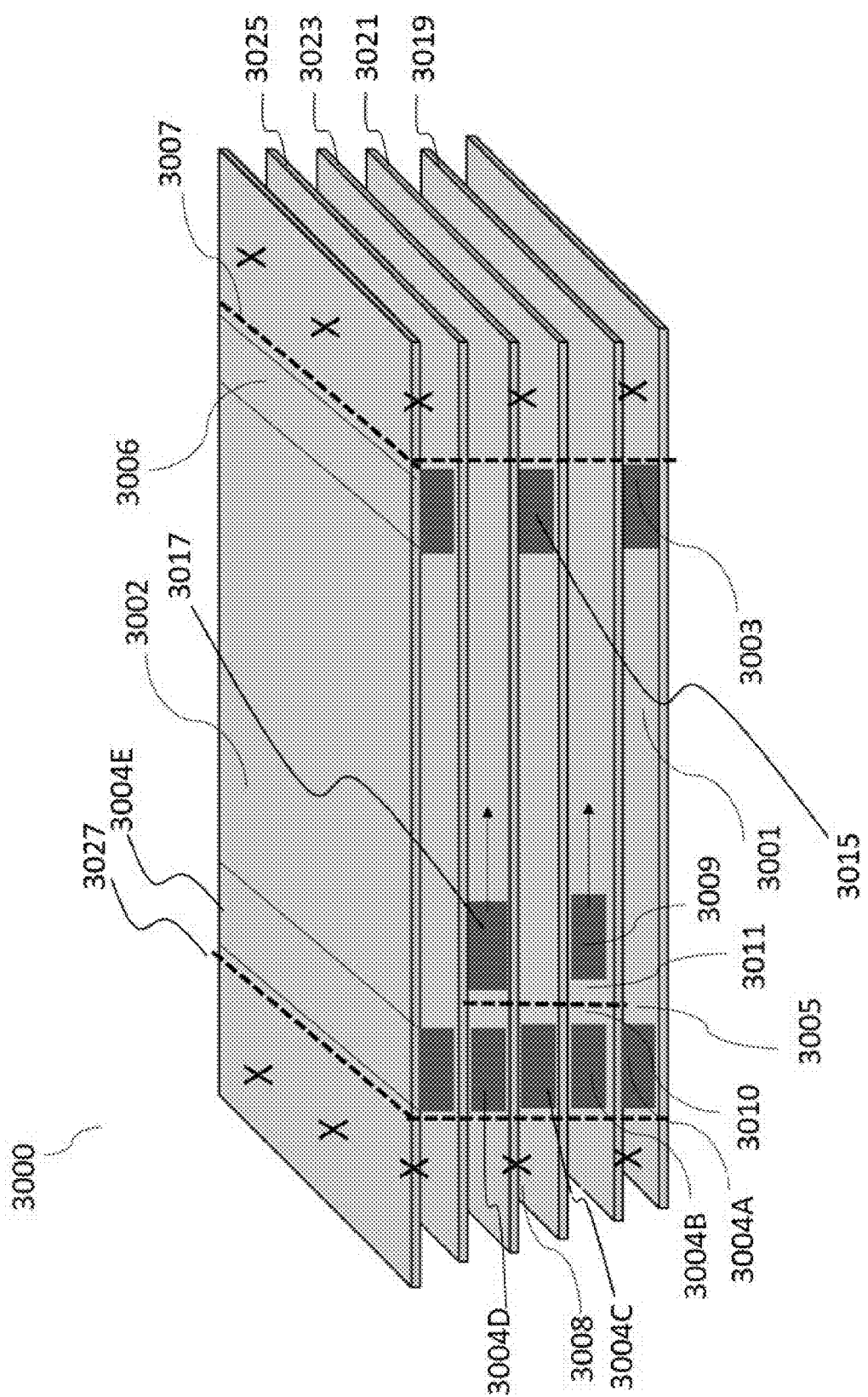
FIG. 30 is a perspective view of a cut-away portion of a flat stacked extruded cylinder-shape high altitude balloon according to an embodiment.
Figure 31:
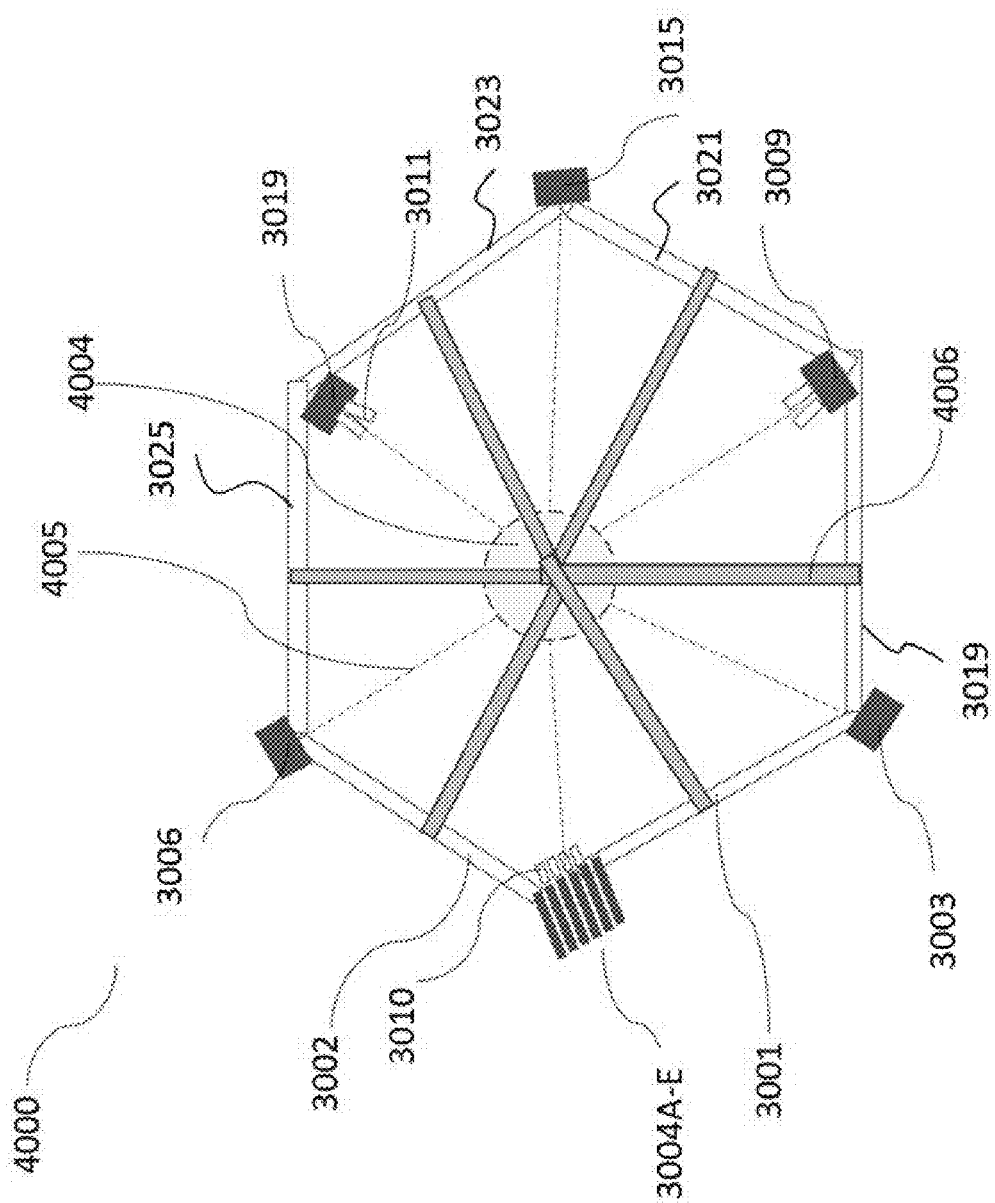
FIG. 31 is a top view of an inflated flat-stacked extruded high altitude balloon depicting both a cylindrical shape and a spherical shape according to an embodiment.

FIG. 30 shows a flat stacked extruded cylinder-shape high altitude balloon according to the present disclosure. FIG. 31 helps illustrate what the balloon of FIG. 30 will look like after being trimmed, separated and inflated (without the cylinder end-caps or tied off ends).

FIG. 30 shows six extruded balloon panels comprising a flat stacked balloon 3000, including 4 extruded balloon panel layers 3019, 3021, 3023, and 3025 between a bottom extruded balloon panel 3001 and a top extruded balloon panel 3002. The top and bottom balloon panels 3002 and 3001 are joined at stacking layer seams 3004A through 3004E that stack up through all the extruded balloon panel layers. The bottom 6th) balloon panel 3001 is joined to the 5th balloon panel 3019 at a seam 3003. The 5th panel 3019 is joined to the 4th panel 3021 at a seam 3009. The 4th panel 3021 is joined to the 3rd panel 3023 at a seam 3015. The 3rd panel 3023 is joined to the 2nd panel 3025 at a seam 3019. The 2nd panel 3025 is joined to the top panel 3002 at a seam 3006. For illustration clarity FIG. 30 does not show layer separation layers like FIGS. 28 and 29, however the balloon panel seams can be achieved by using a layer separating film and opening up laser-scored "window channels", among other layer separating barriers, films, coatings and additional seam bonding/non-bonding isolation technologies.

The excess material 3008 on the left extending beyond the seams 3004A to 3004E can be trimmed by a trimming system 1022 at a trim line 3027. Similarly, excess material on the right can be trimmed at a trim line 3007 as indicated by "X" marks. The interior balloon layers 2-5 can be cut from the stacking layer seams 3004A to 3004E along a trim/laser-score line 3005 that is formed as each layer is bonded to the one below it, so that the seam 3009 and the seam 3017 can separate upon inflation, enabling the envelope to deploy out into a 3-D shape. Depending upon how much space is between the scoring/trim line 3005 and the seams 3009 and 3017, there may remain film tabs 3010 and 3011 that extend just beyond the seams 3009 and 3017.

FIG. 31 shows an inflated view of a flat stacked extruded cylinder-shape high altitude balloon according to the present disclosure to help visualize how FIG. 30 would generally look when opened up, with a few additional components such as tendon lines 4006, termination end cap 4004 and spherical balloon seam lines 4005. FIG. 31 also illustrates an inflated view of a spherical-shaped flat stacked extruded balloon according to the present disclosure if the illustrated cylinder seams were to follow the dotted line paths 4005 up to the balloon end termination fitting 4004.

FIG. 31 shows how some balloon panel seams 3003, 3006, and 3015 are on the outside of the balloon envelope and the others are on the inside of the balloon when it is inflated. The bottom and top balloon panels 3001 and 3002 deploy adjacent each another and are joined at the stack layer seams 3004A to 3004E.

Figure 32:
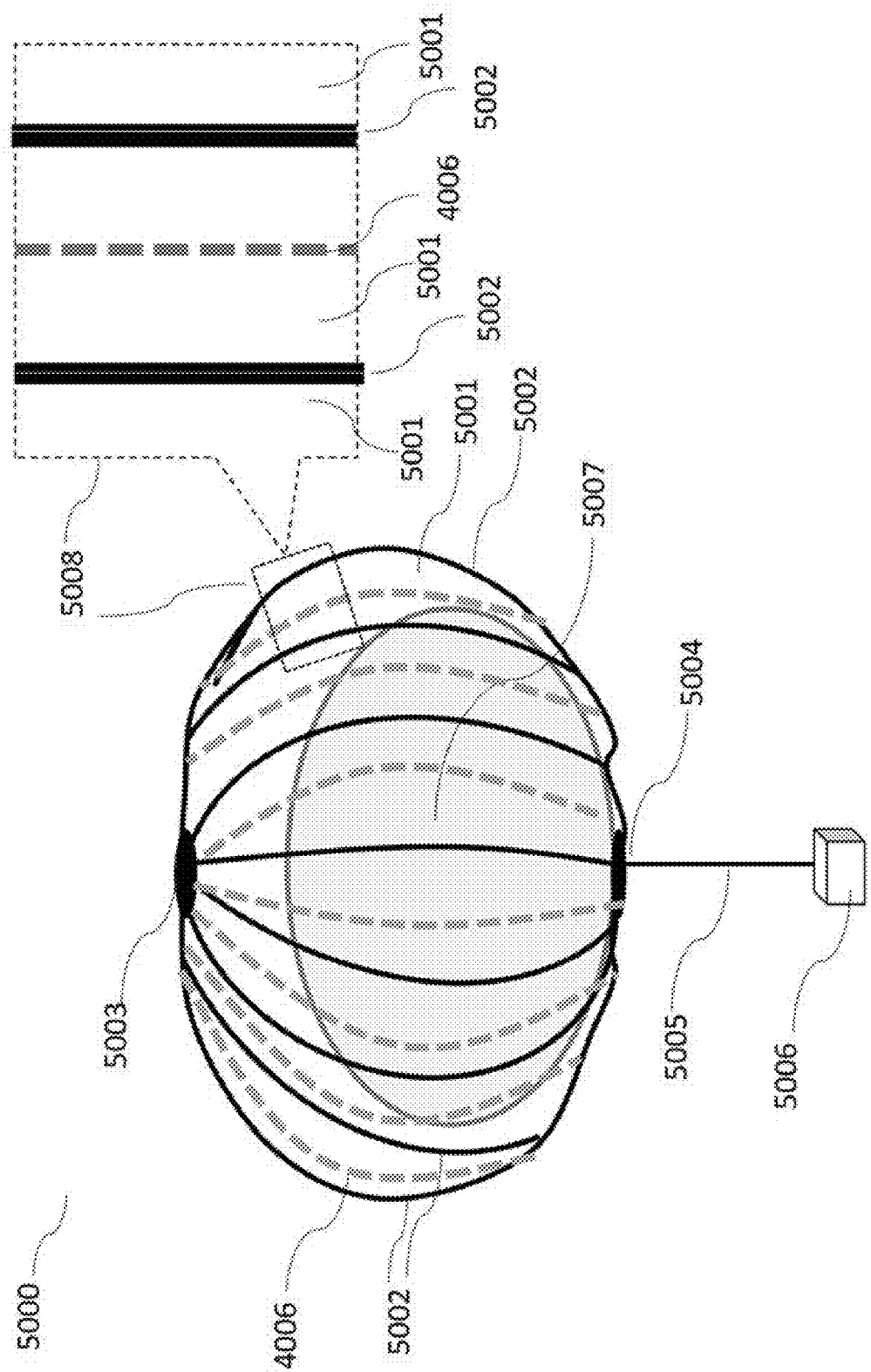
FIG. 32 is a perspective view of an inflated lobed-extrusion high altitude balloon according to an embodiment.

FIG. 32 shows an inflated view of a Lobed Extrusion High Altitude Balloon 5000 according to the present disclosure. The lobed extrusion high altitude balloon 5000 is made up of multiple extruded balloon panels 5001 that are bonded together at extrusion bonded seams 5002. The extrusion bonded balloon seams 5002 travel all the way from the bottom balloon termination end cap/fitting 5004 up to the top balloon termination end cap/fitting 5003. Balloon tendon lines 4006, also known as restraint lines or load lines, may also travel all the way from the bottom balloon termination cap 5004 up to the top balloon termination end cap 5003 adjacent the extrusion balloon panels 5001 or the extrusion bonded seams 5002. In one embodiment, the lobed extrusion high altitude balloon 5003 acts as the balloon outer shell, also comprising an interior ballast balloon 5007 to help raise and lower the balloon's altitude to control the balloon position among stratospheric wind patterns. The lobed balloon 5000 can also include a payload line 5005 and a payload 5006. The cut-out view of a portion 5008 of the lobed high-altitude balloon 5000 helps illustrate a close-up of the extruded balloon seam and tendon lines.

FIGS. 33A through 33E are directed to balloon tendon line ropes. FIG. 33A shows a balloon tendon line rope 4006 according to the present disclosure that is made up of multiple individual tendon line fibers or sub-groupings of fibers/yarns 6001. In one embodiment, a tendon line rope is made from hundreds or thousands of individual fiber lengths 6001 that are joined together to create a balloon tendon line of sufficient tensile strength for holding a payload 5006 and to help create lobed high altitude balloons 5000.

FIG. 33B shows a spread tow embodiment of a balloon tendon line 4006 according to the present disclosure made of up multiple individual tendon line fibers or sub-groupings of fibers 6001. These individual fibers/yarns or sub-grouped fibers 6001 are kept together from fraying apart by use of a removable backing layer or a permanent "fray prevention" thin mesh or stabilizer 6002. One example of a fiber stabilizer is a carbon fiber stabilizer from Web-Lock®. In one embodiment of a spread tow tendon as shown as FIG. 33B, the fibers 6001 are flattened out to a consistent thickness over a 4-10× wider surface area than the fiber rope embodiment shown in FIG. 33A, and thus has only a fraction of the fiber rope's thickness. The spread tow fiber shown in FIG. 33B allows for balloon tendon lines to be more easily added into a high altitude balloon extrusion line 1000 without causing large bumps and irregularities in the multiple balloon panel web layering process. Spread tow fibers in a unidirectional orientation, meaning that they are straight fibers and are not woven with other fibers in different directions, are able to give the exceptional tensile strength per weight ratio desired for high altitude balloon systems, especially when using fibers such as carbon fiber, fiberglass, Kevlar®, Zylon®, Innegra®, or the like.

FIGS. 33C and 33D show a partially-encapsulated spread tow tendon line made of up multiple individual tendon line fibers or sub-groupings of fibers 6001. In order to dispense a near perfectly flat tendon line layer into a high altitude balloon extrusion line 1000, a tendon line layer consistent web thickness gap filler 6003 can be employed. In one embodiment, tendon line layer consistent web thickness gap filler 6003 and an additional encapsulating tendon line layer gap filler 6004 are extruded as one molten extrudate atop of a spread tow tendon line and create a panel layer of sorts that has the tendon line at least partially encapsulated inside it. This tendon line and gap filler 6003/6004 step can be completed on a separate converting line or directly on the high altitude balloon extrusion line 1000. The spread tow tendon line can, but does not need to, adhere to the gap filler 6003/6004 layer(s). In one embodiment the spread tow tendon line is pre-converted onto or into the layer-separation film 1013.

FIG. 33E shows a spread tow tendon line with a tendon line layer consistent web thickness gap filler 6003. In one embodiment, the tendon line consistent web thickness gap filler 6003 does not permanently encapsulate the spread tow tendon line, but rather just fills out the remaining sides of the web where is no tendon line present to maintain a consistent overall multi-layer web thickness, and the tendon line can separate upon inflation. By including the gap filler 6003 along with the spread tow tendon line as one sub-assembly, the extruded panel balloon line 1000 can allow the stacking balloon panel layers to remain as flat and as consistent a thickness as possible.

FIG. 34 shows a 360 degree looping stacked extrusion balloon panel splicing line 7000 according to the present disclosure. FIGS. 34A, 34B, and 34C show the alternating-seam extrusion bonding of multiple panel layers to create a large extrusion spliced sheet 7007 or a high altitude balloon. FIGS. 34A, 34B, and 34C show the three key stages where large spliced sheets 7007, long and wide rectangular shaped sheets for example, can be extrusion spliced to comprise a web material wider than what is available in a given extrusion line width. FIG. 34A shows extruded balloon panel layer(s) 7002 winding around a 360 degree stacked panel splicing line 7000 according to the present disclosure. Multiple extruded balloon panel layers 7002 are extruded from extrusion T-die 1006 and a layer separation barrier layer and "window channel" are used to manage where the extruded balloon panels 7002 bond to one another at alternating seam perimeters 7003 and 7004. The seam between the top and 2nd extruded balloon panel layers 7003 and the seam between the 2nd and 3rd extruded balloon panel layers 7004 are on alternating sides of the 360 degree looping web so that the finished accordion stacked product can deploy out into a sheet wider than the 360 degree looping stacked extrusion balloon panel spicing line 7000 itself. When the multiple panel layers 7002 have finished extruding, 4 full line revolutions to make 4 panels, the looping web can be cut across the web a predetermined loop cut location 7005 to remove the web from the extrusion panel splicing line 7000.

FIG. 34B shows the 4 stacked panels in FIG. 34A cut across the web at a predetermined loop cut location 7005 according to the present disclosure. FIG. 34C shows a single spliced sheet 4 panels) formed according to the unfolding of FIG. 34B in the present disclosure.

In one embodiment, two 30 m×30 m extrusion spliced film squares can be formed from a 2.5 m wide panel extrusion line 7000. The extrusion spliced film squares can then be circumferentially seamed to form a "flat pancake" high-altitude balloon or other inflatable product. In an alternative embodiment, a large 200 m×200 m geomembrane sheet for an artificial pond could be manufactured from a 2.5 m wide extrusion panel splicing line 7000.

A 360 degree extrusion panel splicing line 7000 is utilized in some embodiment, eliminating the need to dispense and lay out long gore film lengths one after another. One of the extrusion panel splicing line's 7000 principal functions is to allow an extruded balloon panel layer 7002 to be continually extruded atop of itself 7002 without having to cut individual sections to length before extrusion bonding. In one embodiment, a 360 degree extrusion line can simply be a few pairs of rollers and drive system 7001 around which the extruded panel layers 7002 can wind/loop over other extruded panel layers 7002 one or more times. Other embodiments allow for many rollers, belts, chains, motors, or the like to be introduced, such as with slider bed belt conveyors, belt-driven rollers, chain driven systems, line shaft drives, power belts, and belt-less systems such as gravity roller conveyors, idler rolls, pinch roller systems, and other web handling rollers, drives, and conveying methods. Roller/conveyor systems are very flexible in use and scalable in size, and thus varying balloon panel size widths and lengths can easily be modified without having to redesign the entire manufacturing set-up. In other embodiments, conveyor belts or rollers can be spliced to accommodate longer lengths as the conveyor/roller supports are usually modular and can be added to with additional modules, drive motors can be upgraded to higher power, and the like. Multiple balloons can also be produced via a single looping extrusion system 7000 and winding process by increasing the number of complete gore lengths per full conveyor revolution and later trimming in the same manner as with a single balloon fabrication process. For example, an embodiment could allow four or five 10 m balloons to be produced on a conveyor line initially purposed for one 50 m balloon.

Given that balloon panel film is traditionally dispensed in long independent lengths, stacked on top of one another over and over until all of the balloon gore lengths have been sealed to one another to form a balloon, a 24-gore balloon would require roughly 24 independent cuts, film table pull-outs, a pre-sealing table positioning arrangement, and a post-sealing table positioning arrangement. The 360 degree extrusion panel splicing line 7000 extrudes the balloon panel layers 7002 in a continuous looping fashion, and thus there is little to no independent gore length cutting necessary. All layers can be cut simultaneously at the predetermined loop cut location 7005 that eventually separates the balloon top end from the balloon bottom end.

360 degree looping stacked extrusion splicing lines 7000 can easily reach many tens of meters per minute and can possibly reach hundreds of meters per minute under the correct web handling parameters. This is significant in the industry of high-altitude ballooning because the one-by-one manual dispensing of film and heat sealing of long gore lengths has hampered mass production and reliable balloon flight. By eliminating manual intervention and simplifying the gore stacking and sealing processes to include a continual 360-degree looping extrusion bonding process, most, if not all, of the balloon manufacturing process can be automated and QA-controlled as all of the balloon panel layers 7002 pass through the same path.

Figure 35:
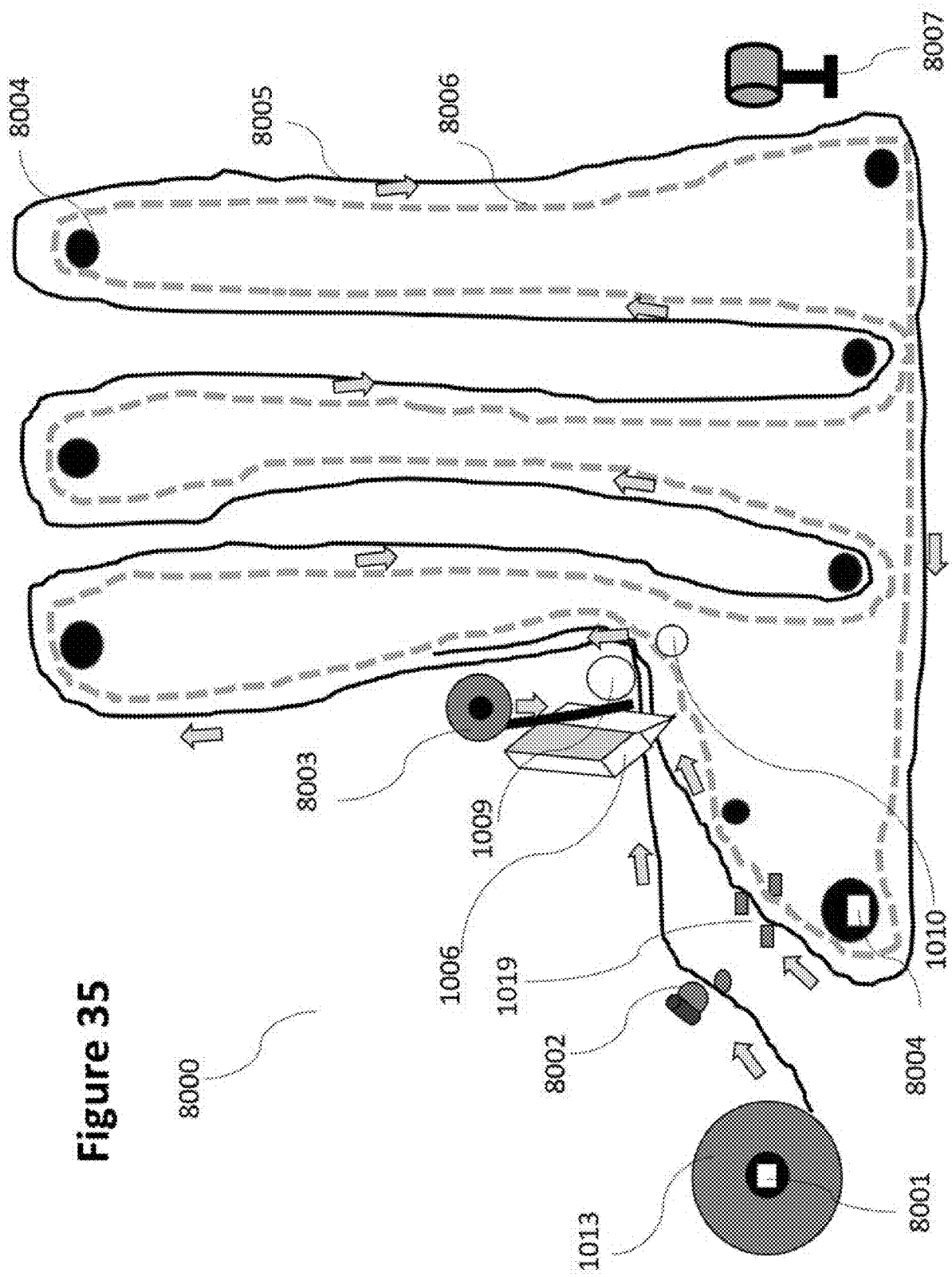
FIG. 35 is a schematic diagram of a zig-zag extrusion laminating balloon manufacturing line according to an embodiment.

FIG. 35 shows a zig-zag extrusion laminating balloon manufacturing line 8000 according to the present disclosure. An extrusion balloon panel manufacturing line similar to shown in FIG. 28 would be able to make a balloon roughly 2× the length of the line itself. That is because the balloon film loops back around to the beginning of the line and is thus 1 line length forward+1 line length return=2 line lengths of material in a loop. There is additional balloon length if you add the height difference between the top forward rollers and the return rollers, but as shown in FIG. 28 a finished balloon may only be a total length of 2.5× the entire balloon line length.

If one wishes to manufacture a massive balloon, where very little floorspace is available, and where vertical building space can be maximized, then the zig-zag manufacturing line of FIG. 35 may be used. In one embodiment a finished balloon may become roughly 7× the length of the balloon manufacturing line 8000 itself. Of course, there is virtually no limit to the size of a balloon that can be made using a zig-zag line until the size of the rollers and access to the rollers and other equipment may lead to issues of practicability.

FIG. 35 shows how a pre laser-scored layer separation film 1013 is dispensed via rollstock using a tension control break 8001. An edge positioning guide 8002 ensures that the layer separation film 1013 lines up where it needs to atop of the preceding extruded balloon panel layer 8005. As the layer separation film 1013 passes under the extrusion T-die head 1006, it joins up with a molten balloon panel extrudate and an additional dispensed balloon panel film 8003, which are all compressed together between a chill roller 1009 and a pressure roller 1010. The multi-layer panel web is propelled via a series of driven rollers and non-driven rollers 8004, past a web inspection camera 8007, and ultimately through a tension dancing bar system 1019 before joining with next layer of layer-separation film 1013 just before the T-die extrusion head 1006 for the next processing loop.

The embodiment shown in FIG. 35 shows an extrusion lamination process whereby a pre-manufactured balloon film 8003 is dispensed into the system and the extrudate acts as an extrusion bonding layer rather than comprise all of the balloon panel film itself. For example, the pre-manufactured balloon filmstock 8003 could be a 0.003" thick co-extruded film of LLDPE-EVOH-LLDPE, and the extrudate coming out of the T-die that bonds the balloon film with the preceding balloon panel layer may only be a 0.001" thick LDPE layer which may not be sufficient alone (in strength or helium barrier) for constructing a long-duration flight balloon envelope. Alternative embodiments can remove the pre-manufactured balloon film rollstock 8003 and rather co-extrude a 0.003" LDPE-EVOH-LDPE multilayer extrudate directly from the T-die 1006 atop of the layer separating film 1013 and "window channel" to bond to the preceding balloon panel layer 8005 at a common seam perimeter as shown in FIGS. 28, 29, and 30.

In some embodiments, it may be helpful to use an initial bottom layer liner/belt 8006 so that the first layer of balloon panel extrudate has a surface to extrude onto. In one embodiment, the layer separation film 1013 can also serve as an initial bottom layer liner/belt 8006. In another embodiment, a different disposable liner/belt, such as a thin paper liner, is used with a non-stick surface, such as a light Teflon® coating. In another embodiment a thin gauge permanent system conveyor belt is used that remains permanently on the extrusion balloon manufacturing line from one balloon manufacturing run to another.

Figure 36:
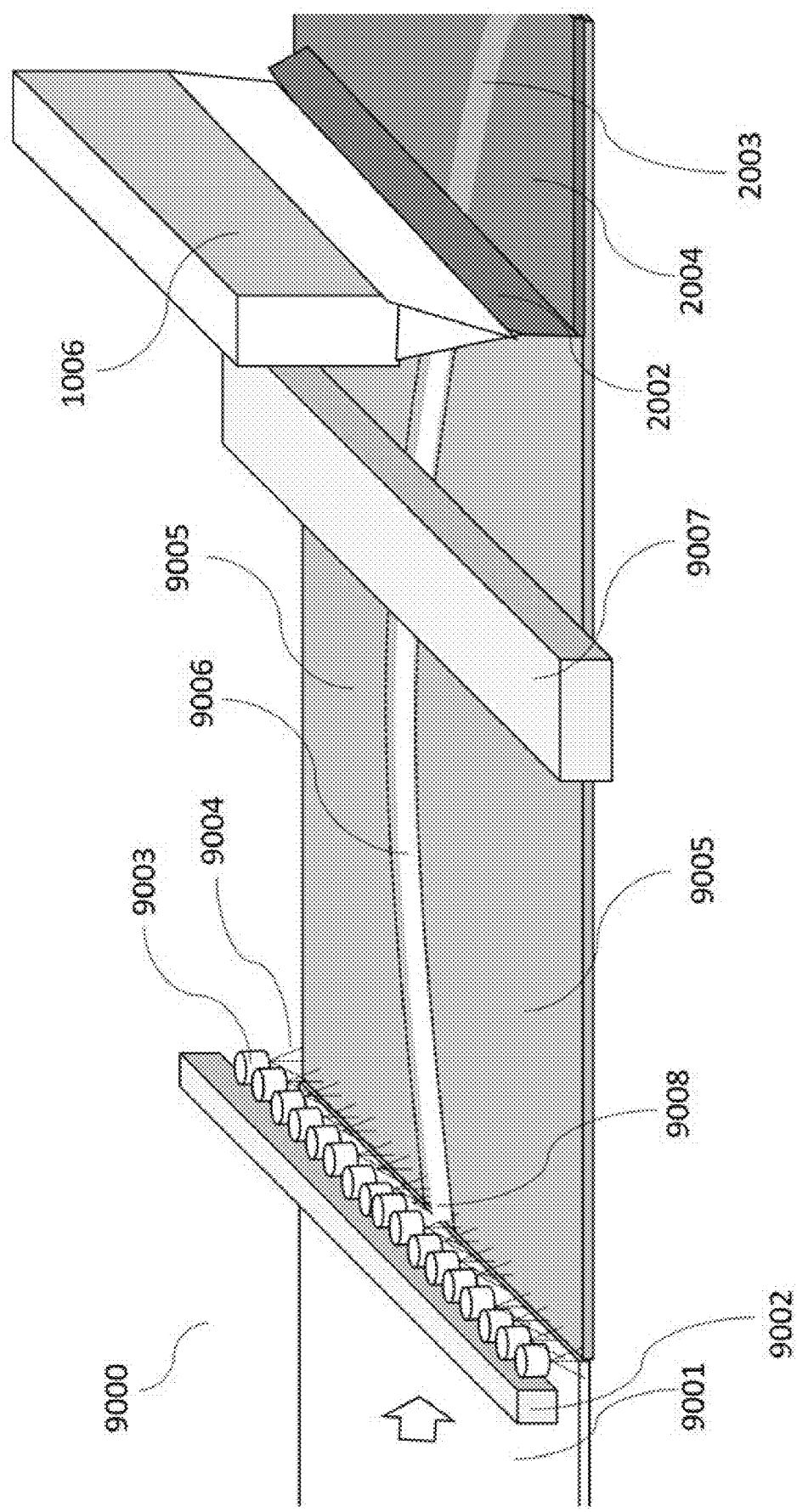
FIG. 36 is a perspective view of a balloon-panel layer separating barrier coating apparatus according to an embodiment.

FIG. 36 shows a balloon panel layer separating barrier coating method and apparatus 9000 according to the present disclosure. FIG. 28 and FIG. 29 illustrate the use of laser-scored layer separating film 1013, but other seam isolation technologies exist to create "window channels" that allow some portions of a given balloon panel layer to bond at a seam location with a preceding balloon panel layer, but not bond at other portions, so that the two balloon panel layers can mostly separate and deploy into a 3-D balloon envelope.

FIG. 36 illustrates how a layer separating film 1013 is not required to create a "window channel", however, alternative embodiments exist where coatings 9004 can be dispensed on top of a layer separating film 1013 for both to be used in conjunction.

In one embodiment illustrated in FIG. 36, a balloon panel 9001 passes through a precision Teflon® web coating system 9002 that is programmed to isolate the ultrasonic spray nozzles 9003 so that most of the web width is coated 9005, while the "window channel" portion 9006 is left uncoated by turning off at least a portion of the ultrasonic spray nozzles 9008. The coated web then passes through a coating curing heater/oven 9007 before passing under the T-die extrusion head 1006 where the balloon panel molten extrudate curtain 2002 extrudes on top of it and all layers pass between a chill roller and pressure roller. The new extruded top balloon panel layer 2004 will not adhere to the preceding balloon panel layer 9001 anywhere apart from the "window channel" 9006 location to create a common panel seam edge 2003. When all of the balloon panel layers 9001 and 2004 have finished processing, the balloon upon inflation will separate at all points 9005 apart from the balloon panel seam locations 2003, deploying into a large 3D shape.

Figure 37:
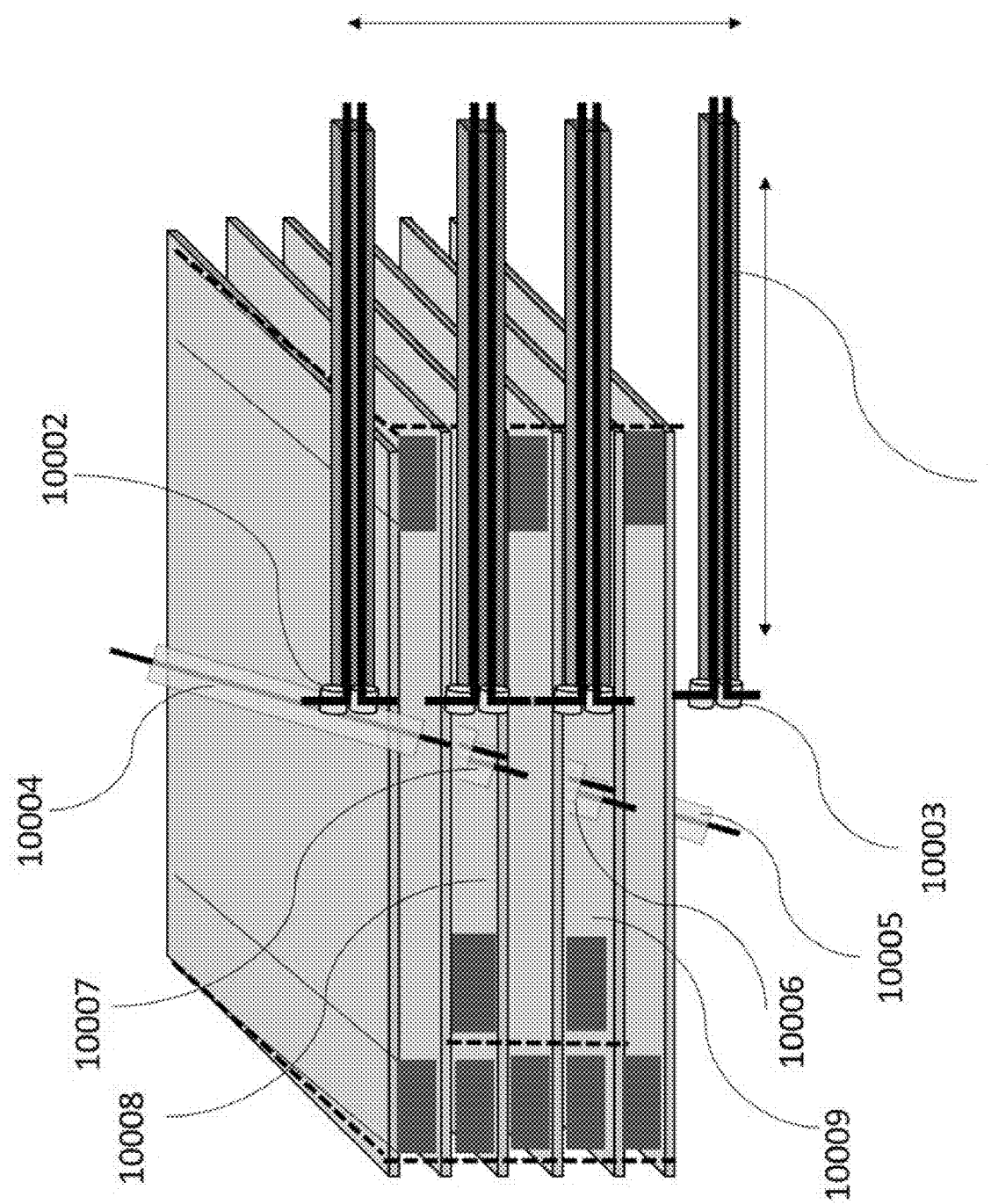
FIG. 37 is a perspective view of a portion of a flat-stacked extruded high altitude balloon with tendon lines attached via a tendon dispensing arm according to an embodiment.

FIG. 37 shows a flat stacked extruded high altitude balloon with tendon lines attached via a tendon dispensing arm 10001, according to the present disclosure. In one embodiment, FIG. 37 is related to FIG. 30 in its general flat stacked balloon structure, and thus the arm access gaps 10008/10009 may be more visible in FIG. 30 where the dispensing arms 10001 are not yet placed.

In some embodiments balloon tendon lines are added to an extruded balloon panel envelope after it has been fully manufactured rather than dispensing spread tow tendon line into the extrusion manufacturing process itself. FIG. 37 shows how a top dispensing tendon line head 10002 and a bottom dispensing tendon line head 1003 can be mounted on a tendon dispensing arm 10001 and inserted into arm access gaps 10008/10009 where there are no edge seams to prohibit the arm from entering. In no preferential order, the top panel tendon line is dispensed along with an adhesive tape "tendon channel" 10004 and then the bottom panel tendon line is dispensed along with an adhesive tape "tendon channel" 10005. Then all of the interior balloon layers are given tendon lines, which as illustrated in FIG. 37 would be upper and lower dispensed tendon lines (with adhesive tape tendon channel) between the 2nd and 3rd balloon panel layers 10007 and the same between the 4th and 5 th balloon panel layers 10006. There are many different ways to add tendon lines to extruded balloons both during and after manufacture.

Figure 38:
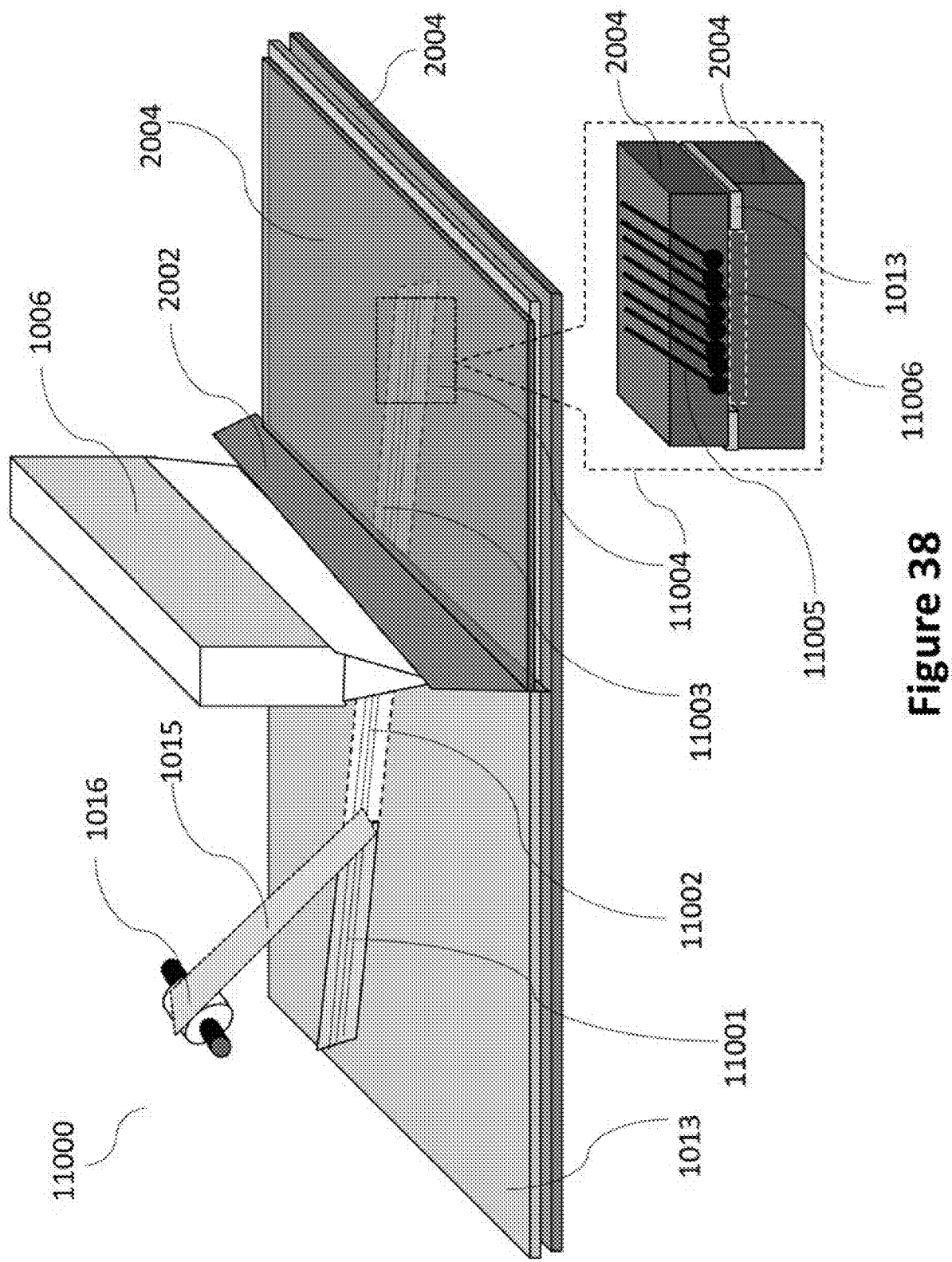
FIG. 38 is a perspective view of a seam-encapsulated tendon line and an apparatus to encapsulate tendon lines in balloon panel seams according to an embodiment.

FIG. 38 shows a seam encapsulated tendon line and a method and apparatus to encapsulate tendon lines in balloon panel seams 11000 according to the present disclosure. In some embodiments of high altitude balloons the spread tow and non-spread tow tendon lines are introduced at least partially into the balloon panel seams rather than be located between two balloon panel seams (i.e. —toward the center of a balloon panel). FIG. 38 shows one embodiment where a pre laser-scored layer separation film 1013 is pre-converted with a spread tow tendon line 11002 located inside the layer separation film's window channel. The laser-scored layer separation film 1013 is dispensed with the pre-converted spread tow tendon line like shown in FIG. 28, and the laser-scored window channel film 1015 is peeled back and rewound on a recycling/disposal roll 1016, exposing the spread tow tendon line inside the window channel opening 11002. The now peeled-back layer separating film and spread tow tendon line pass under the T-die extrusion head 1006 where the balloon melt extrudate curtain 2002 extrudes on top of the layer separating film 1013 and at least one other balloon panel layer 2004, and all layers are passed together between chill rollers and pressure rollers. The top two balloon panel layers 2004 bond together at the seam location 11003 were the spread tow tendon line is now at least partially encapsulated inside the seam. In alternative embodiments, the tendon line does not actually become encapsulated and can separate from the seam upon balloon inflation.

The cut-out view of the tendon line encapsulated inside balloon panel seam 11004 shows clearer the seam encapsulated tendon lines 11005 and the "window channel" gap now filled in with balloon panel extrudate 11006.

Figure 39A:
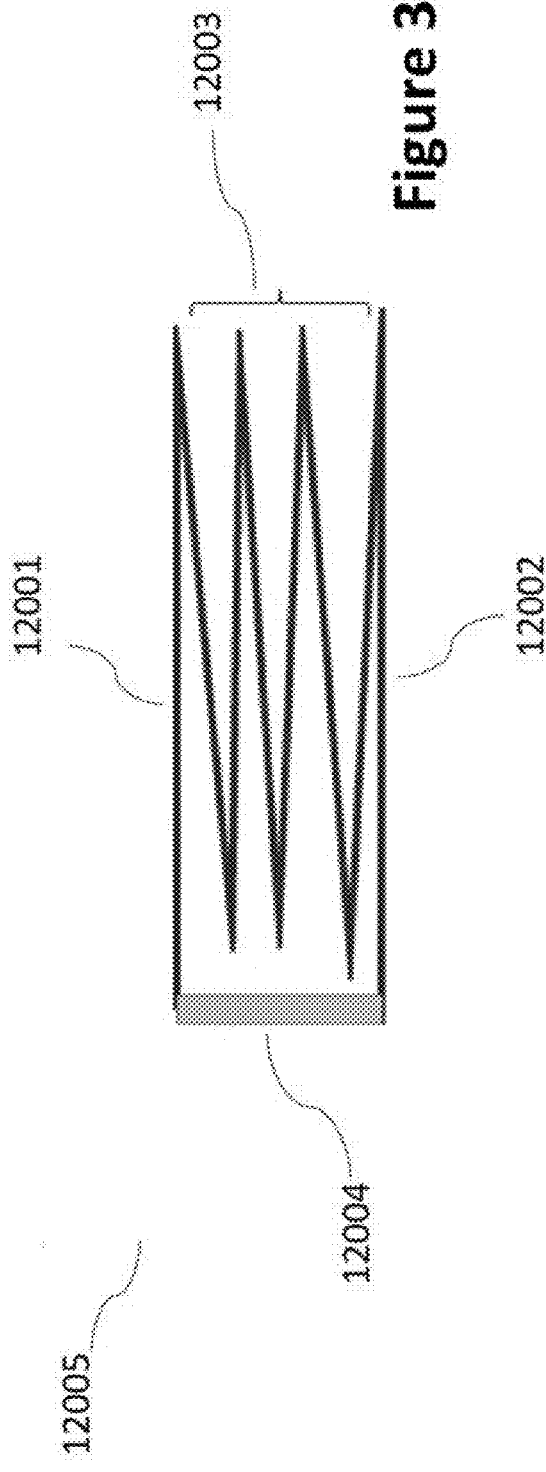
FIG. 39A is a diagrammatic view of a flat-stacked interior-ballast balloon according to an embodiment.

FIG. 39A shows a flat stacked interior ballast balloon 12005 that can be fabricated and afterwards inserted into an outer high altitude balloon envelope 12006 to create a full high altitude balloon with interior ballast balloon system 12007. In one embodiment, an interior ballast balloon 12005 is made up of an extruded bottom balloon panel 12002, extruded stacked balloon panels 12003 and an extruded top balloon closure panel 12001. The interior ballast balloon 12005 may have tendon lines, though it often does not need tendon lines as it will not likely be carrying the payload weight or be highly pressurized like the balloon outer envelope.

Figure 39B:
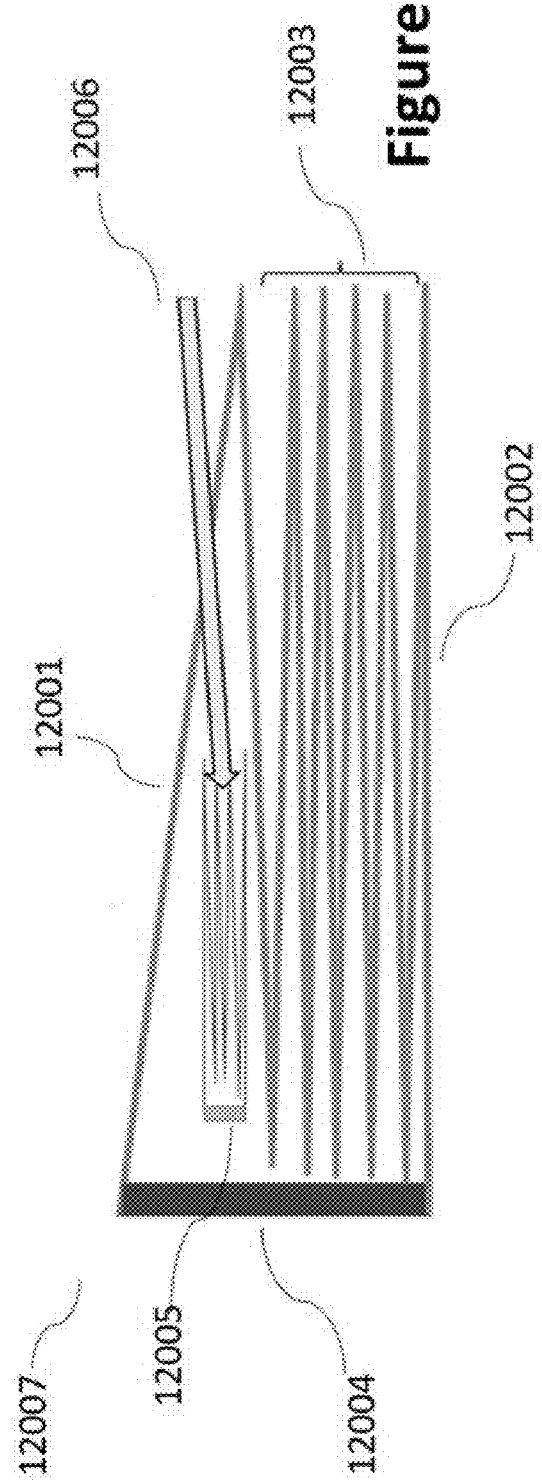
FIG. 39B is a diagrammatic view of a flat-stacked interior-ballast balloon disposed inside a flat-stacked high-altitude balloon outer envelope according to an embodiment.

FIG. 39B shows placing and enclosing 12006 a flat stacked interior ballast balloon 12005 inside of a flat stacked high-altitude balloon outer envelope according to the present disclosure to create a full high altitude balloon with interior ballast balloon system 12007. The finished interior ballast balloon 12005 can be dispensed into the outer high altitude balloon envelope 12006 either before the last outer balloon top balloon closure panel 12001 has been extrusion bonded, or it may be added to the balloon envelope via one of the two balloon end termination cap openings, among other locations for insertion. If the interior ballast balloon 12005 is in a flat stacked format, and the outer balloon envelope is also extruded in a flat stacked format, then inserting the ballast balloon 12005 before closing top panel 12001 can make sense in order to keep everything nice and flat for ease of transport/inflation and to minimize pin hole risks.

Figure 40B:
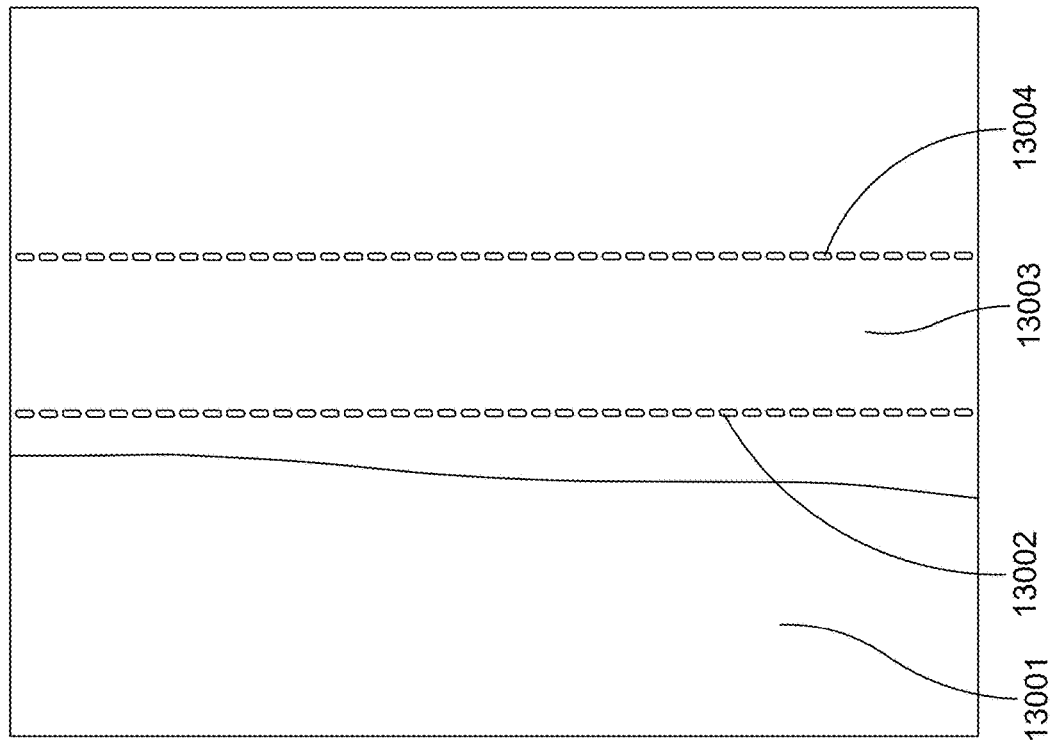
FIG. 40B is an illustration of two parallel laser-scored lines defining a layer separating window channel according to an embodiment.
Figure 40A:
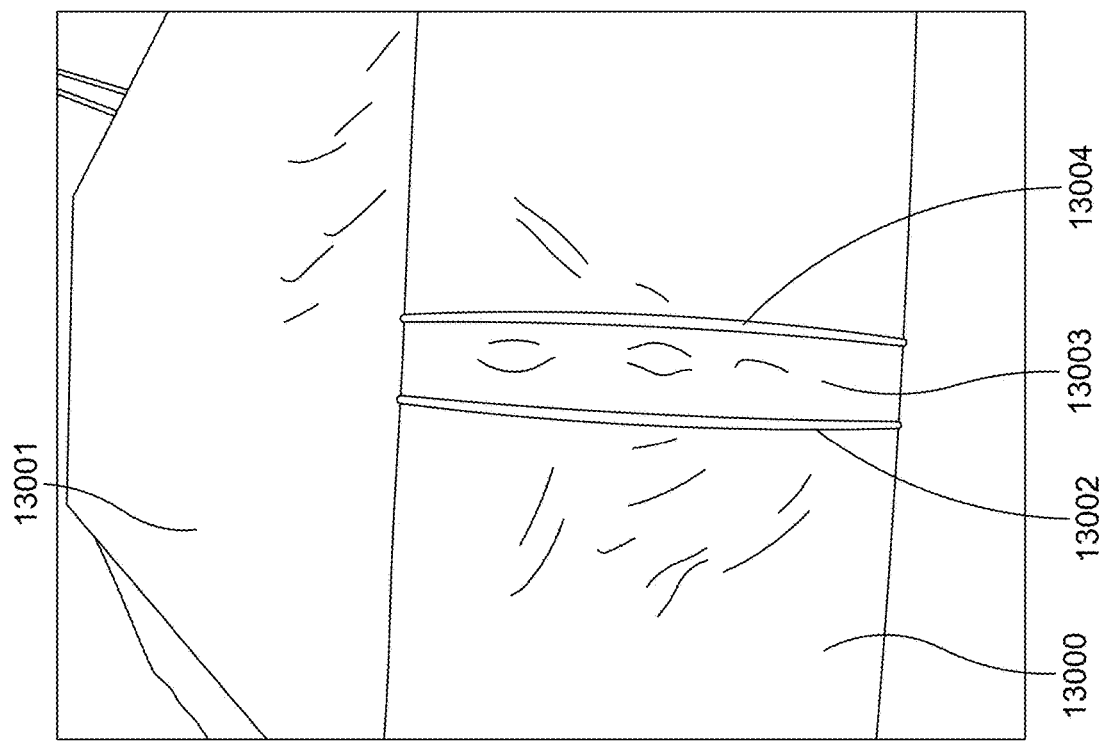
FIG. 40A is an illustration of a pre laser-scored layer separating film rollstock according to an embodiment.

FIG. 40A shows a pre laser-scored layer separating film rollstock 13000 according to the present disclosure. Two laser-scored lines 13002/13004 are scored at a particular base material depth so that the laser-scored window channel film 13003 can be peeled away cleanly from the layer separating film 13001 during balloon manufacture.

FIG. 40B shows a close-up of two parallel laser-scored lines 13002/13004 to create a layer separating "window channel" according to the present disclosure when the window channel film 13003 is peeled back. The layer separating film 13001 does not separate prematurely because the laser-scoring "melt" can be controlled to a particular depth which leaves the rest of the base material film intact until a user/machine is ready to start peeling back the window channel film portion 13003.

Figure 41:
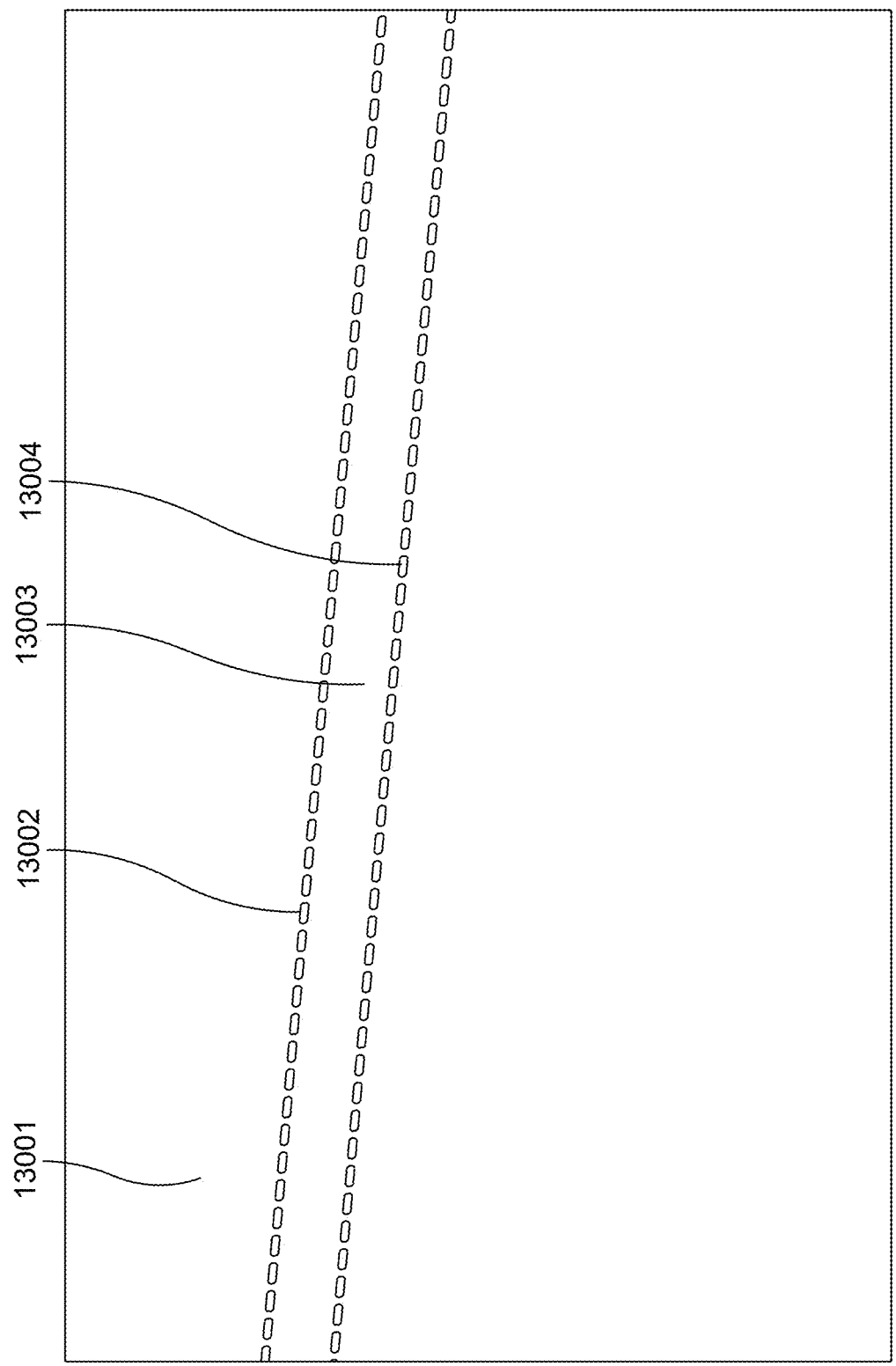
FIG. 41 is an illustration of a laser-scored PET film with two parallel laser score lines defining a layer separating window channel according to an embodiment.

FIG. 41 shows laser-scored PET film 13001 with two parallel laser score lines 13002/13004 to create a layer separating "window channel" when the window channel film portion 13003 is peeled back.

Figure 42:
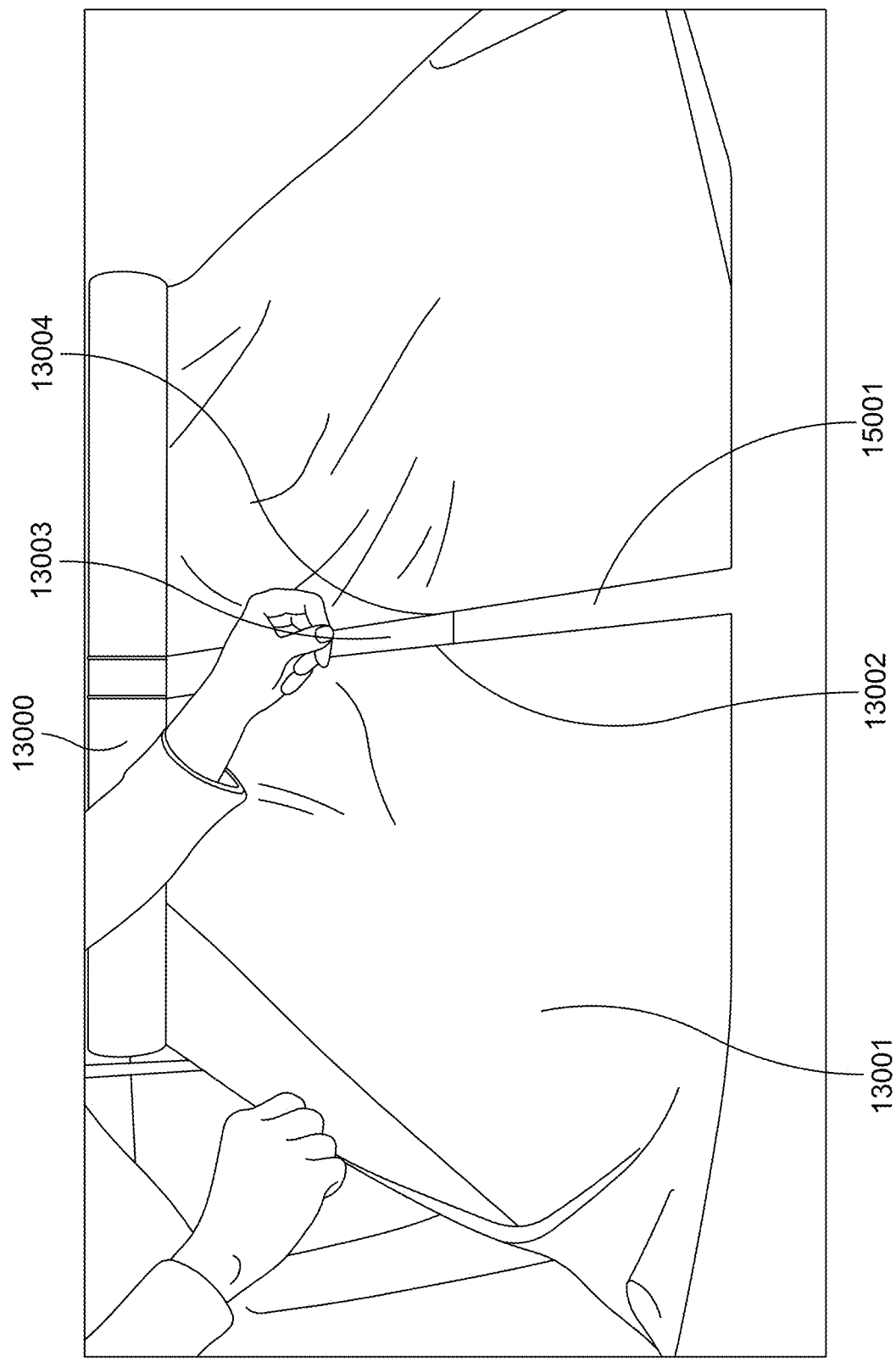
FIG. 42 is a frontal view of a narrow film strip between two laser-scored lines peeled back to define a layer-separating window channel according to an embodiment.

FIG. 42 shows a frontal view of a narrow film strip 13003 between two laser-scored lines 13002/13004 being peeled back to create a layer separating "window channel" 15001.

Figure 43:
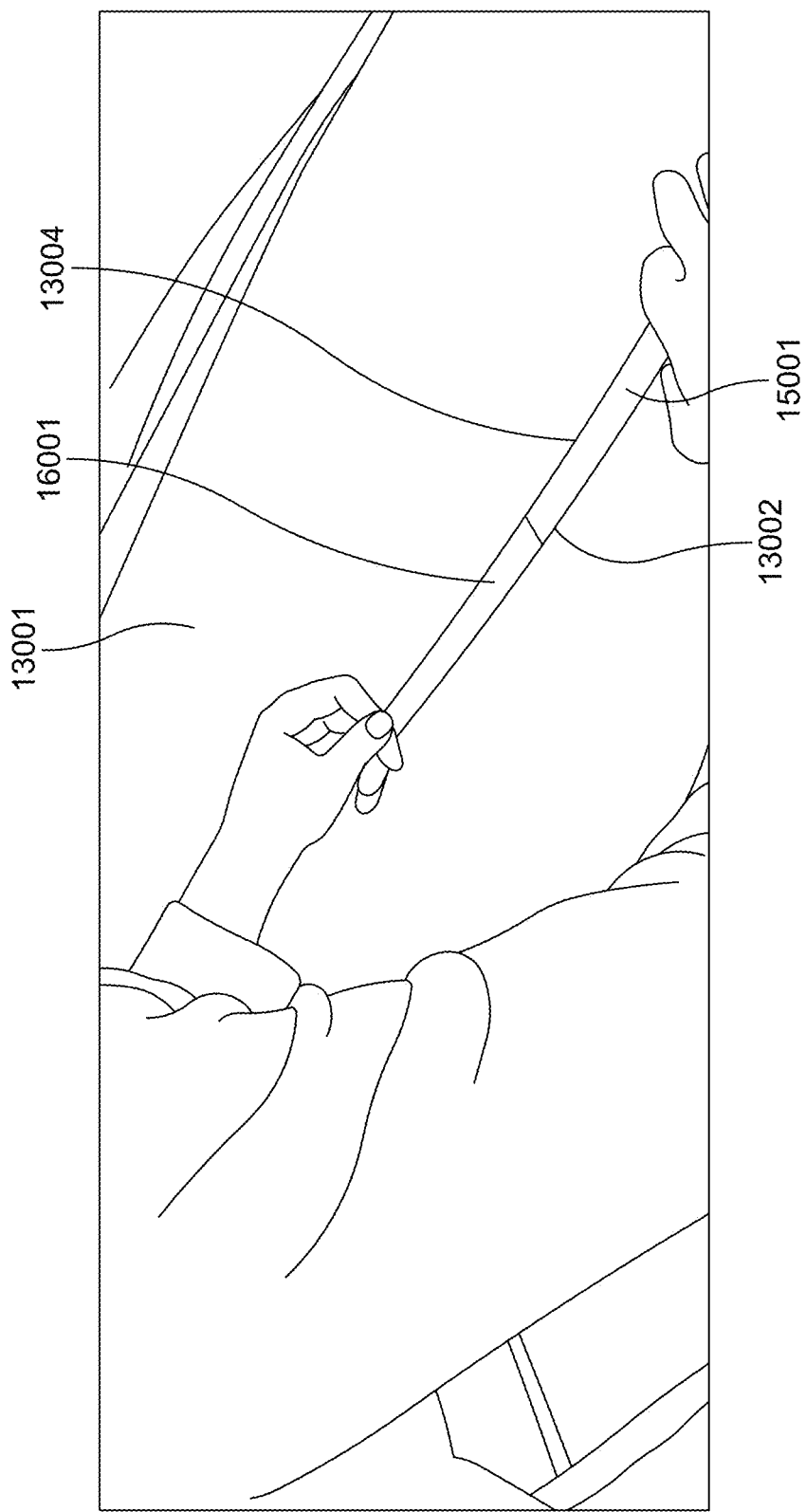
FIG. 43 is a top view of a narrow film strip between two laser-scored lines peeled back to define a layer-separating window channel according to an embodiment.

FIG. 43 shows a top view of a narrow film strip 16001 between two laser-scored lines 13002/13004 being peeled back to create a cleanly peeling layer separating "window channel" 15001.

Figure 44:
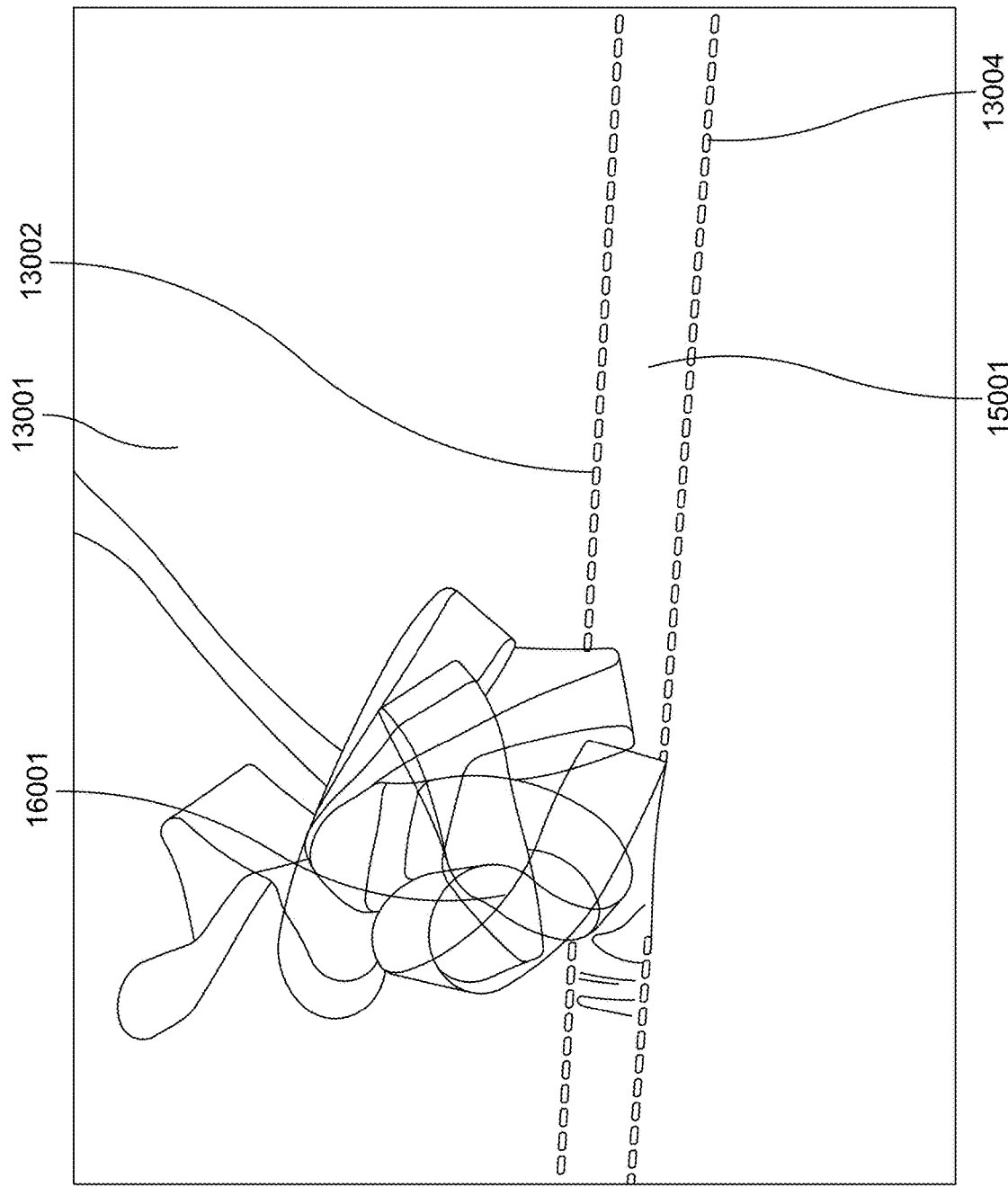
FIG. 44 is an illustration of a narrow film strip between two laser-scored lines peeled back to define a layer-separating window channel according to an embodiment.

FIG. 44 shows a close-up view of a bunched up narrow window channel film strip 16001 between two laser-scored lines 13002/13004 peeled back to create a layer separating "window channel" 15001.

Figure 45:
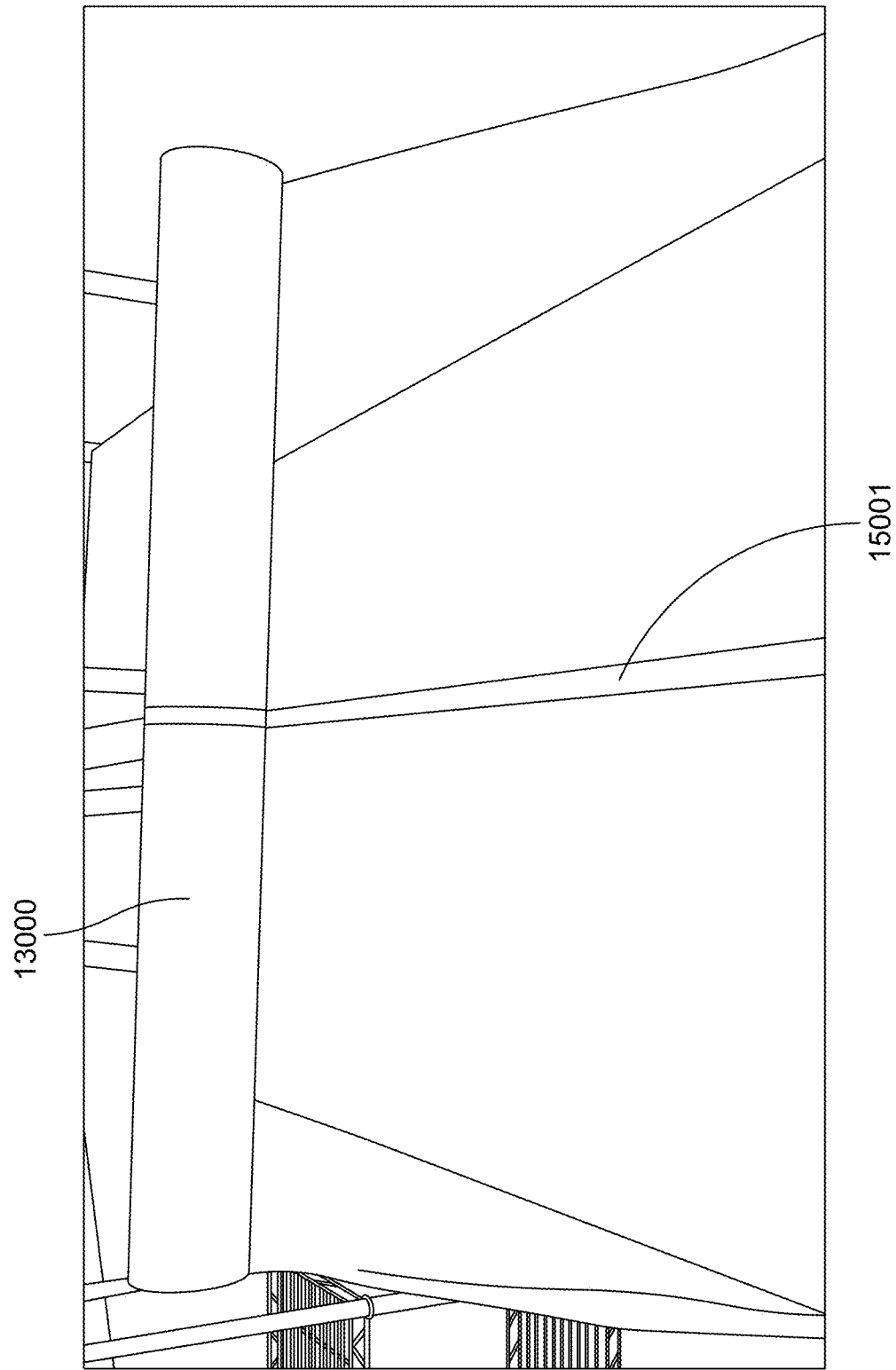
FIG. 45 is an illustration of a layer-separating PET film rollstock with an open window channel according to an embodiment.

FIG. 45 shows a layer separating PET film rollstock 13000 with an open "window channel" 15001.

Figure 46:
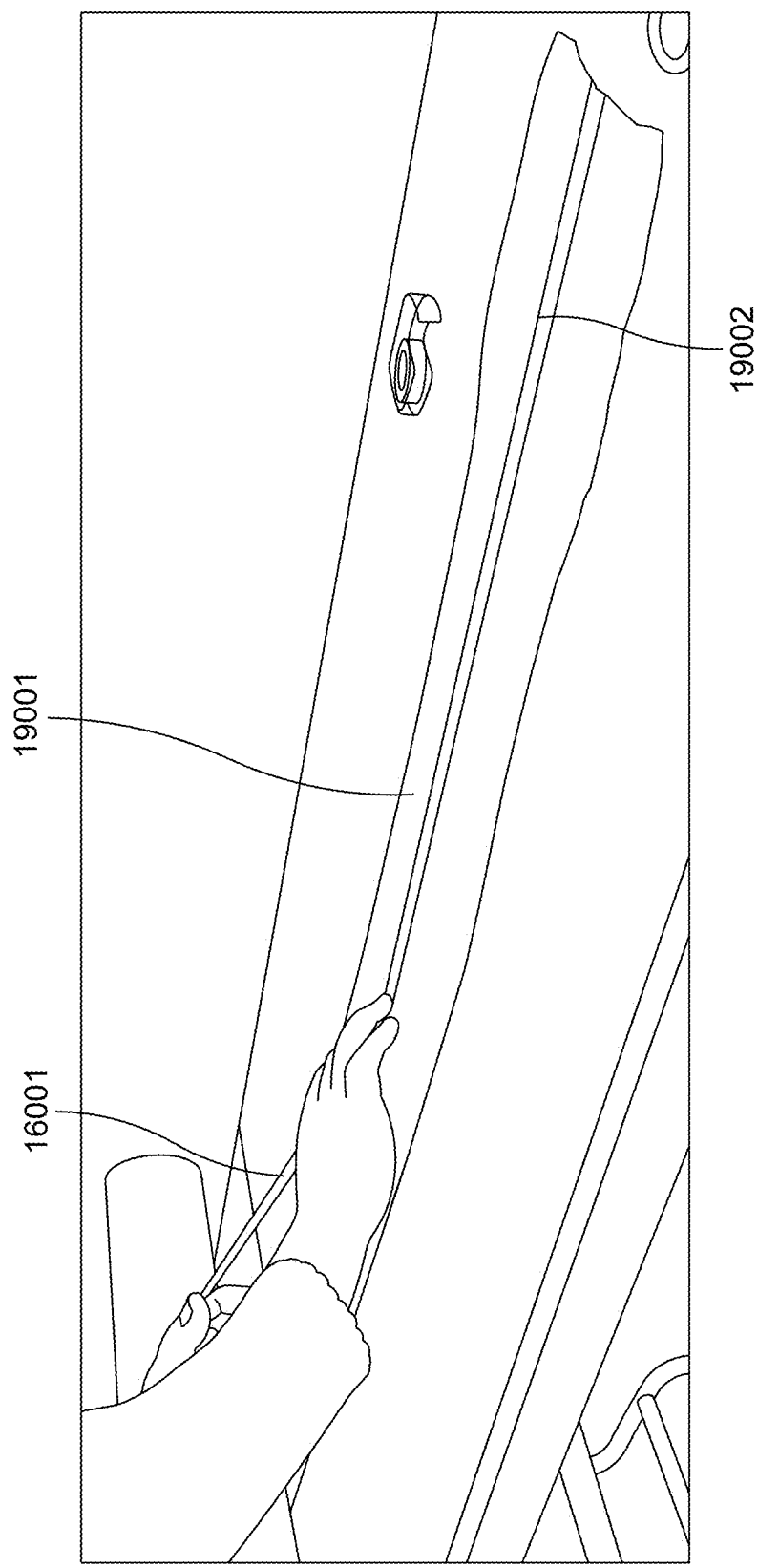
FIG. 46 is an illustration of a laser-scored layer separating film adhered to a balloon panel layer with a narrow film strip between two laser-scored lines peeled back to define a layer separating window channel according to an embodiment.

FIG. 46 shows a laser-scored layer separating film adhered (temporarily or permanently) to a balloon panel layer 19001 and where the narrow window channel film 16001 is peeled back exposing an open window channel with lower balloon panel layer lying below 19002.

Figure 47:
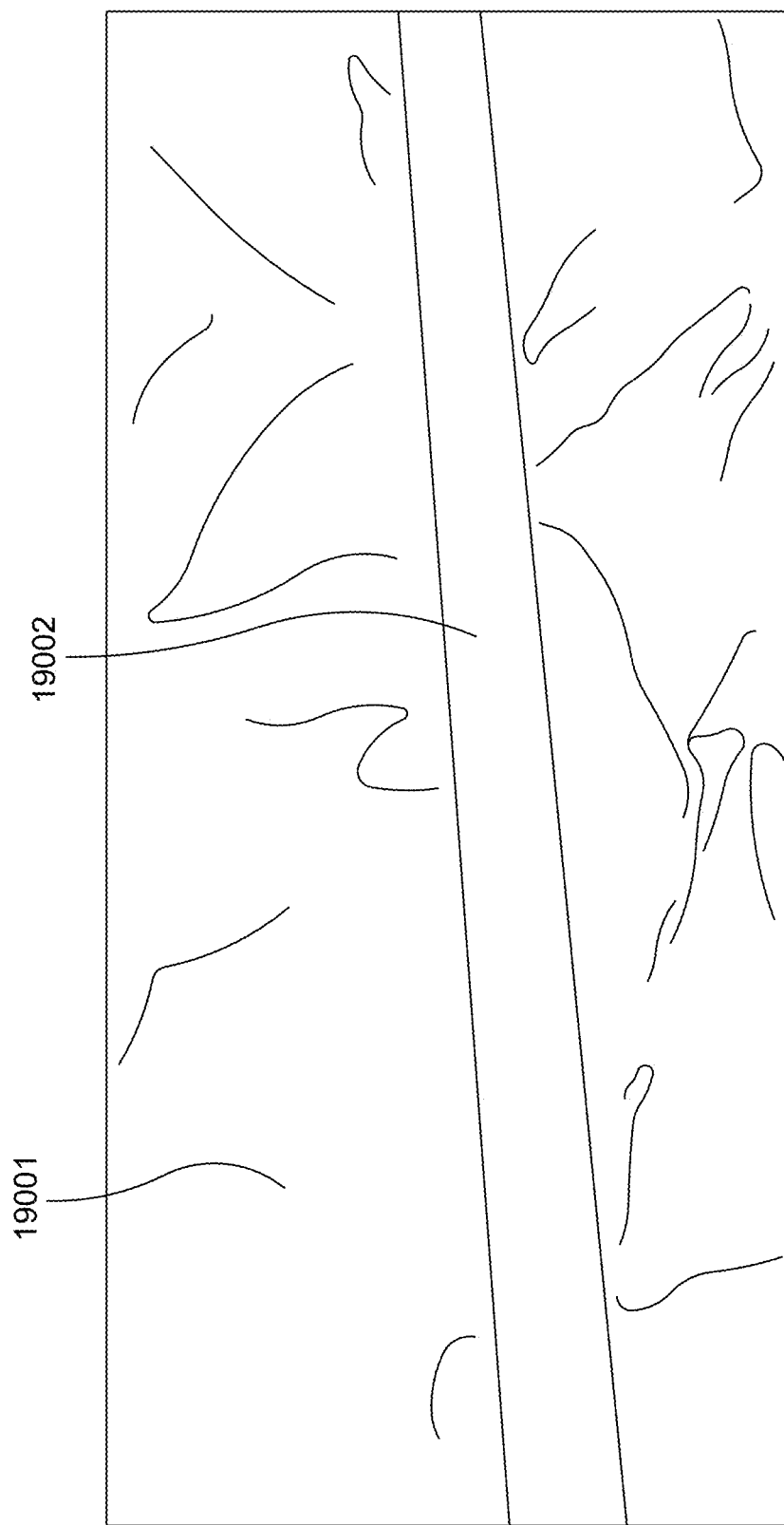
FIG. 47 is a close-up view of a laser-scored layer separating film adhered to a balloon panel layer with a narrow film strip between two laser-scored lines peeled back to define a layer separating window channel according to an embodiment.

FIG. 47 shows a close-up view of an open window channel with the lower balloon panel layer lying below 19002. The rest of the layer separation film remains adhered to the balloon panel layer beneath it 19001.

Figure 48:
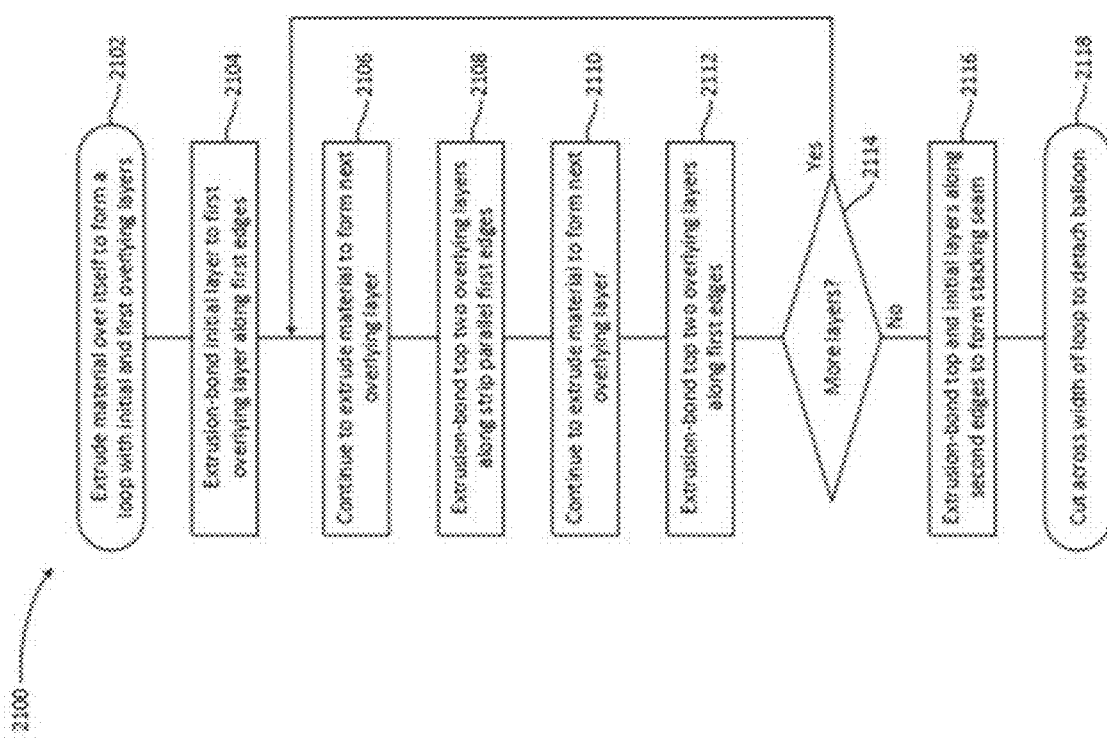
FIG. 48 is a flowchart illustrating an embodiment of a method of fabricating a high-altitude balloon according to an embodiment.

FIG. 48 illustrates an embodiment of a method generally 2100 of fabricating a high-altitude balloon including:

(A) extruding a continuous sheet of material over itself to form a loop having an initial layer and a first overlying layer, both layers having first and second edges 2102;

(B) extrusion-bonding the initial layer to the first overlying layer along the first edges of the layers to form a seam 2104;

(C) continuing to extrude the continuous sheet of material over itself to form a next overlying layer having first and second edges 2106;

(D) extrusion-bonding the two top overlying layers along a strip spaced apart from the first edges of the first and next overlying layers to form a seam 2108;

(E) continuing to extrude the continuous sheet of material over itself to form a next overlying layer having first and second edges 2110;

(F) extrusion-bonding the two top overlying layers along the first edges of the layers to form a seam 2112;

(G) if more layers are desired 2114, return to step (C);

(H) extrusion-bonding the top overlying layer to the initial layer along the second edges of the layers to form a stacking-layer seam 2116; and (I) separating the envelope by cutting across a width of the loop 2118.

FIG. 49 illustrates another embodiment of a method generally 2200 of fabricating a high-altitude balloon. This embodiment includes:

dispensing separation film 2202;

extruding extrudate onto the film, the combined film and extrudate looping over itself to form initial and first overlying layers both having first and second edges 2204;

extrusion-bonding the initial layer to the first overlying layer along the first edges of the layers to form a seam 2206;

continuing to extrude the continuous sheet of material onto the film and, with the film, over itself to form a next overlying layer having first and second edges 2208;

extrusion-bonding the two top overlying layers along a strip spaced apart from the first edges of the first and next overlying layers to form a seam 2210;

scoring the top layer between the strip and the second edge 2212;

separating the second edge of the extrudate along the score line 2214;

continuing to extrude the continuous sheet of material and the film to form a next overlying layer having first and second edges 2216;

extrusion-bonding the two top overlying layers along the first edges of the layers to form a seam 2218;

if more layers are desired 2220, returning to the fourth step;

extrusion-bonding the top overlying layer to the initial layer along the second edges of the layers to form a stacking-layer seam 2222; and cutting across the width of the loops to detach the balloon 2224.

Some embodiments include dispensing a tendon line between two adjacent layers 2226. The tendon line comprises a spread-tow tendon line.

Embodiments can use different types of incompatible adhesion (i.e. chemically do not bond well to one another) plastic films, coatings, release papers, among other related technologies to control what areas of extruded balloon panel layers adhere to the one another, and what areas do not adhere to one another when the balloon inflates. For example, in one embodiment a laser-scored PET (polyester) layer separating film is disposed between the balloon's various LDPE extruded panel layers. In another embodiment, the extruded panel layers are made up of a multi-layer co-extrusion such as LLDPE-EVOH-LLDPE. One embodiment uses a PET layer separating film "window channel" of 1-2 cm wide (created by 2 parallel laser-scored lines 1-2 cm apart) that can be peeled apart from the rest of the layer separating film just before the next balloon extrudate layer contacts the layer separating film and the preceding balloon panel layer. This "window channel" allows the creation of a 1-2 cm wide strong extrusion bonded seam between the top extruded balloon layer and the preceding extruded balloon layer. In this way, when the new layer is extruded atop of the preceding extruded layer, only the area where the "window channel" has been peeled back will the two balloon layers bond together. The rest of the non-windowed PET layer separation film will not allow the two balloon layers to adhere to one another, thus ensuring that the two balloon panels will separate from one another to allow for full balloon envelope deployment. Only at the seam perimeter of the two balloon panels, i.e. the PET layer separation film peeled away "window channel", can the two balloon panels permanently adhere to one another.

Alternative embodiments allow for spray-on coatings, roll-on coatings, or otherwise applied coatings to create a small barrier layer between the two or more balloon panel layers so that they only adhere to one another at a desired "window channel" location. For example, a thin Teflon® coating may be applied via precision ultrasonic spray nozzles to a bottom balloon panel so that a 1-2 cm wide non-coated seam "window channel" permits the top extruded balloon panel to adhere to the bottom balloon panel at that same window channel location and not adhere to one another at any other location. The remaining coated portion of the bottom balloon panel keeps the rest of the top balloon layer from adhering to it, even under substantial heat and pressure conditions, due to an incompatible chemical nature of the coating and the top and bottom balloon panels. In one embodiment, a balloon layer separating film or coating may be made from materials such as polyester, Teflon, polyurethane, or a combination of different films or coatings. In another embodiment, a layer separation barrier may have two different face compositions so that it can adhere permanently to one balloon panel but not to another balloon panel in particular locations.

An alternative embodiment uses an innovative use of thin film laser scoring technology to control what parts of a given extruded balloon panel layer adheres to one or more additional balloon panel layers above or below it. In one embodiment, a 24-48 gauge PET "layer-separating" film (coated or uncoated) is pre laser-scored with two or more parallel lines roughly 1-2 cm apart. The pre-scoring process creates clean tear guide lines but also maintains the structural integrity of the film layer so that it does not prematurely separate at the scored lines Laser scoring uses energy (i.e. laser beams) to remove/melt a portion of a base material at a specified depth and location. The removal of a portion of the base material creates a weak spot in the base material that can guide a pre-determined tear path. Mechanical scoring and other types of scoring may also be employed in other embodiments. However, the cleaner and more consistent the scoring line, the better the seam profile will be between two or more balloon panel layers. Laser scoring lines and their depths are extremely accurate and can help provide near perfect quality and consistent peel lines under the right manufacturing conditions.

In one embodiment a layer-separating film may be pre-laser-scored in one manufacturing step and re-rolled on a master roll, where it can later be used in the extruded balloon manufacturing process. In this pre-manufacturing case, a roll of layer separating film of a specified width and thickness is manufactured and wound on a master roll. In another converting step, the master roll is then unwound, passing through a laser-scoring machine that creates the required removal/melting of tear lines along the length of the film web at predetermined locations, and the now laser-scored film is rewound again on a master roll. The laser-scored master roll is then mounted on the extruded balloon manufacturing line which dispenses it between newly extruded balloon panel layers. Before the new balloon extrudate layer lands atop of the dispensed laser-scored film, the portion of the layer-scored film we wish to remove to enable a seam bond (i.e. the 1-2 cm channel of material between two laser-scored lines) is cleanly peeled away and rewound on a separate spindle for recycling/disposing. In order to get a clean peel and keep the laser-scored (layer separating) film from sliding on top of the preceding extruded balloon panel layer, a temporary adhesive, coating, static electricity, or pressure-sensitive non-adhesive stick substrate (such as used on surface protection film) may be used. Heat can also be applied to temporarily adhere a laser-scored film to one of the balloon panels. Such temporary adhesion technologies, among others, allow for the laser-scored film to remain in the correct location and not introduce wrinkles into the manufacturing process when multiple laser-scored and extruded balloon layers are passed through pressure rollers. It should also be noted that in some embodiments a layer separating barrier (film, coating, or the like) may permanently adhere to one of the two balloon panels, but not to the second balloon panel, as only separation from one of the balloon panels would be a requirement for proper balloon envelope deployment. In another embodiment, one portion of the layer separation barrier can adhere permanently to one of the balloon panels and another portion of the layer separation barrier can adhere permanently to the other balloon panel, (i.e. the layer separation barrier portions separate from one another while both adhering at least partially to a balloon panel) still allowing the balloon envelope to deploy.

In other embodiments, a laser-scoring apparatus may be mounted in-line on a balloon panel extrusion line and may laser-score the "layer-separating" film after the film has been dispensed from a master roll. In this case, the layer separating film is mounted on the extruded balloon manufacturing line without pre-completed laser-score marks. As the layer separating film dispenses, it travels through the laser-scoring machine that creates the proper "window channel" laser score lines. Before the new balloon extrusion layer lands atop of the layer-separating film layer, the portion of the layer-separating film we wish to remove (i.e. the 1-2 cm window channel) is cleanly peeled away and rewound on a separate spindle for recycling/disposing.

Laser-scoring machines can also zap/remove/melt wider width areas of a layer separation film than just a thin tear guide line. In some embodiments a layer-separating film is mounted on the extrusion balloon manufacturing line. When the layer-separating film is temporarily or permanently adhered to an extruded balloon panel layer, a machine mounted laser-scoring apparatus can zap/remove/melt a 0.25-2 cm width area of the layer-separating film, creating a "window channel" by which the new balloon extrusion panel layer can adhere to the preceding balloon panel layer at a common seam perimeter, all while keeping the two layers from adhering together at any undesirable locations across their web widths. In one embodiment, the layer-separating film is pre-converted onto a separate balloon film layer, such as in the case of a PET-LLDPE-EVOH-LLDPE structure where the PET is the layer separating barrier portion and the LLDPE-EVOH-LLDPE is the balloon film portion, and whereby parts of the PET layer can be laser-scored or removed to create a "window channel".

In some embodiments incompatible adhesion coatings are used to control what parts of a given extruded balloon panel layer adheres to one or more additional balloon panel layers above or below it. Teflon® coatings for example, may be applied in very thin amounts using precision nozzles atop of a balloon panel layer to keep the next layer from adhering to it. Teflon® has a much higher melting point than LDPE and many other commonly used balloon film plastics for example, and is chemically incompatible to many other plastics, blocking adhesion, and thus it can act as a layer-separating barrier. Though it may also be manufactured in thin film and laser-scored and peeled away in predetermined locations, Teflon® can also be applied as a coating which gives additional flexibility depending upon final balloon specifications. Other temporary or permanent stick and non-stick coatings may be employed as layer-separating barriers, and some coatings may be used in conjunction with layer separating films or other balloon layer separating technologies.

In some embodiments, high-altitude balloons and large inflatable structures may be extruded layer upon layer at predetermined layer thicknesses and widths, where said layers can adhere to one another at pre-determined seam perimeter locations, so that upon inflation of alternating-bonded accordion stacked layers, a large 2-D sheet or 3-D envelope can be deployed when the layers separate from one another in all areas except for at the alternating seam perimeter locations where the multiple panel layers bonded together. For illustrative purposes, if 100 layers of 3 mil (0.003") thick balloon panel layers, each 1 meter wide and 100 meters long, are extruded on top of one another and bonded to one another along the final 5 cm perimeter of their common edge perimeters, when inflated, the cylinder inflatable structure would have a circumference of roughly 100× 1−(0.05×2=90 m circumference and a radius of roughly 90/2/3.14=14.33 m. The resulting right cylinder inflatable structure would have a total volume V=πr2h of (assuming flat cylinder end caps added)=3.14*14.33^2*100=64,480 m3. The cylinder inflatable when deployed would have envelope panels that are roughly 3 mil thick, seams that are roughly 6 mil thick, panel widths that are roughly 90 cm wide, and panel lengths of roughly 100 m. The excess film portion beyond the seam perimeters can be largely cut off and discarded.

In one embodiment, multiple balloon panel layers are extruded atop of one another, and after the total number of panels have been extruded, the uppermost and lowermost layers are sealed to one another using a separate bonding machine, such as a rotary constant heat sealer, ultrasonic sealer, or other bonding technology used in high altitude balloon manufacture. In alternative embodiments, a dedicated side "window channel" specifically for bonding the top layer to the bottom layer is employed that bonds each progressive stacking layer to the layer beneath it, bonding all the way from the bottom layer up to the top layer. For example, if the extruded balloon film layer is 3 mil (0.003" thick) and there are 100 layers extruded atop of one another, the side window channel with each layer bonding to the one below it would create a final top/bottom panel seam that is roughly 100*0.003" or 0.3" thick, not including the layer separation barrier thicknesses. The other balloon panel "window channels" alternate left to right on the web and bond each new balloon layer with the preceding balloon layer at a common seam perimeter allowed by the window channel opening. If for example, 100 balloon panel layers are 1 m wide, the panel layer seams for all internal layer panels are 5 cm from the layer edges, and the final top/bottom panel layer seam is only 2 cm from one of the panel edges, then 98 panels will be roughly 0.90 cm wide and the top and bottom panels (adjacent one another when inflated) will be roughly 0.93 cm wide each panel.

In some embodiments a high-altitude balloon extrusion line is used to extrude multiple balloon panel layers upon other layers at predetermined layer thicknesses and widths, where said layers adhere to one another at pre-determined seam perimeters, so that upon inflation of the alternating-side bonded stacked layers, a large 3-D envelope can be deployed when the multiple layers separate from one another in all areas except for at the seam perimeters. Extrusion balloon manufacturing methods and apparatus for practicing the manufacturing method may include but are not limited to the following:

- Virgin plastic pellets (such as LLDPE—Linear Low Density Polyethylene, LDPE, PE, EVA, EVOH, Tie, PET, Nylon, among many others) stored in a protective bulk container;
- A vacuum suction system to suction the plastic pellets into a hopper container;
- A hopper system to store and dispense the plastic pellets into an extruder as needed;
- An extruder system (mono-extrusion or multilayer co-extrusion) with different temperature controlled heating element zones to gradually melt the plastic pellets (without under/overheating) and maintain a target molten plastic temperature. Examples of full extrusion system design and manufacture firms are Davis-Standard® and Bobst®;
- An extruder screw driven inside the extruder to mix and carry the plastic melt from one side of the extruder near the hopper feed-in to the extrusion T-die head and feedblock (co-extrusions);
- An extrusion T-die head with adjustable die lips and deckle system to control the die gap widths where the plastic extrudate "melt curtain" extrudes, for example a Nordson® EDI®EPI™ Extrusion Coating/Laminating Die;
- An appropriate air gap between the extrusion T-die head and the chill/pressure roller pair across which the extrudate melt curtain flows;
- Extrudate neck-in and edge bead mitigation systems;
- An extruder trolley system to move the extruder and extruder T-die over the correct location atop the chilled/pressure roller pair, and to remove the extruder and extruder die when the extrusion process has finished or during emergency process stop;
- A control system and viewing panel, such as PLC computer system, to control and set the full system parameters and compare manufacturing information in real-time;
- A SCADA system for recording all data, QA assurance, and to notify an operator of any irregularities;
- An inline inspection system to monitor the moving web and any passing components;

Mechanical (motor, gear, chain/belt), pneumatic, and electrical systems among other systems to drive all components;

A chilled/pressure roller pair to apply pressure to the "melt curtain" extrudate, ensure a desired extrudate thickness, and cool the extrudate to a lower desired temperature;

A chilled roller water or oil circulation system to dissipate the heat transferred to the chilled rollers from the hot extrudate melt curtain;

Balloon panel layer web pressure rollers, idler roll, tension rollers, nip rollers, and chill rollers;

360 degree continuous looping driven and non-driven roller system to ensure multiple balloon panel layers can be extruded on top of one another without having to halt the extrusion process mid-way;

Web tension control systems, such as master roll friction breaks and dancer bar tension systems, to ensure the proper amount of tension is applied to the balloon panel layers at all times and that little to no wrinkles are introduced;

Additional balloon panel film layer or barrier layer dispensing systems, often including one or more master roll unwind systems, spray nozzles, or liquid tank if coatings are used;

Film edge guide positioning system to make sure any dispensed film layers from a master roll are correctly positioned in relation to all of the other balloon panel layers;

Layer-separating film laser-scoring system, "window channel" peeling system, and channel waste rewind system;

Laser-scoring or trim system to trim between the alternating right/left stacking balloon panel seams and the final top/bottom balloon panel seam to offer clean panel separations when the balloon inflates;

Corona treating, ozone, flame, or other web surface treatment system;

Web drying or web oven curing system;

Trimming system (i.e. straight blades or circular blades) to trim excess material that lies beyond the balloon panel layer seam perimeters;

Web thickness gauging system to measure the thicknesses across the width of the stacking balloon panel layer web;

A load/restraint tendon line dispensing system such as spread tow tape or Kevlar rope;

A top and bottom termination end-cap attachment system;

An inflation valve attachment system;

An internal ballast balloon insertion system;

A payload attachment system;

A UV protection, gas barrier, or other spray coating system (may be applied immediately after two or more layers bonded);

A printing system for printing different surface designs, electric conductive components, or the like on balloon panel interior and exterior surfaces;

A solar panel attachment system;

A scaffolding system for operators to walk over or work under a given moving web portion; and An emergency shut off system (may automatically withdraw extruder away from chill rollers).

Depending on the volume and shape of a high-altitude balloon, the type of materials used in its manufacture, the thickness of the balloon panels, the balloon's pressure resistance required, and the weight of the payload (among other factors), a balloon may require tendon lines (sometimes known as load lines or restraint lines) to strengthen the balloon envelope and help properly distribute payload weight. In some embodiments tendon lines are introduced to the high altitude balloon envelope either during extrusion balloon panel manufacture or after extrusion balloon panel manufacture has been completed.

In some embodiments, thin gauge unidirectional spread tow tape/fabric is used to form tendon lines to reinforce the balloon envelope. Spread tow tapes can be made from many different types of fibers such as carbon fiber, fiberglass, Aramid (i.e. Kevlar®) fiber, Zylon® fibers, among many other plastic, non-plastic and composite fibers. Examples of leading spread tow tape manufacturers are Teknomax Corporation® and Oxeon AB®. In some embodiments, unidirectional or multi-directional orientated spread tow fibers with prepreg coatings may be used. In other embodiments, "dry" non-coated spread tow fibers may be used. Some embodiments use stabilized spread tow tapes that are fray resistant, and others may use non-stabilized spread tow tapes where the fibers are not bound together by any substrate. In some embodiments, a spread tow tape may be used rather than a non-spread rope to dispense into the extrusion balloon manufacturing process as the hundreds or thousands of fibers of a given balloon tendon line can be largely spread out from one another into a very thin and consistent thickness spread tow "sheet". By spreading the tendon lines into thin sheets, the tendons can be dispensed in between extruded balloon panel layers without destroying the integrity of the balloon panel layers when multiple panel/tendon layers are all passed together through nip rollers, idler rolls, chill rollers, and other converting equipment that often works best with a consistent thickness across the entire web width.

Spread tow tendon lines may also be combined with layer-separating barrier films. Instead of simply dispending a layer-separating film in between extruded panel layers, a spread tow tendon sheet can be pre-converted onto the layer-separating film and both dispensed together. In cases where the spread tow tendon does not extend across the entire width of the balloon panel layers, there may be a small gap to fill on either side of the spread tow tendon sheet in order for the multiple layer balloon panel web to maintain a consistent thickness across its width. In one embodiment, a "gap filler" material can be pre-converted along with the spread tow tendon and layer-separating film in order to introduce a uniform gauge product into the balloon manufacturing process. For example, a spread tow tape can be inserted into a separate converting cast film line so that the molten extruded plastic (i.e. PET, LDPE, LLDPE-EVOH-LLDPE multilayer) at least partially encapsulates the spread tow tendon and creates a uniform thickness thin sheet. In an alternative embodiment, the spread tow tendon is not permanently adhered to the layer-separating film, and the spread tow tendon can separate from the layer separating film when the balloon inflates. A spread tow tendon may also be nestled within a tendon line channel of sorts, where the channel bonds either to the layer-separating film or the balloon panel, thus allowing the spread tow tendon to slide up and down the channels freely. Many other spread tow and non-spread tow tendon embodiments may be used.

Chill/pressure rollers and nip rollers often have preset gap size and pressure settings, meaning that they can level out a molten plastic extrudate "pool" that collects just before the chill/pressure rollers pinch location. In one embodiment, a spread tow tendon is dispensed into the balloon manufacturing system and the pressure rollers squeeze excess plastic melt outward from the spread tow tendon toward the edges of the balloon panel layer edges. In this case, if the spread tow tendon is 0.001" thick and the thickness of the balloon panel layer is set to be 0.003" thick in a roller gap, the balloon panel portion touching the spread tow tape may only become 0.002" thick as the spread tow thickness takes up 0.001" of the gap, and the area beyond the spread tow tape width may become the full 0.003" thick. Whether pre-converting spread tow tapes with other films or dispensing directly into the extrusion balloon manufacturing system, there are multiple ways to fill in any small gaps beyond where the spread tow tendon extends and the edge of the balloon panel layer ends to keep the stacking layers at a constant thickness after each 360 degree looping cycle.

Spread tow tapes are typically categorized by fiber type (for example, carbon fiber, fiberglass, Zylon®, Kevlar®, or Innegra®), direction of yarn orientation (unidirectional, bi-directional weave), tow weight (i.e. 38-200 grams/m2, number of yarns (i.e. 1 k-20 k yarns), and width of spread tow tape (i.e. 1 cm-10 cm). The tensile strength, thickness of each yarn, among other considerations can be specified when selecting the proper spread tow tape/sheet for use as a high-altitude balloon and large inflatable tendon line. Typically, a special tow spreading machine is used that takes a given fiber tow in rope format and blows air into it, separating the individual fibers/yarns, and directs the tow to flatten out many times wider (and much thinner) than the original fiber tow rope was originally. A thin stabilizer layer may be added to help prevent fiber fraying.

A spread tow tendon line or tendon line channel may be introduced into at least a portion of the bonded seam between two or more balloon panel layers. For example, a layer separation barrier film may have a window channel where a top and a bottom balloon panel layer are able to bond to one another. Before the top balloon panel layer is extruded atop of the layer separation barrier and the bottom balloon panel layer, a spread tow tendon line may be introduced adjacent the window channel. The tendon line may become completely or partially bonded with or encapsulated within the top and bottom balloon panel layers and help reinforce the strength of the seam, as well as create pressure-resistant balloon lobing and assist in payload carrying. In another embodiment, a spread tow tendon line is dispensed adjacent a layer separating coating's window channel. A tendon line may also be pre-manufactured or pre-converted into a layer-separation barrier film, for example pre-attached along the middle of a layer separation barrier film's window channel and dispensed continually along with the layer separation barrier into the extrusion balloon manufacturing system.

Spread or non-spread tow tendon lines, (i.e. fiber rope) may be used to strengthen the balloon envelope, create balloon surface "lobing" that increases balloon pressure resistance, and help carry a payload. In one embodiment, the multiple extruded balloon panel layers are fully extruded atop one another, and afterwards via the open gaps between panels, spread or non-spread tow tendon lines are attached both to both upper and lower balloon panel layers via continuous bonding, adhesive tape securing, or spot tacking methods. One embodiment uses one or more tendon dispensing extension arms to enter in between the second to the top and third to the top balloon panel layers, or between the second to the bottom and the third to the bottom balloon panel layers. The arm(s) can dispense a tendon line upwards against the upper panel or downwards against the lower panel either at the same time or one at a time. The tendon line may be held in place with an adhesive tape, or a tacking of periodic loops may help hold the tendon line in position.

After one desired tendon line attaching 360° rotation has been completed, the arm can pull out and progress to the next gap between two more balloon panels until all of the panels are given tendon lines. The top and bottom panels should also be given tendon lines. For example, after balloon panels 2, 3 from the top have been given tendon lines, the tendon dispensing arm can pull out and start again in between panels 4, 5 and then 6, 7. Either at the beginning or at the end, the tendon line dispensing arm can attach the top balloon panel and bottom balloon panel tendon lines. The gap between pinch rollers/chill rollers can be widened so that the stacked balloon layer web can spin around 360 degrees to assist in the tendon attachment process until all required panels have tendon lines attached. The extension arm may have a tendon line/tape cutting system to cut the line after each roughly 360 degree loop/revolution has been achieved. Many other spread tow and non-spread tow (i.e. rope) tendon line attachment balloons, apparatuses and methods may be used.

Mono-extruded or multilayer co-extruded balloon panel layers are cast extruded atop of other balloon panel layers to form a multi-layer accordion-like stacked balloon envelope in some embodiments. Upon deployment and inflation of the balloon, the multiple balloon panel layers can separate from one another at all places but at their alternating bonded seam perimeters, thus creating a 3D balloon envelope structure constructed from a plurality of balloon panel layers. In some embodiments pre-manufactured balloon panel film layers may be extrusion laminated to additional pre-manufactured balloon panel film layers via an extrudate bonding layer to create a high-altitude balloon envelope.

Some embodiments include two or more pre-manufactured balloon panel layers extrusion laminated together to create a balloon envelope. A pre-manufactured balloon panel film is continually dispensed into the extrusion balloon manufacturing system much like (and even laminated to in some cases) a layer-separating film. In one embodiment, the balloon panel film rollstock is dispensed so that the molten extrudate can become the middle layer between the preceding balloon panel layer and the newly dispensed layer extrusion lamination. A thin molten plastic extrudate web (0.0005-0.003", for example) may be extruded from an extrusion die and bond two or more pre-manufactured balloon panels together at a common seam perimeter. Rather than comprise the principal balloon panel layer itself, the extrusion lamination extrudate may be used primarily as an intermediary bonding agent between two pre-manufactured balloon film layers and need not necessarily hold a lot of gas barrier or tensile strength on its own. For example, a 3 mil (0.003") thick LLDPE-EVOH-LLDPE pre-manufactured balloon film may be dispensed as the primary balloon panel film into the extrusion balloon manufacturing line. A 1 mil (0.001") thick LLDPE web may then be the middle molten extrudate layer to extrusion laminate two pre-manufactured film layers at a specified seam location using different "window channel" technologies. The resulting seam thickness of the two bonded pre-manufactured balloon film panels extrusion laminated together would be 0.003" (top panel)+0.001" (LLDPE middle extrusion layer)+0.003" (bottom panel)=0.007" thick. A spread tow tendon or other tendon line can be pre-manufactured along with the pre-manufactured balloon film, pre-converted to it, or inserted during the extrusion balloon manufacturing process. In some embodiments, a layer-separating film can be pre-laminated/manufactured along with the principal balloon panel film, as well as pre-laminated/manufactured along with a spread tow tendon line.

In some embodiments, the edge perimeters of two or more balloon panel layers may be together in a substantially straight line, such as in the construction of a cylinder-shaped balloon envelope or the construction of a large agricultural cover sheet or geomembrane sheet that are largely rectangular in nature. In some embodiments the edge perimeters of two or more balloon panel layers are bonded together in a non-linear (i.e. slanting or curving) path. One example of such an embodiment would be a spherically or pumpkin shaped high-altitude balloon made from a plurality of tapering balloon panel layers (i.e. gores) that are much narrower at the top and bottom of the balloon panels than they are at the middle of the balloon panels. The curving nature of the seam can be completed the same as with a linear seam using layer-separating barrier films/coatings, and the excess material that lies beyond the seam perimeters (the material outside the curved seam lines) can be trimmed away either after each 360 degree bonding pass, or after the entire extruded balloon has been manufactured or the tendon lines have been attached. Complex seam patterns, clean seam lines, and nearly wrinkle-free seams can be introduced into high altitude balloon designs.

In order for spread tow tendon lines to be continually dispensed during balloon manufacture and for the tendon tow lines to not interfere with the balloon panel seam perimeters, a top and bottom balloon panel seam gap can be introduced that is larger than the width of the spread tow tape. The spread tow tendon, if placed in the middle of the balloon panels for example, will be closest to the balloon panel seams at the top and bottom of the balloon where the tapering seams come inward on the web. For example, if the spread tow tendon is 2 cm wide, a gap of at least 2 cm between the two left/right alternating side balloon panel seams should be allowed. This way, the spread tow tape will not be sealed inside the balloon panel layer seam. With a top/bottom balloon opening of roughly 2 cm for each bonded balloon panel pair, if 100 balloon panels are attached to one another, then two holes (one top balloon end cap hole, and one bottom balloon end cap hole) of roughly 100*2=200 cm circumference will need to be covered with balloon top and bottom end termination caps/fittings. In some embodiments the spread tow tendon line may be bonded or encapsulated into the balloon panel seam itself. In other embodiments, no tendon lines will be needed (or can be added after the balloon envelope is manufactured), and thus little to no balloon top/bottom cap hole gaps will need to be covered.

Some embodiments provide balloon tendon lines that extend beyond the top and bottom of the balloon panel so that they can easily be attached to end termination fittings or to a payload line. For example, an additional tendon line may be introduced between the top and bottom of the balloon envelope points by creating a sufficient gap between the head end and tail end of the flat stacked balloon on a 360 degree looping manufacturing line. The extra tendon line can extend out further than the balloon panel head/tail ends and can be later cut and manipulated for anchoring to other components. For example, if 100-foot long balloon panels are desired along with a total extra 5 feet of tendon line, then the entire 360 degree looping extrusion balloon panel manufacturing line can be 105 feet in circumference (as traveling in 360 degrees looping path), and when the balloon manufacturing is finished the tendon line can be cut in the middle of the balloon top/bottom gap across the web at 2.5 feet from each end to now have roughly 2.5 feet of extra tendon line to manipulate on each of the balloon's top/bottom sides.

The process parameters, functions, features, and sequences of steps described or illustrated are given by way of example and may be varied, mixed, and matched. The exemplary methods may omit one or more steps or include additional steps. The illustrative embodiments as described and illustrated are not intended to be exhaustive or to limit the invention to the precise forms disclosed. Modifications and variations are possible. The embodiments were chosen to explain the principles of the apparatus and methods and their practical applications. Accordingly, the disclosure is to be limited only by the claims.

The invention claimed is:

1. A high altitude balloon comprising a plurality of layers of extrudate coextruded to form a seamless sheet of extrudate in a shape defining a first balloon envelope, wherein the balloon further comprises a delaminator layer disposed between two of the layers of extrudate, wherein the delaminator layer allows the two layers of extrudate to delaminate from each other.

2. The balloon of claim 1 and further comprising an endcap attached to an end of the balloon envelope.

3. The balloon of claim 1 wherein the extrudate is selected from a heat-sealable polymer, a non-heat-sealable material, a metallic material, and glass.

4. The balloon of claim 1 wherein upon inflation the layers are partially delaminated from each other.

5. The balloon of claim 4 wherein upon inflation the layers define a balloon envelope cavity.

6. The balloon of claim 1 wherein the layers of extrudate comprise flexible glass.

7. The balloon of claim 1 wherein the layers of extrudate have lobes.

8. The balloon of claim 1 and further comprising a second balloon envelope disposed within the first balloon envelope.

9. The balloon of claim 1 and further comprising one or more coextruded tendon lines adjacent the layers of extrudate.

10. The balloon of claim 1 wherein panels defined in the layers of extrudate are tapered.

11. The balloon of claim 1 wherein the layers of extrudate comprise sub-layers.

12. A high altitude balloon comprising a plurality of layers of extrudate coextruded to form a sheet of extrudate in a shape defining a first balloon envelope, the sheet of extrudate comprising micro seams, wherein the balloon further comprises a delaminator layer disposed between two of the layers of extrudate, wherein the delaminator layer allows the two layers of extrudate to delaminate from each other.

13. A high altitude balloon comprising a plurality of layers of coextruded extrudate and a delaminator layer interposed between a portion of one of the layers of extrudate and a portion of another of the layers of extrudate, wherein the delaminator layer allows the layers of extrudate to delaminate from each other.

14. The balloon of claim 13 wherein the layers of coextruded extrudate and the delaminator layer define a single coextrusion sheet of material.

15. The balloon of claim 13 and further comprising a plurality of tendon lines coextruded with the layers of extrudate.

16. The balloon of claim 13 wherein panels defined in the layers of extrudate are tapered.

17. The balloon of claim 13 wherein the layers of extrudate comprise flexible glass.

18. The balloon of claim 13 wherein at least one of the layers of extrudate comprises micro seams.

19. The balloon of claim 13 wherein the layers of extrudate have lobes.

20. The balloon of claim 13 wherein the layers of coextruded extrudate define a first balloon envelope, and further comprising a second balloon envelope disposed within the first balloon envelope.

* * * * *